US012737784B2

(12) United States Patent
Beaver et al.

(10) Patent No.: US 12,737,784 B2
(45) Date of Patent: Sep. 15, 2026

(54) METHOD, COMPUTER READABLE STORAGE MEDIA, AND SYSTEM FOR GENERATING AND DETERMINING ADDITIONAL CONTENT AND PRODUCTS BASED ON PRODUCT-TOKENS

(71) Applicant: ZAZZLE INC., Menlo Park, CA (US)

(72) Inventors: Robert Beaver, San Francisco, CA (US); Leslie Young Harvill, Olympia, WA (US); Matthew DiFonzo, Belmont, CA (US); Brent Burgess, Winchester (GB)

(73) Assignee: Zazzle Inc., Menlo Park, CA (US)

( * ) Notice: Subject to any disclaimer, the term of this patent is extended or adjusted under 35 U.S.C. 154(b) by 71 days.

(21) Appl. No.: 18/120,406

(22) Filed: Mar. 12, 2023

(65) Prior Publication Data

US 2024/0303709 A1 Sep. 12, 2024

(51) Int. Cl.
*G06Q 30/00* (2023.01)
*G06Q 30/0601* (2023.01)

(52) U.S. Cl.
CPC ..... *G06Q 30/0627* (2013.01); *G06Q 30/0621* (2013.01); *G06Q 30/0643* (2013.01)

(58) Field of Classification Search
None
See application file for complete search history.

(56) References Cited

U.S. PATENT DOCUMENTS 7,440,587 B1 10/2008 Bourdev
7,505,913 B2 3/2009 Tobin
(Continued)

FOREIGN PATENT DOCUMENTS

GB 2599947 A 4/2022
WO 2021/203118 A1 10/2021

OTHER PUBLICATIONS

Kannan, A., Givoni, I.E., Agrawal, R. and Fuxman, A., Matching unstructured product offers to structured product specifications, Aug. 2011, In Proceedings of the 17th ACM SIGKDD international conference on Knowledge discovery and data mining, pp. 404-412. (Year: 2011).*

(Continued)

*Primary Examiner* — Jeffrey A. Smith
*Assistant Examiner* — Brittany E Bargeon
(74) *Attorney, Agent, or Firm* — Patterson + Sheridan, LLP; Malgorzata A. Kulczycka

(57) ABSTRACT

In some embodiments, a computer-implemented method comprises: using a client application executing on a user device, generating a user interface configured to receive one or more user characteristics; wherein the one or more user characteristics have been associated with one or more corresponding graph of transform invariant features product-tokens (GTIF product-tokens); receiving, by the client application executing on the user device, via the user interface, a particular characteristic of the one or more user characteristics; determining, by the client application, a particular GTIF product-token associated with the particular characteristic of the one or more user characteristics; determining whether the particular GTIF product-token, associated with the particular characteristic, matches a particular pair of a set of GTIF product-token pairs; in response to determining that the particular GTIF product-token matches the particular pair, determining particular additional content based on the particular pair, and displaying the particular additional content on the user device.

20 Claims, 34 Drawing Sheets

(56) References Cited

U.S. PATENT DOCUMENTS

| | | | | |
|---|---|---|---|---|
| 8,589,405 | B1 | 11/2013 | Estan | |
| 9,800,473 | B2 | 10/2017 | Ong et al. | |
| 11,016,557 | B2 | 5/2021 | Runnels et al. | |
| 11,244,376 | B1 | 2/2022 | Van Thomme | |
| 2011/0145068 | A1 | 6/2011 | King et al. | |
| 2011/0179021 | A1 | 7/2011 | Wen et al. | |
| 2012/0293542 | A1 | 11/2012 | Iwama et al. | |
| 2013/0073389 | A1 | 3/2013 | Heath | |
| 2014/0100991 | A1 | 4/2014 | Lenahan et al. | |
| 2015/0021356 | A1* | 1/2015 | Witchell | B01F 33/848 222/23 |
| 2017/0019719 | A1 | 1/2017 | Neumeier et al. | |
| 2018/0108054 | A1 | 4/2018 | Doubinski et al. | |
| 2018/0190033 | A1 | 7/2018 | Barnett et al. | |
| 2019/0108292 | A1* | 4/2019 | Bowen | G06F 40/186 |
| 2019/0141488 | A1* | 5/2019 | Yedvab | H04W 4/38 |
| 2019/0163982 | A1 | 5/2019 | Block | |
| 2019/0340252 | A1 | 11/2019 | Huyghe et al. | |
| 2020/0104522 | A1 | 4/2020 | Collart | |
| 2021/0192097 | A1 | 6/2021 | Beaver, III et al. | |
| 2021/0279305 | A1 | 9/2021 | Goldston et al. | |
| 2021/0312533 | A1* | 10/2021 | Luo | G06Q 30/0643 |
| 2022/0084308 | A1 | 3/2022 | Kuang et al. | |
| 2022/0156465 | A1 | 5/2022 | Crook et al. | |
| 2022/0318874 | A1* | 10/2022 | Beaver, III | G06Q 30/016 |
| 2023/0045071 | A1 | 2/2023 | Kalaldeh et al. | |
| 2023/0075182 | A1 | 3/2023 | Galuten | |
| 2023/0117498 | A1 | 4/2023 | Alcantarilla et al. | |
| 2024/0257018 | A1* | 8/2024 | Todd | G06Q 10/06375 |
| 2025/0022037 | A1 | 1/2025 | Luo et al. | |

OTHER PUBLICATIONS

Pope AR et al: "Learning Object Recognition Models From Images", Proceedings of the International Conference on Computer Vision. Berlin, May 11-14, 1993; [Proceedings of the International Conference on Computer Vision], Los Alamitos, IEEE Comp. Soc. Press, US, vol. Conf. 4, May 11, 1993 (May 11, 1993), pp. 296-301, XP000436250.
Internet Citation: "Scale-invariant feature transform", Aug. 22, 2022 (Aug. 22, 2022), pp. 1-18, XP093175854, wikipedia.org Retrieved from the Internet: URL:https://en.wikipedia.org/w/index.php?title=Scale-nvariant_feature_transform&old id=1105902047.
European Search Report dated Jul. 1, 2024 for Application No. 24 151 814.1.
Francis Bowen et al: "A novel graph-based 1-10 invariant region descriptor for image matching", Electro/Information Technology (EIT), 2012 IEEE International Conference on, IEEE, May 6, 2012 (May 6, 2012), pp. 1-6, XP032188986, DOI: 10.1109/EIT.2012.6220751 ISBN: 978-1-4673-0819-9.
EP Search Report dated Jun. 11, 2024 for Application No. EP 24 15 1804.
EP Search Report dated Jun. 19, 2024 for Application No. EP 24 15 1819.
EP Search Report dated Jun. 18, 2024 for Application No. EP 24 15 1814.
EP Search Report dated Feb. 7, 2024 for Application No. EP 24 15 1822.
EP Search Report dated Feb. 6, 2024 for Application No. EP 24 15 1818.
EP Search Report dated Feb. 6, 2024 for Application No. EP 24 15 1841.
Extended European Search Report for European Patent Application No. 24151822.4, dated Feb. 19, 2024.
Extended European Search Report for European Patent Application No. 24151841.4, dated Jul. 5, 2024.
Extended European Search Report for European Patent Application No. 24151819.0, dated Jul. 5, 2024.
Extended European Search Report for European Patent Application No. 24151818.2, dated Feb. 16, 2024.
Extended European Search Report for European Patent Application No. 24151804.2, dated Jun. 26, 2024.
Non-Final Office Action for U.S. Appl. No. 18/120,404, dated May 5, 2025.
Non-Final Office Action for U.S. Appl. No. 18/120,407, dated Apr. 28, 2025.
Notice of Allowance dated Jul. 28, 2025 for U.S. Appl. No. 18/120,407.
Final Office Action dated Sep. 16, 2025 for U.S. Appl. No. 18/120,402.
Non-Final Office Action dated Sep. 16, 2025 for U.S. Appl. No. 18/120,404.
Non-Final Office Action for U.S. Appl. No. 18/120,402, dated Dec. 22, 2025.
Notice of Allowance for U.S. Appl. No. 18/120,404, dated Dec. 23, 2025.
Tokenlearner: Adaptive Space-time Tokenization for Videos, published on Openreview.net (2021) (Year: 2021).
Non-Final Office Action for U.S. Appl. No. 18/120,405, dated Dec. 31, 2025.
Final Office Action for U.S. Appl. No. 18/120,403, dated Oct. 30, 2025.
Final Office Action for U.S. Appl. No. 18/120,405, dated Sep. 24, 2025.
Non-Final Office Action for U.S. Appl. No. 18/120,403, dated May 20, 2025.
Non-Final Office Action for U.S. Appl. No. 18/120,405, dated May 19, 2025.
Kurt Wagner, Pinterest will now let you search for products using any image you find online—without visiting Pinterest, Mar. 7, 2017, Vox, accessed at https://www.vox.com/2017/3/7/14837702/pinterest-chrome-extension-image-search (Year: 2017).
Non-Final Office Action for U.S. Appl. No. 18/120,402, dated Jun. 6, 2025.
Final Office Action for U.S. Appl. No. 18/120,405, dated Feb. 23, 2026.
Notice of Allowance for U.S. Appl. No. 18/120,404, dated Mar. 27, 2026.
Notice of Allowance for U.S. Appl. No. 18/120,403, dated Mar. 19, 2026.
Automatic Creation of Communication Channels Around Detected Events An IP.com Prior Art Database Technical Disclosure Authors et. al.: Disclosed Without Attribution IP.com No. IPCOM000252373D IP.com Electronic Publication Date: Jan. 5, 2018 (Year: 2018).
Final Office Action for U.S. Appl. No. 18/120,402, dated Apr. 7, 2026.
Communication pursuant to Article 94(3) EPC for European Patent Application No. 24151819.0-1207, dated Apr. 10, 2026.

* cited by examiner

1C102
1C104
1B100
1C106
1C112
1C114
<text>
<link>
<media>
JESSICA
& MASON

400 Inputs
411 Create
421 Browse
431 Search
441 Trending
451 Exploring
460 Token
461 Values
462 Actions
470 Token
471 Values
472 Actions
480 Suggestions
481 Values
482 Actions
561 Database
563A Media
155 Collaboration Server
156 Monitoring System
402 Context Parser
404 Suggestion Generator
406 Suggestion Presenter
408 Suggestion Manager
10 User Device

METHOD, COMPUTER READABLE STORAGE MEDIA, AND SYSTEM FOR GENERATING AND DETERMINING ADDITIONAL CONTENT AND PRODUCTS BASED ON PRODUCT-TOKENS

FIELD OF THE DISCLOSURE

One technical field of the disclosure pertains to providing contents and products based on product-tokens and using the product-tokens to enhance searches of products and services available via a digital product collaboration platform. Another technical field pertains to determining and generating product-token-based media, such as photographs, videos, and the like, and adding them to repositories maintained by the collaboration platform. Yet another technical field pertains to determining and generating various product-tokens and using the product-tokens to organize the content associated with user accounts and users.

BACKGROUND

Recent innovations in computer technologies have stimulated the development of applications and collaboration platforms for designing digital and physical products. A digital product is a product that can be created, delivered, and presented to users digitally, while a physical product is a physical thing.

Due to many recent technological advances, many products may be customized online as the users collaborate with each other using the functionalities of collaboration platforms. The collaboration platforms may also provide the functionalities for ordering digital files that capture interactive digital designs and digital products, as well as for ordering physical products corresponding to the digital designs.

However, the collaboration platforms often lack the functionalities for searching product-tokenized additional contents, adding new product-tokenized contents, or browsing contents related to, for example, interactions between users and the collaboration platforms.

Therefore, there is a need to develop and provide collaboration functionalities that allow generating and determining additional contents and products based on product-tokens that capture information about, for example, events and interactions involving users and collaboration platforms.

SUMMARY

The appended claims may serve as a summary of the disclosure.

BRIEF DESCRIPTION OF THE DRAWINGS

In the drawings:

FIG. 1DD is an example snapshot for generating product-tokens from physical objects.

FIG. 1DE is an example snapshot for generating product-tokens from physical objects.

FIG. 1DF is an example snapshot for generating product-tokens from physical objects.

FIG. 1DG is an example snapshot for generating product-tokens from objects.

FIG. 1DH is an example snapshot for generating product-tokens based on locations.

FIG. 1DI is an example snapshot for generating product-tokens based on locations.

FIG. 1DJ is an example graph of transform invariant features.

DETAILED DESCRIPTION

Figure 1A:
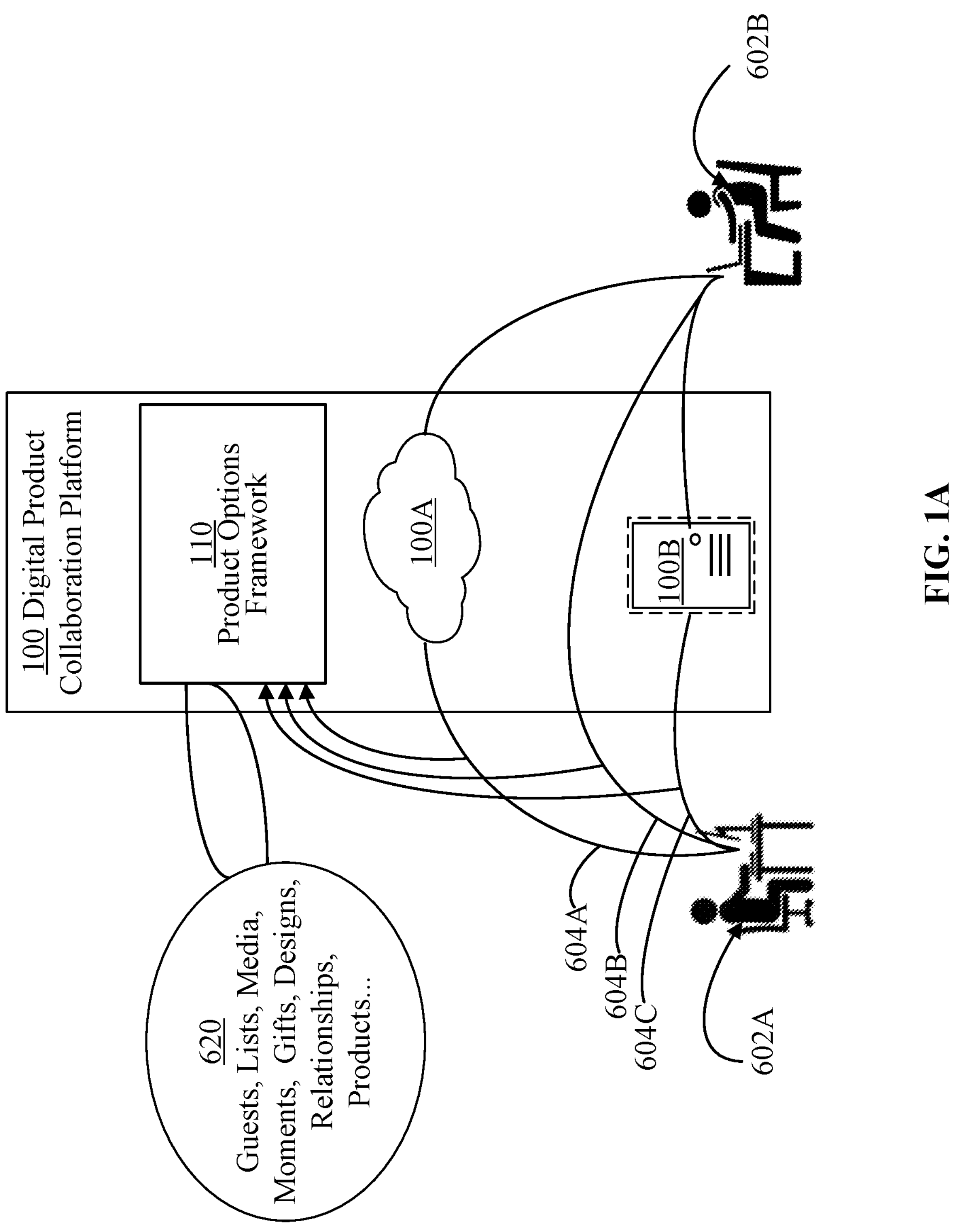
FIG. 1A is a block diagram showing an example computer configuration used in an approach for generating and determining additional content and products based on product-tokens and using a digital product collaboration platform.

In the following description, for the purposes of explanation, numerous specific details are set forth in order to provide a thorough understanding of the method described herein. It will be apparent, however, that the present approach may be practiced without these specific details. In some instances, well-known structures and devices are shown in a block diagram form to avoid unnecessarily obscuring the present approach. Embodiments are disclosed in sections according to the following outline:

1. GENERAL OVERVIEW
  1.1. PRODUCT TOKENS
  1.2. GRAPH OF TRANSFORM INVARIANT FEATURES
  1.3. GRAPHS OF TRANSFORM INVARIANT FEATURES MATCHING
  1.4. EXAMPLE COMPUTER CONFIGURATION FOR DETERMINING ADDITIONAL CONTENT
  1.5. AI-BASED APPROACHES
2. GENERATING PRODUCT-TOKENS
  2.1. EXAMPLE CONFIGURATION
  2.2. EXAMPLES OF PRODUCT-TOKENS
    2.2.1. TEXT-BASED PRODUCT-TOKENS
    2.2.2. TEXT-AND/OR-IMAGE-BASED PRODUCT-TOKENS
  2.3. DIFFERENT PRODUCT-TOKENS FOR ONE MEDIUM
3. EXAMPLE IMAGE ANALYZER
4. GENERATING PRODUCT-TOKENS FROM MULTIPLE MEDIUM COMPONENTS
5. FEATURE MATCHING
  5.1. TRANSFORM INVARIANT FEATURES
  5.2. GRAPH OF TRANSFORM INVARIANT FEATURES
  5.3. GRAPHS OF TRANSFORM INVARIANT FEATURES MATCHING
  5.4. FEATURE MATCHING
  5.5. PATTERN MATCHING
6. FEATURE INVARIANT PATTERNS
7. GENERATING PRODUCT-TOKENS FROM IMAGES OF PHYSICAL OBJECTS
  7.1. PRODUCT-TOKENS FROM IMAGES OF PHYSICAL OBJECTS
  7.2. FEATURE RECOGNITION APPROACHES
    7.2.1. SIFT
    7.2.2. SLAM
    7.2.3. SURF
  7.3. GRAPH OF TRANSFORM INVARIANT FEATURES
8. ASSOCIATING PRODUCT-TOKENS WITH PRODUCTS
9. ASSOCIATING ADDITIONAL CONTENT WITH PRODUCT-TOKENS
10. USING PRODUCT-TOKENS TO REQUEST ADDITIONAL CONTENT
  10.1. USING SIMPLE PRODUCT-TOKENS
  10.2. OPTIMIZATION BASED ON ADDITIONAL CONTENT
11. EXAMPLES OF USING PRODUCT-TOKENS TO RECEIVE ADDITIONAL CONTENT
  11.1. OVERLAYS
  11.2. AUGMENTED REALITY
  11.3. EXAMPLES OF AR-BASED OVERLAYS
  11.4. FEEDBACK LOOP
12. EXAMPLES OF BENEFITS OF PROVIDING ADDITIONAL CONTENT
13. EXAMPLES OF BENEFITS OF IMPLEMENTING A FEEDBACK LOOP
  13.1. GENERATING PRODUCT-TOKENS FOR ADDED CONTENT
14. PRODUCT-TOKENIZATION EXAMPLE
  14.1. WEDDING INVITATION EXAMPLE
  14.2. CONTENT OF AN INVITATION
  14.3. PRODUCT-TOKENIZATION OF AN EXAMPLE INVITATION
    14.3.1. BASE CONTENT
    14.3.2. INVITEE IDENTIFIER
    14.3.3. ADDITIONAL INFORMATION
  14.4. PRODUCT-TOKEN APPLICATIONS
15. PRODUCT-TOKENIZATION-A WEDDING MEDIUM EXAMPLE
  15.1. PRODUCT-TOKENS BASED ON TEXT AND GRAPHICS
  15.2. PRODUCT-TOKENS BASED ON POINTS OF INTEREST
  15.3. PRODUCT-TOKENS AS DEFINING CONTENT RELATIONSHIPS
  15.4. LINKING PRODUCT-TOKENS WITH ADDITIONAL CONTENT
  15.5. GENERATING A CALENDAR OF EVENTS
  15.6. HIERARCHY OF PRODUCT-TOKENS
  15.7. PRODUCT-TOKENS POINTING TO SERVICES
  15.8. PRODUCT-TOKENS OFFERING MONETARY REWARDS
  15.9. PRODUCT-TOKENS USED AS DIGITAL WALLETS
  15.10. TEAR-OFF PORTIONS WITH PRODUCT-TOKENS
16. PRODUCT-TOKEN-BASED SEARCHES
  16.1. SEARCHES FOR ADDITIONAL INFORMATION
  16.2. SEARCHES FOR PLACES AND LOCATIONS
  16.3. SEARCHES FOR PRODUCTS
  16.4. SEARCHES FOR INDIVIDUALS
17. USING PRODUCT-TOKENS TO GENERATE A SOCIAL NETWORK
18. COMPUTER ENVIRONMENT FOR IMPLEMENTING PRODUCT-TOKENS
  18.1. CONTEXT INFORMATION
  18.2. USING CONTEXT INFORMATION TO UNLOCK ADDITIONAL INTERACTION OPPORTUNITIES
19. EXAMPLE COMPUTER ENVIRONMENTS
  19.1. USER DEVICES
  19.2. CLIENT APPLICATIONS
  19.3. FRONT END SERVERS
  19.4. CORE SERVICES
    19.4.1. GENERATING PRODUCT DESCRIPTION DATA 19.4.2. GENERATING KEY-VALUE PAIRS
19.4.3. GENERATING A GRAPHICAL USER INTERFACE
19.5. EXAMPLE MANUFACTURING SYSTEM
19.6. EXAMPLE MANUFACTURING PROCESS
20. EXAMPLE PRODUCT COLLABORATION PLATFORM
20.1. ATTRIBUTE ENGINES
20.2. USER COMPUTERS
20.3. COLLABORATION SERVER
20.4. MONITORING SYSTEM
20.5. PROCESSORS
21. EXAMPLE OF GENERATING CUSTOMIZED PRODUCTS
21.1. COLLABORATION
21.2. USER ROLES
21.3. USER PROFILES
21.4. PRODUCT DEFINITIONS
21.5. ATTRIBUTE REPRESENTATIONS
21.6. GLOBAL-KEY-VALUES
21.7. ADDITIONAL COLLABORATION COMPONENTS
21.8. USER INTERFACE COMPONENTS
22. MANUFACTURE OF CUSTOMIZED PRODUCTS
23. FLOW CHARTS
23.1. USING PRODUCT-TOKENS TO PROVIDE ADDITIONAL CONTENT
23.2. USING PRODUCT-TOKENS TO ENHANCE SEARCHES
23.3. GRAPHICAL USER INTERFACE FOR MANAGING AND USING PRODUCT-TOKENS
23.4. USING IMAGES OF OBJECTS TO GENERATE TOKENS AND PROVIDE ADDITIONAL CONTENT
23.5. USING PRODUCT-TOKENS AND USER DATA TO ENHANCE SEARCHES
23.6. HANDLING PRODUCT-TOKEN-BASED REQUESTS BY A SERVER
24. IMPLEMENTATION MECHANISMS

1. General Overview

Presented herein are the methods and systems for determining additional contents and products based on product-tokens.

Generally, there are several different types of tokens, including simple tokens, collaboration tokens, product-tokens, and others. Each of the different tokens may have a unique applicability and usability.

Product-tokens are the most relevant to the presented approach and are described in detail later. However, simple token and collaboration tokens are defined herein merely to provide some token-based background.

Simple tokens are generally used for a simple identification of things. A simple token may be a piece of digitally encoded information that uniquely identifies or captures the information included in, for example, a medium for which the token is being generated. The simple token may be represented as, for example, a numerical string, an alphanumeric string, a quick response (QR) code, or any type of label either digital or physical. The simple tokens are insignificantly relevant to the present approach.

Collaboration tokens are usually tokens that are markings that may correspond to universal unique identifiers (UUID) applied to products generated using, for example, a collaboration platform (described later). For simplicity of the description, the collaboration tokens are not to be confused with product-tokens, as described below.

1.1. Product Tokens

A product-token may be generated for any type of custom products or media. A custom product herein is understood as any type of product, such as a digital product, or a physical product that is customized using, for example, functionalities of a collaboration platform and by users, customers, designers, and the like. That may include a product that a user is designing, a product that a user has customized and ordered, a product that a user has received, a product that a user is sharing with a group of others, and the like. A custom product may also be a media product, such as a photograph uploaded by a user, a video recording uploaded by a user, a list of items, a digital invitation, a note, and the like. Other examples are provided later.

A custom product (digital or physical) may have associated, or generated, one or more product-tokens. Some of the product-tokens may be simple (e.g., some references embedded in the product or generated for the product); some other product-tokens may be complex, and they are of interest in the presented approach.

Some simple product-tokens (which may, or may not, be embedded in the products) may be scanned, and the scanned information may include hyperlinks that, for example, link back to an online shopping website. Those product-tokens may be represented using corresponding alphanumeric strings, or other codes, and may be used to perform simple (e.g., trivial) look-up for other products in a database table maintained by, for example, a collaboration platform. Those product-tokens are typically used to perform a mere string matching, and thus may be unessential to the presented approach.

Some other product-tokens may be complex and generated using advanced computer-based techniques described later. For simplicity of the description, the complex product-tokens are also referred to as product-tokens.

Product-tokens (i.e., complex product-tokens) may be generated using various techniques described later and that allow capturing certain features of the associated products. For example, a product-token generated for a custom product may be represented using encoded spatial representations of certain features identified in the product. The spatial representations and other methods for encoding product-tokens are described in detail later.

As described later, product-tokens may be generated using various approaches. According to one approach, a process of generating a product-token for a custom product includes determining, for example, a set of invariant features that are specific to the custom product. The invariant features may be transform-invariant features that, as explained later, remain invariant of any 2D transformation of the features. An example of an invariant feature may be a spatial relationship between multiple points of interest identified in a custom product. The spatial relationship between such points of interest remains invariant of any 2D transformation because regardless of, for example, scaling, shifting, or rotating of the custom product, the spatial relationships between the features remain the same.

1.2. Graph of Transform Invariant Features

Based on transform-invariant features determined for a custom product, a graph of transform invariant features may be generated. The graph, as described later, may represent relationships between some of the transform-invariant features and how some of the transform-invariant features are related to, or link with other transform-invariant features identified for the same custom product. A graph of transform-invariant features is also referred to as a GTIF.

A custom product may have one or more GTIFs created for the purpose of the presented approach. Hence, each of two or more custom products may have its own GTIF.

According to the present approach, one of the objectives is to find additional content that is in some way related to, for example, a custom product that a user created, generated, purchased, viewed, and the like.

GTIF-based product-token pairs may have additional context data. Examples of the additional context data may include location data based on GPS location data from a photo, address of an event, address of customers and users. The examples may also include social relationship data of a creator, or a recipient of a custom product. Furthermore, the examples of the additional context data may include time based data, the time that a given event, photo, or gift took place, and the like.

In some implementations, a GTIF associated with a product may be a GTIF comprising product-tokens that are associated with a Unique Universal Identifiers (UUIDs). A UUID may be associated with a product description, as disclosed, for example, in U.S. patent application Ser. No. 17/193,512.

Generating a GTIF product-token that references a product description may be performed using various approaches. According to one, non-limiting approach, generating a GTIF product-token for a custom product includes the following steps:

1. rendering a product view of a custom product description for the custom product having a product identifier (PID),
2. finding transform invariant features in the rendering of the custom product,
3. building a graph of the transform invariant features,
4. constructing a Universal Unique Identifier (UUID) for the product description, and
5. pairing the PID with the constructed GTIF to construct the GTIF product-token.

Other approaches for generating a GTIF product-token may also be implemented.

The process of generating a GTIF product-token may utilize, or build upon, the process of generating a RealView of a custom product. Examples of generating a Real View of a custom product are described in, for example, U.S. patent application Ser. Nos. 17/827,720, 17/827,721, and 17/827,722.

1.3. Graphs of Transform Invariant Features Matching

Finding the additional content that is in some way related to a particular custom product may be performed using various approaches described herein later. According to one approach, a GTIF is generated for a custom product, and the generated GTIF may be compared with other GTIFs generated for other products, photographs, videos, and the like.

Since finding and matching one GTIF to other GTIFs is non-trivial and increases non-linearly with the size of the possible data matches, neural networks and neural processing may be employed. Either way, however, the finding and matching process is usually an NP-hard problem. A problem is NP-hard if an algorithm for solving it can be translated into one for solving any NP-problem (nondeterministic polynomial time) problem.

An example of such processing is a semi-supervised learning (SSL) process that is an effective way of leveraging unlabeled data to reduce the reliance on labeled data. It allows adjusting neural processes (NPs) to the semi-supervised image classification task, resulting in an NP-Match, which implicitly compares data points when making predictions, and as a result, the prediction of each unlabeled data point is affected by the labeled data points that are similar to it, which improves the quality of pseudo-labels. Further, NP-match is able to estimate uncertainty that can be used as a tool for selecting unlabeled samples with reliable pseudo-labels. In general, however, finding the additional content is non-trivial, and certainly is different than a simple look-up, using a particular simple token, and a database table of simple tokens.

Finding and matching one GTIF to other GTIFs allows determining additional content that is in some way related to, or corresponding to, a particular custom product. This allows, for example, displaying additional information about additional products, related products, pictures, videos, and the like. For instance, if a custom product is a birthday invitation, then the corresponding additional content can link back to an online shopping website and cause displaying additional products related to the birthday invitation, such as happy birthday cards, birthday gifts, or the like.

According to another example, if a product is an invitation to a wedding, then the corresponding additional content can link back to a website and cause downloading photos from the wedding, or videos recorded by the guests who attended the wedding, prints of pictures from the wedding, and the like.

In one aspect, the presented approach allows displaying content constructed around, related to, or pertaining to life-related events of the users, and the like. In that context, an event is not viewed just as a single thing such as an invitation or other single product. Instead, the event is a collection of experiences that are constructed around, related to, or pertaining to people's lives. For example, a single thing (such as an invitation) may be linked to a gift, a gift exchange, commemoration of the event, like a family reunion, or the like.

Once the products that the users have ordered are known, the users can view the products on, for example, their smartphones that are communicatively connected with a computer collaboration platform (described in details later). The computer platform may cause presenting on, for example, the smartphones, some additional products that are related to the purchased products. The related products may be presented as an overlay displayed over the purchased products and/or using a redirection causing redirecting the users to another webpage.

1.4. Example Computer Configuration for Determining Additional Content

FIG. 1A is a block diagram showing an example computer configuration used in an approach for generating and determining additional contents and products based on product-tokens and using a digital product collaboration platform 100. Collaboration platform 100 (described in detail later) may comprise a product options framework 110, which may interact with various product collections 620, including guests lists, media moments, gifts, designs, relationships, products, and the like, all described later. Collaboration platform may also comprise standalone servers 100B and network of servers and computer resources 100A.

Suppose that a user 602A orders (element 604A) a picture of his high school graduation. In addition to receiving (element 604B) the order for the picture, the system may retrieve from for example, collections 620, several pictures from the same event that are linked with the high school graduation event, and display (element 604C) the pictures from the event.

Another scenario may be when user 602A is showing that picture (of, for example, his high school graduation) to another user 602B. The users may launch, for example, a software application executing by collaboration platform 100, and watch the picture as, for example, an overlay of other pictures or videos displayed over the graduation picture, and the like.

To implement the above and similar examples, a collaboration platform tracks the information about the custom products and about the users who ordered the custom products. The process of tracking various types of information and processing the tracked information may be implemented using, for example, a machine learning approach. The approach may use a machine learning model that first can be trained using various training data, and then can be utilized by the product-token-based approach described herein.

1.5. AI-Based Approaches

Additional relevant content may be automatically generated by an auto-generative or AI service to provide additional relevant content or derivative modified content that are contextually relevant to an individual user. Non-limiting examples of the AI services include Chat GPT, Stable Diffusion, and the like. The content modifications or additional content may be based on, for example, the information stored about the users and individuals interacting with the product collaboration platform.

Since it is known that a particular custom product was ordered by a particular user, and since there is a limited number of things that can be related or can pertain to the particular product and to the customer, the related products can be detectable (or identifiable) by a collaboration platform's software. The related products may be made available for displaying on a display device operated by the user. For example, once a user signs into a shopping application (by either launching the application and generating a product-token for the product, the platform can detect the limited number of things that are related to, or pertain to, the product and/or customer, and cause displaying the detected things on the user's display.

The display of the additional content, such as additional products and/or services, may be provided either as an overlay over the current display of, for example, the custom product, or in a separate webpage. Different ways of displaying the additional content are described later.

If the additional things (e.g., products, pictures, videos, and the like) are displayed as an overlay, then the customer may see both the custom product and the additional products on the same screen. This may be implemented as inverse rendering or multiple-layer rendering.

If the additional things are the custom products that are of the same kind as the custom product from which the product-token was generated (e.g., they all are invitations, or they all are birthday cards), then the customer may be displayed as an overlay sequence to allow the user to compare the related products.

If the additional things are the products that are different from the custom product, then the additional things may be displayed in any way that allows the user to compare the different groups of products. For example, if a collaboration platform shows a custom product and some additional products, then the additional products may be a series of, or variations of, the custom product or the related products. For instance, suppose that a custom product is an invitation for an event. The invitation may have an associated series of photos, and/or videos that were uploaded and associated with the invitation (via, for example, a product-token). Furthermore, the picture could be animated and become a video displayed as the customer holds up the phone.

The presented approach may be viewed as providing the functionalities implemented as an added layer of information of a custom product. The added layer may be added to allow presentations of various custom digital and/or physical products. Such presentations may be available by utilizing a product-token not just for one product, but also for the entire event or the users' experiences.

2. Generating Product-Tokens

The additional contents related to interactions between a user and a collaboration platform (which is described in detail later), certain media information associated or provided by the user may be determined based on so-called product-tokens. A product-token generated for an object may be a unique combination of data that makes the object unique and uniquely identifiable in a repository maintained by the collaboration platform. As described before, a product-token for a custom product may be determined based on a GTIF, which in turn, may be determined based on the transform invariant features of the custom product. The GTIF determined for the custom product may be compared with the GTIFs determined for other custom products, photographs, videos, and the like, to determine a match. As described before, that process is non-trivial, and may be performed using advanced neuro-based network approaches.

For example, a product-token generated for a photograph is a unique representation of the photograph and is unique to the photograph. The product-token may include, for example, a unique combination of the encoded entire content of the photograph, or a portion of the photograph, or a portion of the photograph combined with some additional information.

2.1. Example Configuration

Referring again to FIG. 1A, suppose that user 602A interacts with digital product collaboration platform 100. User 602A may use platform 100 to create, for example, a digital birthday card, and cause platform 100 to email the card to another user such as user 602B.

In some implementations, platform 100 is a distributed computer system implemented in one or more servers 100B and/or one or more cloud storage systems 100A. Platform 100 allows one or more modules of digital product collaboration platform 100 to cooperate with each other. Platform 100 is described in detail in FIG. 2A-2B.

In some embodiments, collaboration platform 100 comprises a product options framework 110. Product options framework 110 is a computer-based module implemented in the platform and configured to support interactions between users and the platform. The product options framework is described in detail in FIG. 2A.

2.2. Examples of Product-Tokens

In the case of a media photograph, a product-token may be generated based on a medium photograph provided to a collaboration platform or based on an image of a product ordered by the user. A product-token may also be generated based on a log of the interactions between the user and the platform or based on any other digital data associated with the user or based on a combination of various user-related information, as described later.

Figure 1B:
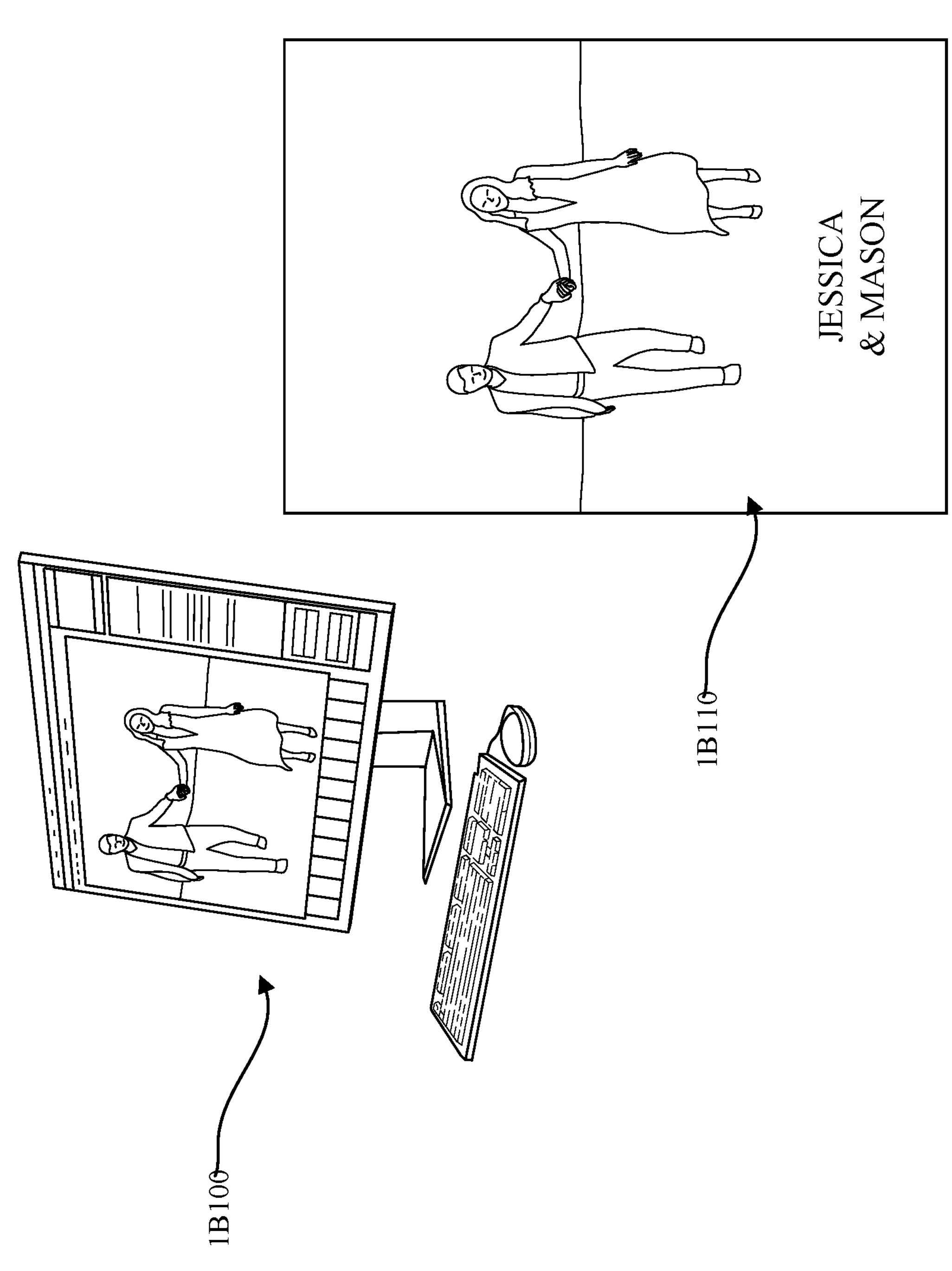
FIG. 1B is an example snapshot for generating and determining additional content and products based on product-tokens and using a digital product collaboration platform.

FIG. 1B is an example snapshot for generating and determining additional content and products based on product-tokens and using a digital product collaboration platform. FIG. 1B shows that a user is viewing a wedding invitation 1B100 that appears on the user's screen, as shown using an element 1B110.

There are many ways of generating additional content, in addition to the examples described above, the additional relevant content can be automatically generated by an auto-generative or AI service (such as Chat GPT, Stable Diffusion, and the like) to provide additional relevant content or derivative modified content that are contextually relevant to an individual user. The content modifications or additional content can be based on the information stored about the individuals interacting with the product collaboration platform.

2.2.1. Text-Based Product-Tokens

In situations when a product-token is generated based on a medium photograph (e.g., a photograph of a wedding invitation that was, for example, uploaded by a user to a user profile maintained by a collaboration platform), the product-token may be generated in a variety of ways provided that each of the generated product-tokens is unique. In the wedding invitation example, a product-token may be generated based on, for example, all text included in the invitation. Another product-token may be generated based on the names of the bride and groom included in the invitation or based on the names of the bride and groom combined with the date included in the invitation.

The above examples of product-tokens generated based on text included in the media should not be considered as limiting in any way, and certainly not limiting only to the example of wedding invitations. Text-based-product-tokens may be also generated based on pictures uploaded by a user to a collaboration platform, based on lists or notes provided by a user to a collaboration platform, and the like.

2.2.2. Text- and/or -Image-Based Product-Tokens

Continuing with the wedding invitation example, some tokes may be generated based on some graphics included in the invitation. For example, a product-token may be generated by executing a software application, such as an image parser or an image analyzer, that is configured to determine a color or a color combination present at certain points of the photograph. The identified color information may be used to generate a product-token. Other product-tokens may be generated based on some text included in the invitation combined with some portions of graphics included in the invitation. Yet other product-tokens may be generated based on color information present at various points of the wedding invitation, and alternatively combined with some text present in the invitation.

2.3. Different Product-Tokens for One Medium

Continuing with the wedding invitation example, since the names of the bride and the groom are unique to the invitation, and the names on another wedding invitation would be different, a text-based product-token generated for one wedding invitation would be different from a product-token generated for another invitation.

However, suppose that a user uploaded to a collaboration platform several photographs of the same wedding invitation. In each of those photographs the names of the bride and the groom will be the same. While in some situations, it might be desirable to generate the same product-token for each of such photographs of the invitation, most of the time, it might be desirable to have different product-tokens for each photograph even if each of the photographs depicts the same wedding invitation (but perhaps has a different graphical arrangement, or the like).

In such situations, to ensure that the product-tokens generated for different photographs (but depicting, for example, the same wedding event) are different, the corresponding product-tokens may be generated based on different types of information. For example, a product-token for a photograph may be generated based on a combination of the text and the graphics depicted in the photograph. Examples of different combinations are described later.

By generating product-tokens based on combinations of imagery, placement of text, and everything else related to the product, one may ensure that the product-tokens are indeed different for different photographs even if the photographs include some portions that are the same in all corresponding photographs.

Generating product-tokens based on combinations of text and imagery may include product-tokenizing of the text and product-tokenizing of the imagery and combining the product-tokenized components into a resulting product-token. More specifically, this may include determining a product-token portion based on the text and another product-token portion based on the imagery and combining both product-token portions into a resulting product-token.

A product-token, of the plurality of product-tokens, also referred to herein as a sub-product-token, can be used to link to, for example, a user profile of an individual within the group of individuals invited to a specific event. The linking between the users allows creating a relationship that can be used to, for example, assign the individual to sub-groups of attendees that are participating in specific events, such as a rehearsal dinner, bachelor party, bachelorette party, and the like.

In this approach, an individual (i.e., a user) may be treated as (or equated to) an entity, and thus the individual may be its own entity. The entity may be used to create connections between the individual and, for example, individual events, other product-tokens, other individuals, and the like. Such an organization of relationships and associations between the individuals, product-tokens, sub-product-tokens, and events provides many benefits. The benefits may include improvements to performing searches of additional content, creating groups and sub-groups of users/individuals, grouping the additional contents and related objects, and the like.

3. Example Image Analyzer

A medium image for which a product-token is to be generated may be processed by, for example, an image analyzer. The analyzer may be run by executing an image recognition program on the media image. The image analyzer described herein may be configured to, for example, parse the digital representation of the media image to identify certain points or areas in the image that depict certain objects or elements depicted in the medium.

Figure 1C:
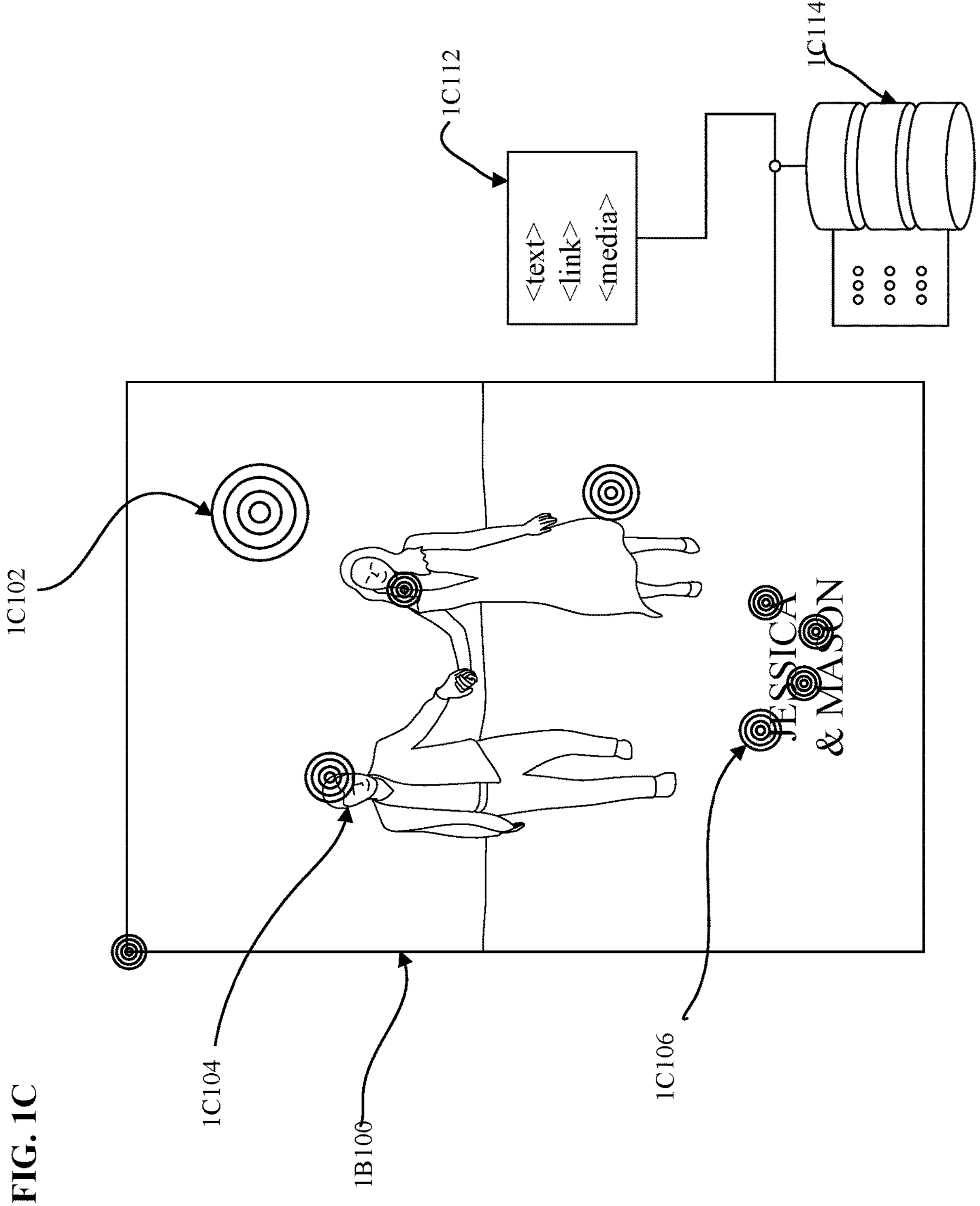
FIG. 1C is an example snapshot for generating and determining additional content and products based on product-tokens and using a digital product collaboration platform.
Figure 1D:
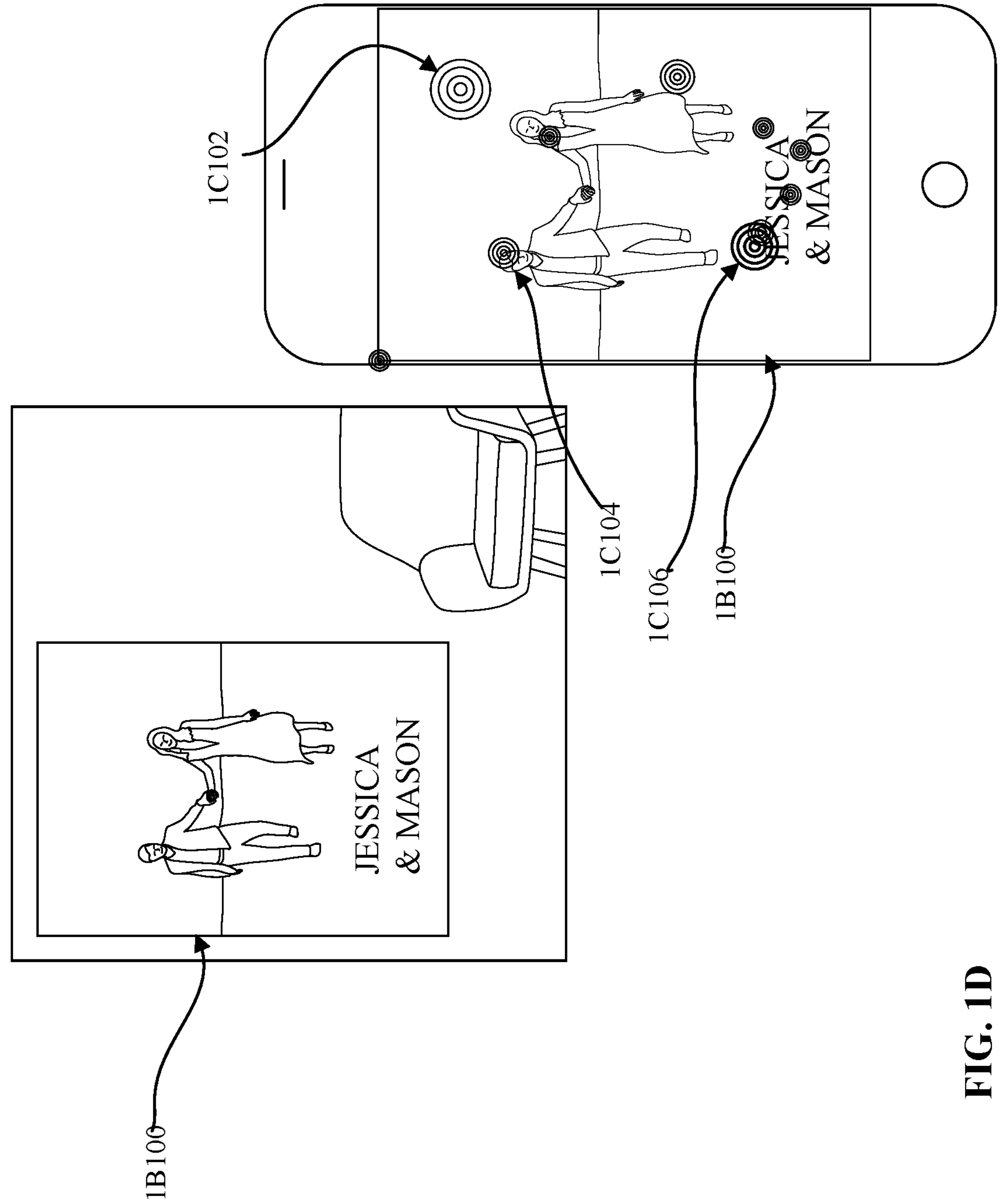
FIG. 1D is an example snapshot for generating and determining additional content and products based on product-tokens and using a digital product collaboration platform.
Figure 1D:
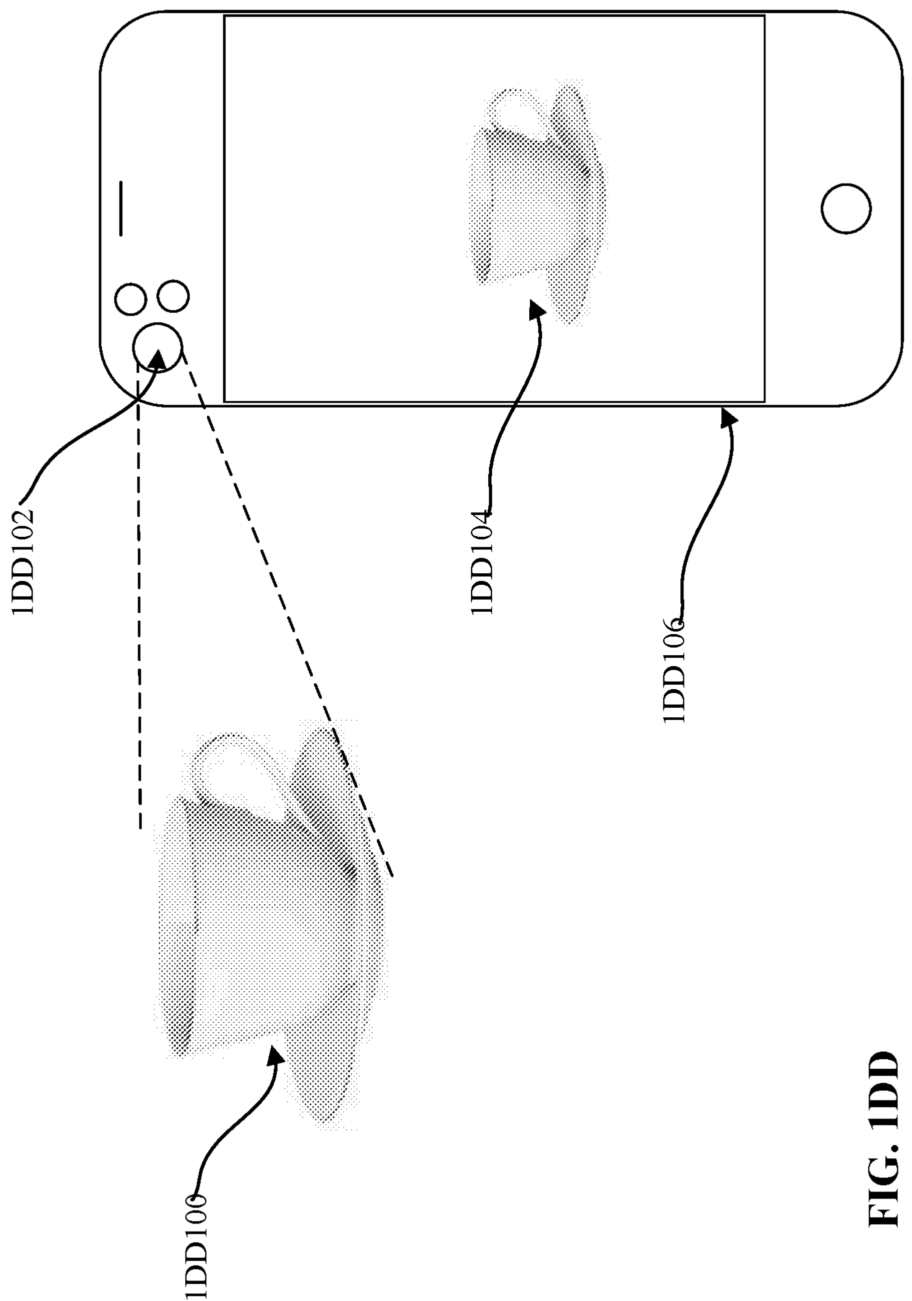
Figure 1D:
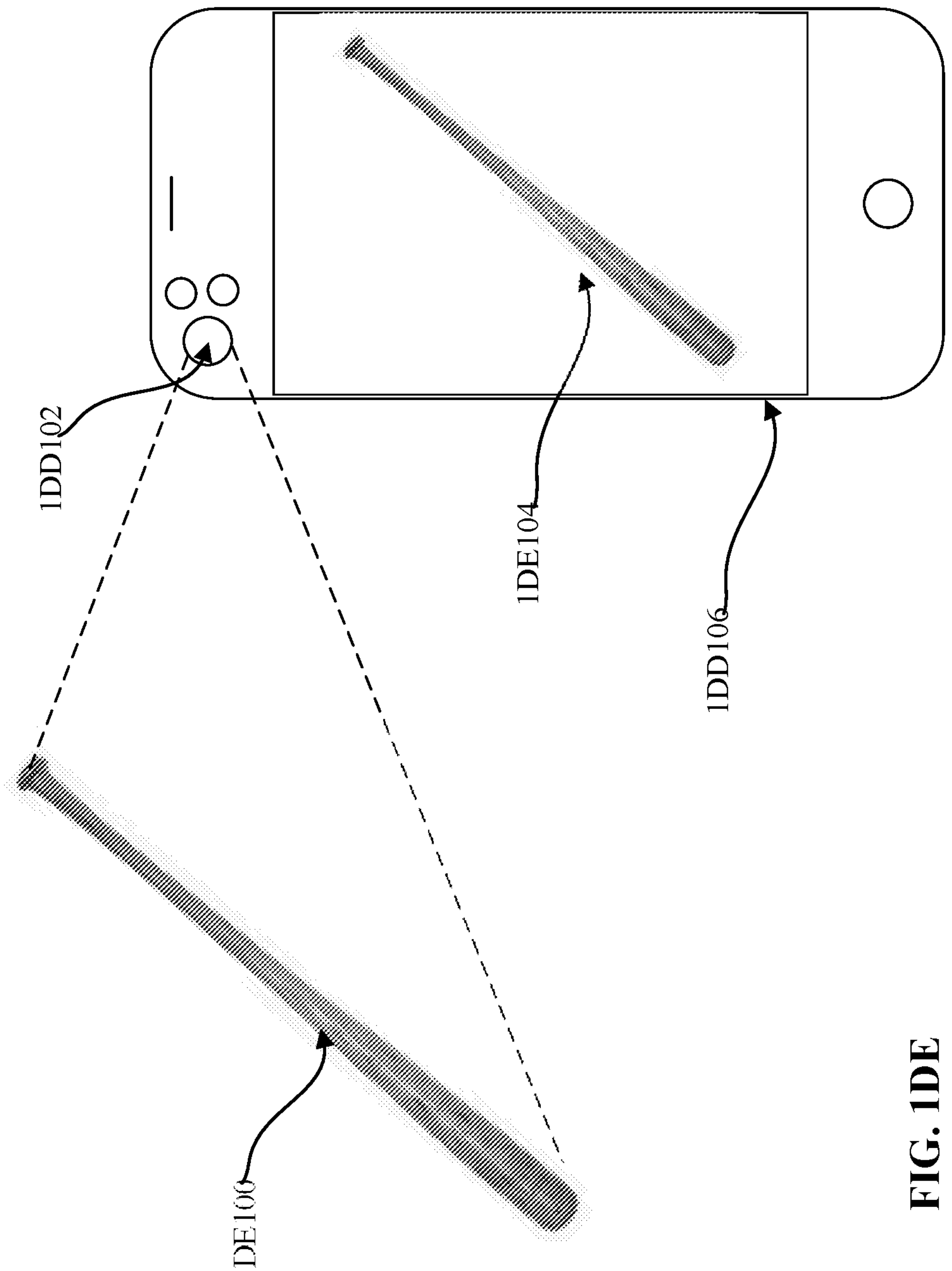
Figure 1D:
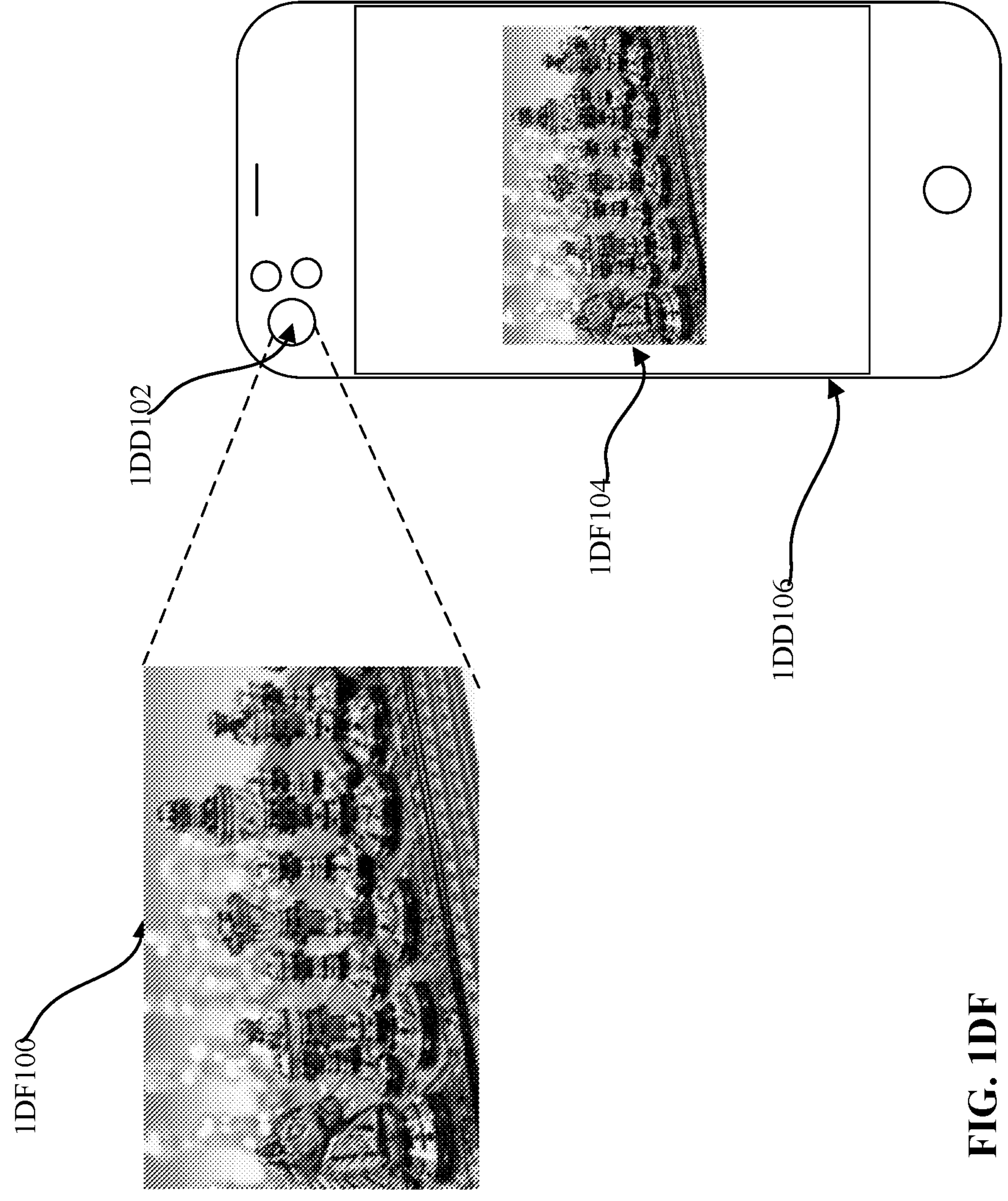
Figure 1D:
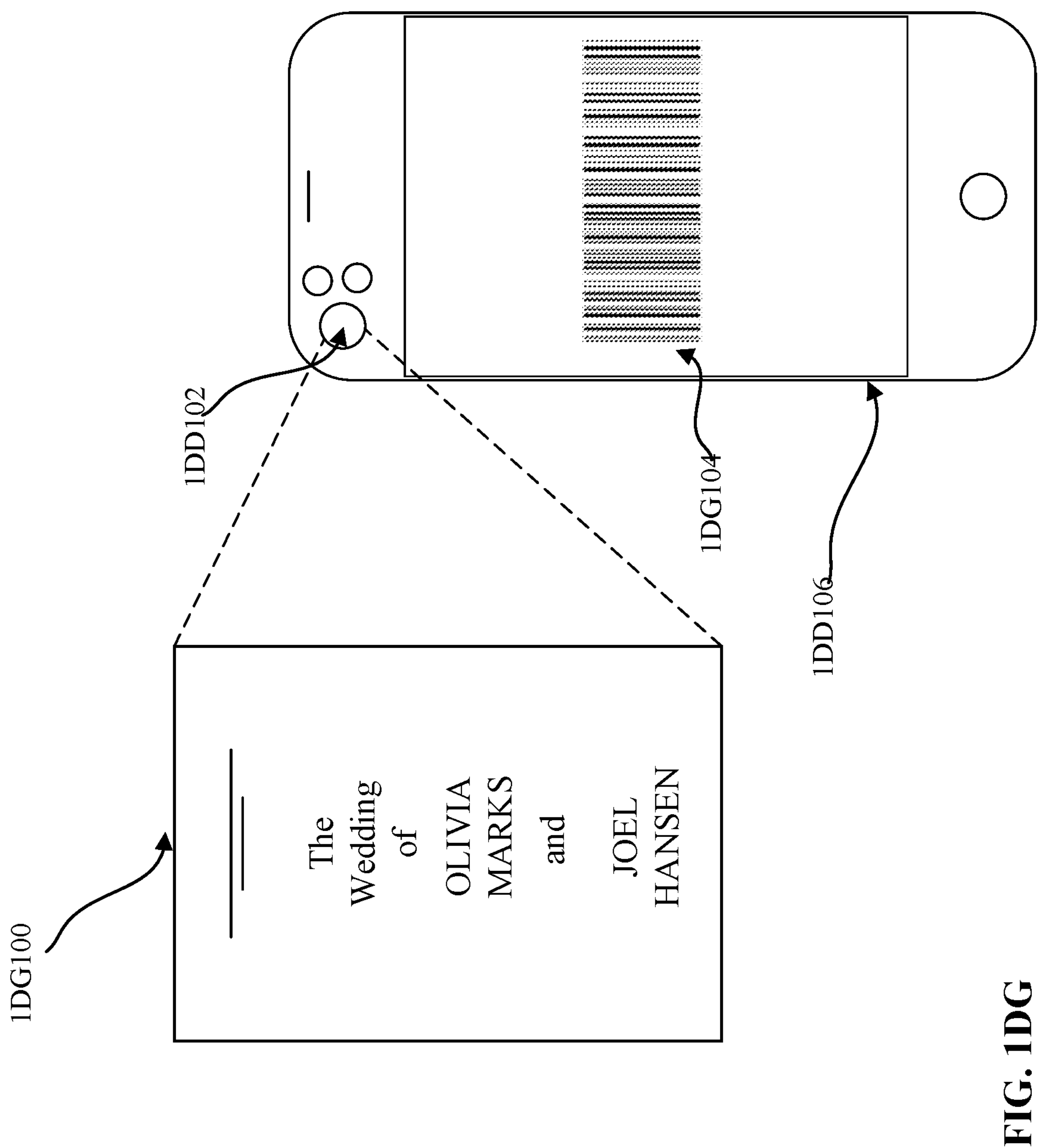
Figure 1D:
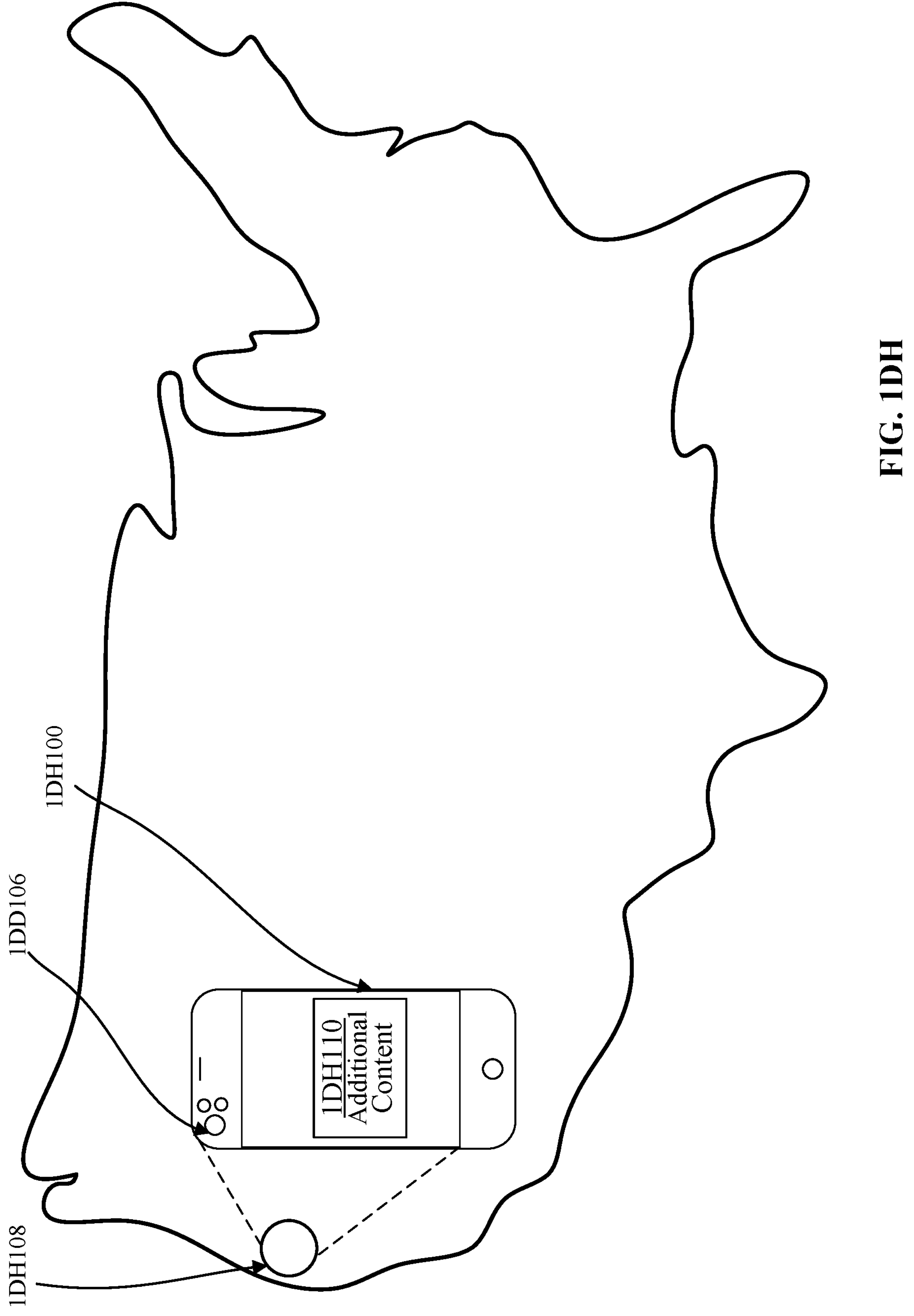
Figure 1D:
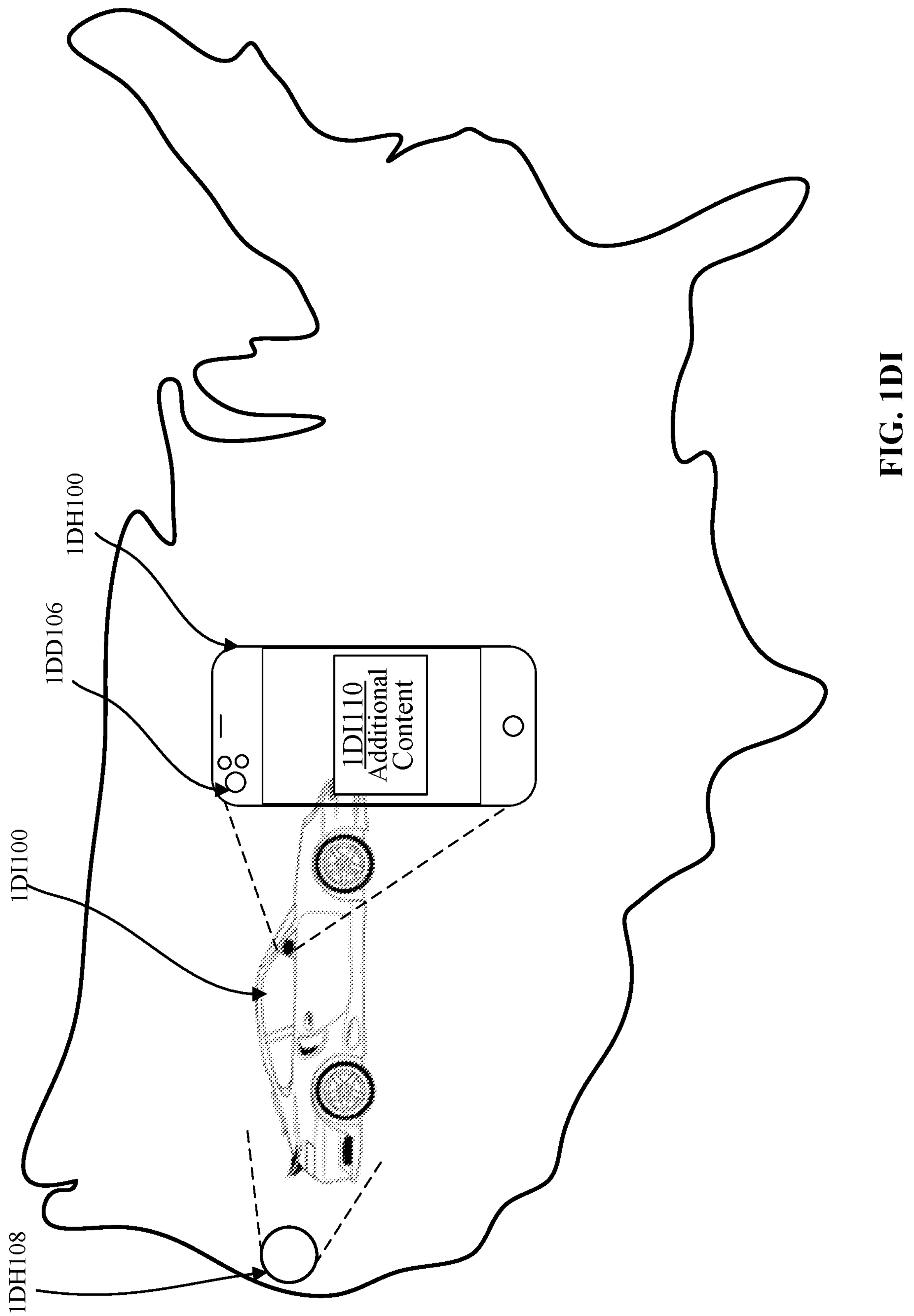
Figure 1D:
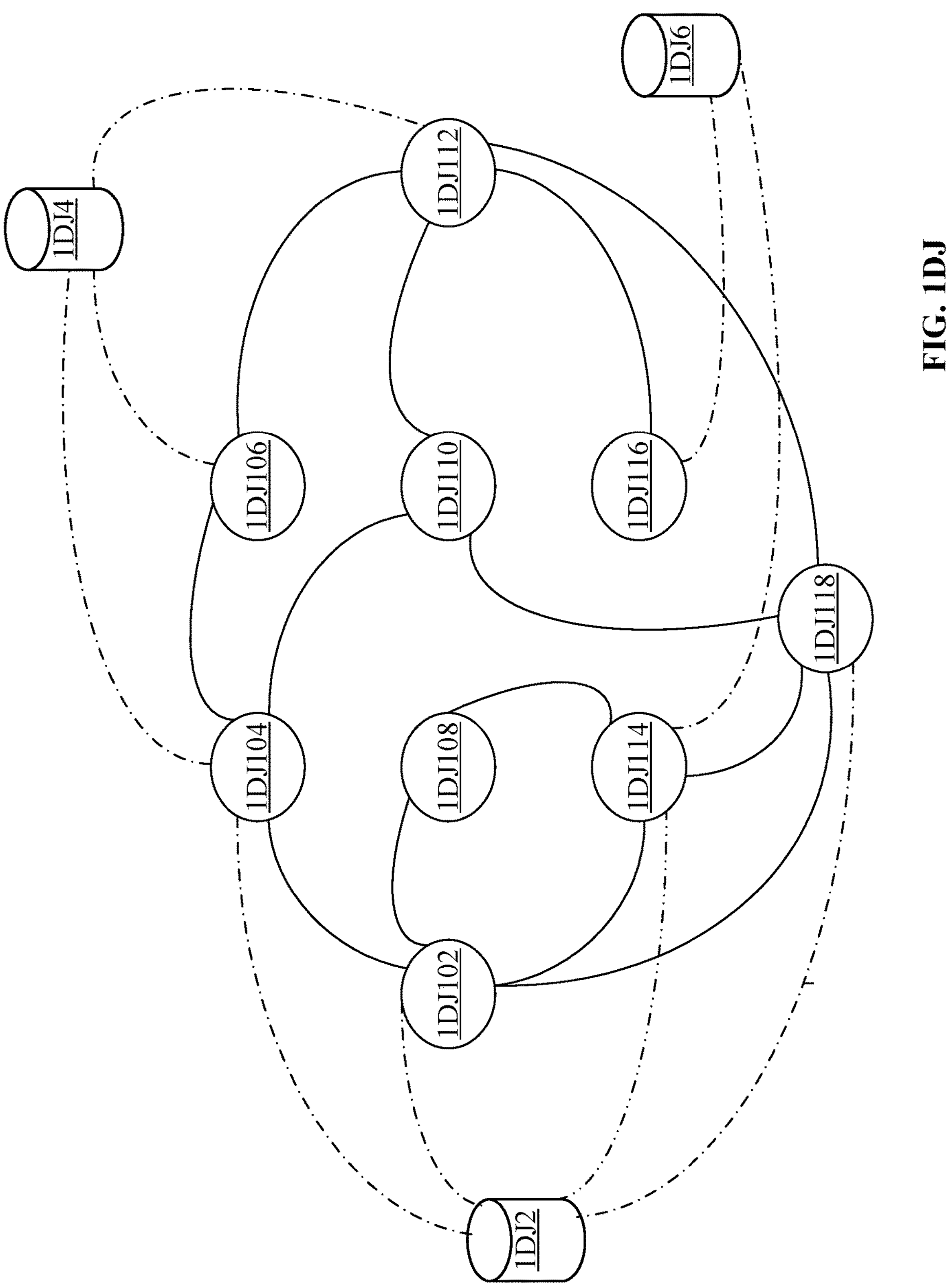

An image analyzer may be configured to, for example, recognize a presence of human faces in a media image, depictions of animals, and/or depictions of flowers, depictions of trees, and the like. Examples of areas recognized in a media image are depicted in FIG. 1C-1D. Examples of image analyzers include Surf™, and the like.

FIG. 1D is an example snapshot for generating and determining additional content and products based on product-tokens and using a digital product collaboration platform. The depicted example pertains to the same wedding invitation as wedding invitation 1B100 shown in FIG. 1B-1C.

Both FIG. 1C and FIG. 1D depict several interest-points shown using circles 1C102, 1C104, 1C106. Each interest point is marked using three or four concentric circles, as for example, 1C102 shown in FIG. 1C. The centers of the circles may mark the points of interest and form a geometric pattern, which may be encoded into a product-token.

In this context, an image analyzer is configured to recognize, for example, the presence of a human face in a media image, but it may not be necessarily configured to recognize a person who is depicted in the image. While recognizing, for example, the individual persons may be helpful in other implementations, recognizing the individual persons may not be necessary for the purpose of generating product-tokens.

For the purpose of generating image-based-product-tokens, it is sufficient to just recognize a presence of a human face in the media image as such a process is usually faster than a process for recognizing and identifying individual persons. Thus, executing the presented analyzer puts fewer demands on the system resources (such a bandwidth) than the person's identification analyzer.

An image analyzer may be configured to parse an image, identify certain single points (i.e., pixels) of some areas of the image, and use an image recognition module of the image analyzer to generate an image-based product-token.

4. Generating Product-Tokens from Multiple Medium Components

Continuing with the above example of a medium image, a product-token for such an image may be generated based on one or more product-token components. For example, once an image analyzer finishes parsing the image and determines one or more image-based product-token components of the image, the image-based-product-token components may be combined to form a resulting product-token.

5. Feature Matching 5.1. Transform Invariant Features

A product-token may be generated for any type of custom products or media. Some simple product-tokens (which may, or may not, be embedded in the products) may be scanned, and the scanned information may include hyperlinks that, for example, link back to an online shopping website. Those product-tokens are typically used to perform a mere string matching, and thus may not be essential to the presented approach.

Some other product-tokens may be complex and generated using advanced computer-based techniques described later. For example, a product-token generated for a custom product may be represented using encoded spatial representations of certain features identified in the product.

In some implementations, a process of generating a product-token for a custom product includes determining, for example, a set of invariant features that are specific to the custom product, and that remain invariant of any 2D transformation of the features. An example of an invariant feature may be a spatial relationship between multiple points of interest identified in a custom product. The spatial relationship between such points of interest remains invariant of any 2D transformation because regardless of, for example, scaling, shifting, or rotating of the custom product, the spatial relationships between the features remain the same.

5.2. Graph of Transform Invariant Features

Based on transform-invariant features determined for a custom product, a GTIF may be generated. The graph may represent relationships between some of the transform-invariant features and how some of the transform-invariant features are related to, or link with other transform-invariant features identified for the same custom product.

A custom product may have one or more GTIFs created for the purpose of the presented approach. According to the present approach, one of the objectives is to find, based on GTIFs, additional content that is in some way related to, for example, a custom product that a user created, generated, purchased, viewed, and the like.

5.3. Graphs of Transform Invariant Features Matching

Finding the additional content that is in some way related to a particular custom product may be performed using various approaches described herein later. According to one approach, a GTIF is generated for a custom product, and the generated GTIF may be compared with other GTIFs generated for other products, photographs, videos, and the like.

A GTIF used as a key for a comparison and finding a custom product may be constructed based on a rendering of that product's product description, which is disclosed in U.S. Pat. No. 11,558,394. A corresponding GTIF product-token may be linked to a specific product description using a unique identifier.

Finding and matching one GTIF to other GTIFs is non-trivial and increases non-linearly with the size of the possible data matches. The finding and matching process is usually an NP-hard problem. i.e., can be translated into one for solving any NP-problem.

Finding and matching one GTIF to other GTIFs allows determining additional content that is in some way related to, or corresponding to, a particular custom product. This allows, for example, displaying additional information about additional products, related products, pictures, videos, and the like. For instance, if a custom product is a birthday invitation, then the corresponding additional content can link back to an online shopping website and cause displaying additional products related to the birthday invitation, such as happy birthday cards, birthday gifts, or the like.

5.4. Feature Matching

Some product-tokens may be generated using an approach referred to as a feature matching. Indeed, the approach of identifying certain patterns in a media image is usually referred to as a feature matching. According to that approach, an image analyzer finds, for example, sharp corners and unique features in the image, and then finds, for example, spatial relationships between the features and uses the information about the spatial relationships between the features to generate product-tokens.

Referring again to FIG. 1D, suppose that, for a particular image, an image analyzer determined a few areas of interest, each of which is depicted in FIG. 1D as a set of concentric circles 1C102, 1C104, 1C106 (i.e., targets or bubbles). An area (i.e., a target or a bubble) may have a specific location within the image, may capture the color information at the specific location, and the like. The area may indicate a unique point (or a unique area) in the image, a unique color in the area, and the like.

The particular points identified in the specific area refer to the corresponding content and may be used to generate an image-based-product-token component/portion of a resulting product-token.

One or more image-based-product-token portions may be combined to form a resulting product-token. The combining may be performed by, for example, concatenating the corresponding image-based-product-token portions or by encoding the portions using, for example, a simple code to form the resulting product-token. Any other approach for forming the resulting product-token from the image-based-product-token portions may also be applied.

In some situations, one or more image-based-product-token portions generated/determined for a media image may be combined with text-based-product-token portions identified for the media image.

In some implementations, a product-token represents an array or a collection of points (or areas) identified in a media image. The product-token may also be a pattern determined based on the collection of points identified in the media image. In other implementations, a product-token may be defined as a combination of gradients determined for the concentric bullseye points identified in the media image. For example, in some cases, a histogram of the gradients may be used as a base for generating a product-token, while in some other cases, a histogram and some additional information may be used as a base for generating a product-token.

In some implementations, a product-token for a media image may also include information about distances between, or coordinates of, the specific areas identified in the image. For example, a distance between two bubbles may be represented by a line segment drawn from one bubble to another bubble. A length of the line segments or its coordinates may be used to form a distance-based-product-token portion of the product-token. The distance-based-product-token portion of the product-token may be combined with other product-token portions to form a resulting product-token.

In some implementations, if an image analyzer identified three or more bubbles, the bubbles may be connected using "imaginary" line segments, and the depiction of the imaginary line segments may form a unique pattern. The pattern may be translated into a pattern-based-product-token portion and either used as a resulting product-token or combined with other product-token portions to form a resulting product-token.

In this approach, the image analyzer finds several features in the medium image, and then based on those features or spatial relationships between the features, determines a pattern that is used to form a product-token. As mentioned before, that approach is referred to as feature finding and matching.

The examples described herein are provided to merely illustrate some examples of various ways of generating/determining product-tokens and/or product-token portions/components. Other ways of determining product-tokens may also be implemented.

5.5. Pattern Matching

A pattern is perceived as an organized composition of elements that is the opposite of an unorganized composition. The pattern may be viewed as a repetitive model that can be identified across a large set of data values belonging to the same domain.

A pattern matching can be defined as a process of searching for a specific sequence or placement of characters in a given set of data.

Usually, pattern matching produces definitive results: the input string either contains the pattern (is valid) or it doesn't (is invalid). In case the string does not contain the required pattern, the matching process is often extended to pattern transformation, in which sub data elements are extracted from the input value and then reformatted to build the required pattern.

Pattern matching algorithms usually work with regular expressions, also referred to as regexes. Regular expressions instruct computer programs which pattern to look for in testing data. On occasion, the program may be written to be able to pick patterns from a set of data values and automatically generate a regex. Some programs or tools have a built-in regex library that contains commonly used patterns, such as credit card number, U.S. phone numbers, date time formats, email addresses, etc.

An example pattern matching algorithm may include several steps. The first step is to define the regex that communicates the pattern of, for example, a valid geometric pattern built from special relationships between the concentric bullseyes shown in, e.g., FIG. 1C-1D. Since defining regexes manually is tedious and requires some expertise, often data standardization tools that offer visual regex designers may be used.

In the next step, the algorithm performs a validation. As data pattern matching differentiates between valid and invalid information, it is mostly used to validate forms submitted on websites or other software applications. The regex may be applied on the form fields as needed.

Additional steps and the step variations may depend on the implementation or the way the product-tokens are defined.

6. Feature Invariant Patterns

One of the aspects of the presented approach is that it provides for a scale invariant feature transform. According to that aspect, a product-token or a pattern generated for a media image is independent from any 2D transformation of the image. Therefore, regardless of how the image is transformed (e.g., rotated, scaled, translated, and the like) the pattern remains the same. For example, if a pattern is generated based on the points (e.g., the bubbles) identified in the media image and connected to form a polygon, then even if the image is rotated, translated, or scaled, the pattern remains the same. Thus, the pattern remains independent from the 2D transformations.

Referring again to FIG. 1D, a pattern may be created based on the location and spatial relationships between the identified bubbles. Suppose that the bubbles are connected using corresponding line segments to form a polygon. The polygon may be used as a pattern. The pattern, however, remains the same regardless of any 2D transformation performed on the media image. For example, if the image is scaled up, or scaled down, or rotated, the pattern, or its shape, remains the same. Hence, the pattern is unique to the image. Therefore, the pattern may be used to uniquely identify the image, and thus may be used as a product-token or to form a product-token.

7. Generating Product-Tokens from Images of Physical Objects 7.1. Product-Tokens from Images of Physical Objects Product-tokens may be generated from a variety of items, including both digital and physical objects. While the process of generating the product-tokens from various objects may generally be the same, the utility and the scope of the corresponding product-tokens may be different. For example, quite often, for the purpose of generating product-tokens for performing searches for additional content, the product-tokens generated from digital objects may have a broader applicability than the product-tokens generated from physical objects.

For at least the above reasons, it is desirable to represent some physical objects as corresponding digital objects, and then generate the corresponding product-tokens from the digital product-tokens and use those product-tokens to request and obtain additional content for the physical objects.

FIG. 1DD is an example snapshot for generating product-tokens from physical objects. In the depicted example, a physical object (such as a teacup 1DD100, or any other physical item purchased from, for example, an online shopping website, or the like), is photographed using a camera (such as a camera 1DD102 installed in a smartphone 1DD06, or any other scanning device) to capture a digital image 1DD104 of physical object 1DD100. Other examples of physical objects may include physical mementos, physical invitations, gifts, and the like. Other examples of other scanning devices may include standalone scanners, scanners implemented in standalone cameras, and the like.

Then a product-token is generated based on digital image 1DD104. The product-token is linked, or otherwise, associated with the objects such as the physical object or the objects including objects related to physical object 1DD100.

The digital image of the physical object may be used to either generate new product-tokens or to associate the digital image with the product-token or the product-tokens that have been already generated for the related objects, either digital or physical.

FIG. 1DE is an example snapshot for generating product-tokens from physical objects. As illustrated in FIG. 1DE, suppose that a user has a baseball bat 1DE100. The user may take a picture of the baseball bat and upload the picture as a digital image 1DE104. This would amount to creating digital image 1DE104 of baseball bat 1DE100. Digital image 1DE104 of the physical baseball bat, may be product-tokenized. The created product-token may be associated with a digital product that is the same as, or similar to baseball bat 1DE100.

The product-token may be linked with, for example, the data associated with a particular baseball bat, a group of baseball bats, the baseball bats from a particular manufacturer, the similar baseball bats, and the like. According to another example, the data may be associated with, for example, a group of baseball bats that are offered by a corresponding collaboration platform or a corresponding online shopping platform.

Generally, this approach allows expanding groups of items and products that are related to each other and are linked via product-tokens. According to this approach, a digital image of a physical product may be linked with many other items that are in some way related to the physical product. The linking allows determining and providing the corresponding additional contents to the users, which otherwise would not be accessible to the users based on the physical products.

The approach eliminates, for example, situations in which some objects (including, for example, some physical objects) are randomly stored in a database of objects and, because they appear to be vaguely related to other objects available from a collaboration platform, they may not be linked to any additional contents.

Having physical objects linked with different digital objects or groups of digital objects, allows expanding the groups of related products and items to facilitate providing corresponding additional contents to the users. This may be particularly useful in allowing a collaboration platform to expand the scope of links (leading to, for example, additional contents) that may be presented to a user, and to offer to the user various additional products that the user may view and/or purchase from online shopping platforms.

Furthermore, the presented approach creates new products on the "fly" as a result of input from a real world object. Digital images created by capturing real physical objects and the product-tokens generated from or for the digital images may be used to expand the capabilities of collaboration platforms and/or online shopping platforms. This is because using the presented approach, new product-tokens may be created, the new product-tokens may be used to represent additional associations between the digital images (and the corresponding physical objects) and new objects, new products, and the like.

Another benefit of the presented approach may be illustrated using the example depicted in FIG. 1DF. FIG. 1DF is an example snapshot for generating product-tokens from physical objects. According to FIG. 1DF, suppose that a user took some photographs of several valuable objects in his house, such as a vintage chess set 1DF100. Other examples of valuable objects may include valuable paintings hanging on the walls, antique furniture in the user's house, the user's collection of porcelain dishes, the user's stamp collection, some Persian carpets, a collection of books, and the like. The object may be scanned using camera 1DD102, and a scanned image 1DF104 (corresponding to physical object 1DF100) may be product-tokenized and associated with other product-tokens and/or data.

The associated data may include, for example, additional information of the corresponding physical objects, such as stories associated with the objects, histories of the objects, information about the circumstances in which the object was purchased, as well as links to similar products or establishments from which the similar products could be purchased. That type of information may be particularly useful as family memorabilia that may be viewed and cherished for the family generations to come. The presented approach allows creating the links to such valuable information automatically and conveniently.

7.2. Feature Recognition Approaches 7.2.1. SIFT

Scale-invariant feature transform (SIFT) is a computer vision algorithm to detect, describe, and match features in images. Applications of SIFT include object recognition, robotic mapping and navigation, image stitching, 3D modeling, gesture recognition, video tracking, individual identification of wildlife and the like.

According to SIFT, key points of objects are extracted from a set of reference images and stored in a database. An object is recognized in a new image by individually comparing each feature from the new image to objects stored in the database and finding candidate matching features based on Euclidean distance of their feature vectors. From the full set of matches, subsets of key points that match the object and its location, scale, and orientation in the new image are identified to filter out good matches.

Determining consistent clusters is performed rapidly by using, for example, an efficient hash table implementation of, for instance, the generalized Hough transform. Each cluster of three or more features that agree on an object and its pose is then subject to further detailed model verification and subsequently outliers are discarded.

Finally, the probability that a particular set of features indicates the presence of an object is computed, given the accuracy of fit and number of probable false matches. Object matches that pass all these tests can be identified as correct with high confidence.

In some implementations, a SIFT feature descriptor and matcher are used to implement feature matching between two images. SIFT may be used to find the feature key points and descriptors in the images, and a matcher may be used to match the descriptors in both images.

To implement feature matching between two images using a SIFT feature detector and matcher, the required libraries, such as OpenCV, Matplotlib and NumPy are usually imported and installed. Then two input images are usually imported using, for example, cv2.imread( ) method as grayscale images. The full paths for the images are usually specified.

In the next step, a SIFT object with default values is usually specified using, for example, sift-cv2.SIFT_create ( ). Then the keypoints 'kp1' & 'kp2' and descriptors 'des1' & 'des2' are usually detected and computed in both input images using, for example, sift.detectAndCompute( ). Subsequently, a BFmatcher object bf=cv2.BFMatcher( ) and match the descriptors are created using, for example, BFmatcher object as bf.match(des1, des2). It returns the matches. The matches are then sorted based on their distances.

In the next step, the matches are drawn on the original input images using, for example, cv2.drawMatches( ).

Optionally, the descriptors can be matched using the BFmatcher object method bf.knnMatch(des1,des2, k=2). The ratio test may be applied to the matches to obtain best matches. Then the best matches may be drawn using, for example, cv2.drawMatchesKnn( ), and the keypoint matches may be visualized.

7.2.2. SLAM

Simultaneous localization and mapping (SLAM) is the computational problem of constructing or updating a map of an unknown environment while simultaneously keeping track of an agent's location within it. There are several algorithms known for solving it in, at least approximately, tractable time for certain environments. Popular approximate solution methods include a particle filter, extended Kalman filter, covariance intersection, Graph SLAM, and the like. SLAM algorithms are based on concepts in computational geometry and computer vision, and are used in, for example, odometry for virtual reality or augmented reality.

SLAM algorithms are tailored to available resources and are not aimed at perfection but at operational compliance.

In some implementations, a real-time SLAM library is used to perform a visual, visual-inertial, and multimap SLAM with monocular, stereo and RGB-D cameras, using pin-hole and fisheye lens models. In all sensor configurations, ORB-SLAM3 is as robust as the best systems available in the literature, and significantly more accurate.

7.2.3. SURF

Speeded Up Robust Features (SURF) is a fast and robust algorithm for local similarity invariant representation and comparison of images. The main interest of the SURF approach lies in its fast computation of operators using box filters, thus enabling real-time applications such as tracking and object recognition.

Feature detection and matching is an important task in many computer vision applications, such as structure-from-motion, image retrieval, object detection, and more. SURF is designed for local feature detection and matching.

A feature is a piece of information which is relevant for solving the computational task related to a certain application. Features may be specific structures in the image such as points, edges, or objects. Features may also be the result of a general neighborhood operation or feature detection applied to the image.

The features can be classified into two main categories: (a) the features that are in specific locations of the images, such as mountain peaks, building corners, doorways, or interestingly shaped patches of snow (these kinds of localized features are often called keypoint features (or even corners) and are often described by the appearance of patches of pixels surrounding the point location), and/or (b) the features that can be matched based on their orientation and local appearance (edge profiles) are called edges and they can also be good indicators of object boundaries and occlusion events in the image sequence.

Some of the main components of the feature detection and matching include (a) Identifying the interest point, (b) describing the local appearance around each feature point in some way that is invariant under changes in illumination, translation, scale, and in-plane rotation. We typically end up with a descriptor vector for each feature point, and (c) comparing the descriptors across the images, to identify similar features.

For two images, a set of pairs (Xi, Yi)↔(Xi', Yi'), where (Xi, Yi) is a feature in one image and (Xi', Yi') its matching feature in the other image.

An interest point or a feature point is the point which is expressive in texture. The interest point is the point at which the direction of the boundary of the object changes abruptly or the intersection point between two or more edge segments.

A feature descriptor is an algorithm which takes an image and outputs feature descriptors/feature vectors. Feature descriptors encode interesting information into a series of numbers and act as a sort of numerical "fingerprint" that can be used to differentiate one feature from another.

Features matching or generally image matching, a part of many computer vision applications such as image registration, camera calibration and object recognition, is the task of establishing correspondences between two images of the same scene/object. A common approach to image matching consists of detecting a set of interest points each associated with image descriptors from image data. Once the features and their descriptors have been extracted from two or more images, the next step is to establish some preliminary feature matches between these images.

7.3. Graph of Transform Invariant Features

Based on transform-invariant features determined for a custom product, a graph of transform invariant features may be generated. The graph, as described later, may represent relationships between some of the transform-invariant features and how some of the transform-invariant features are related to, or link with other transform-invariant features identified for the same custom product. A graph of transform-invariant features is also referred to as a GTIF.

A custom product may have one or more GTIFs created for the purpose of the presented approach. Hence, each of two or more custom products may have its own GTIF.

According to the present approach, one of the objectives is to find additional content that is in some way related to, for example, a custom product that a user created, generated, purchased, viewed, and the like.

Finding the additional content for a particular custom product may be performed using, for example, a GTIF-based approach. According to that approach, a GTIF is generated for a custom product, and the generated GTIF may be compared with other GTIFs generated for other products, photographs, videos, and the like. Finding the additional content is non-trivial, and certainly is different than a simple look-up, using a particular simple token, and a database table of simple tokens.

Finding and matching one GTIF to other GTIFs allows determining additional content that is in some way related to, or corresponding to, a particular custom product. This allows, for example, displaying additional information about additional products, related products, pictures, videos, and the like. For instance, if a custom product is a birthday invitation, then the corresponding additional content can link back to an online shopping website and cause displaying additional products related to the birthday invitation, such as happy birthday cards, birthday gifts, or the like.

FIG. 1DJ is an example graph of transform invariant features. The examples of interrelated product-tokens in FIG. 1DJ are labeled with the following labels: 1DJ102, 1DJ104, 1DJ106, 1DJ108, 1DJ110, 1DJ112, 1DJ114, 1DJ116, and 1DJ118, while examples of storage devices for storing examples of additional content are labeled with the following labels: 1DJ2, 1DJ4 and 1DJ6. Other implementations of the graphs of interrelated product-tokens may have different organization, a different count of product-tokens, a different count of storage devices, and the like.

The depicted example shows that certain product-tokens may be interrelated with other product-tokens and a product-token, from a set of product-tokens, may be related with one or more other product-tokens from the set of product-tokens. Furthermore, a product-token from a set of product-tokens may be associated, either directly or indirectly, with one or more storage devices, from a set of storage devices.

Product-tokens, as described before, may encode various types of information and identifiers that, in combination, uniquely encode the product-token.

In some implementations, the product-tokens may be organized, or represented, using a graph in the form of a star graph. In other implementations, the product-tokens may be organized, or represented, using a graph in the form of a hierarchical tree. These examples should not, however, be understood as limiting in any way, or excluding other organization of the product-tokens.

The product-tokens may be associated with, for example, events. For instance, a product-token may be associated with a wedding event, and the product-token may be interrelated with other product-tokens that link to other events, objects, users, and the like. For example, if a particular product-token is associated with a particular wedding event, then an additional product-token linking, e.g., photographs from that wedding may be interrelated with the particular product-token, and thus the photographs from that wedding may be accessed by traversing the corresponding graph of the interrelated product-tokens.

According to another example, if a particular product-token is associated with a particular wedding event, then a first additional product-token linking, e.g., a guest list of the guests attending the wedding and a second additional product-token linking, e.g., wedding wishes from each of the guests may be interrelated with the particular product-token and the first/second additional product-token. Therefore, a user may access not only the additional information about the wedding, but also the list of guests and the wedding wishes from the guests by following the links available from the graph of the interrelated product-tokens.

8. Associating Product-Tokens with Products

Product-tokens may be generated, or determined, for a variety of products. Once a product-token is generated for a media image and provided, or otherwise uploaded by a user to a collaboration platform, the product-token may be imprinted on the image or otherwise associated with the image.

According to another example, once a product-token is generated for a product that is being ordered by a user and/or is to be delivered to the user as a physical product, the information about the product-token may be encoded in the manufacturing instructions generated for manufacturing the physical product, and then used to generate the physical product-token and embedded on the physical product. Such a product-token may be a QR code, a UUID code, a label, and the like.

According to another example, once a product-token is generated for a digital product ordered by a user, the information about the product-token may be printed, or otherwise embedded, in the digital product provided or otherwise displayed for the user.

A product-token attached, included, or otherwise imprinted in a product (digital or physical) may be scanned by a user to obtain or request some additional content. The additional content may include additional hyperlinks for additional information in which the user may be interested. The additional content may also include hyperlinks to additional photographs, additional comments, additional notes, and the like that, for a variety of reasons, have been determined as relevant to the user's interests or objectives. The additional content may also include hyperlinks to additional products or a digital "carousel show" of some additional products that the user might be interested in and that may be provided by, or otherwise available from a collaboration platform.

9. Associating Additional Content with Product-Tokens

Once a product-token is generated or determined for, for example, a media image and embedded or affixed to the image, the product-token may be used to create an association between the product-token and additional contents relevant to the image or to the user who created or uploaded the image. The product-token may be used as a key to identify, or cause downloading the additional data that operators of a collaboration platform or users have associated with the product-tokens.

Because of the unique nature of a product-token (which is due to, for example, a product-token-corresponding-pattern having a unique positioning, colors, and attributes of the corresponding bubbles), the product-token may be used to uniquely index the additional content, such as additional information, additional images, additional products, and the like.

10. Using Product-Tokens to Request Additional Content 10.1. Using Simple Product-Tokens In some implementations, a user may scan a product-token affixed to, or embedded in, a medium image. The scanning may be performed using a software application executing on a user-client device and configured to communicate with a scanning device or a camera. The product-token can be communicated to a server application executing on a server device of, for example, a collaboration platform.

FIG. 1DG is an example snapshot for generating product-tokens from objects. In the depicted example, a digital or physical invitation 1DG100 is scanned using camera 1DD102 of smartphone 1DD106. Then, from the scanned information, a client application executing on smartphone 1DD106 may generate a product-token (shown in FIG. 1DG as a barcode 1DG104). Other types of product-tokens may also be generated. Then the product-token may be sent to a collaboration platform.

Upon receiving the product-token information, the collaboration platform may use the product-token information as a search key for retrieving additional information already or previously associated with the product-token.

As described earlier, product-tokenizing a product (such as a medium image, a physical product, and the like) may be used to generate a corresponding product-token. The product-token may be transmitted to a collaboration platform and the collaboration platform may use the product-token as a key to retrieve, and download onto a user device, some additional content that in some way is related to the product (for example, invitation 1DG100 in FIG. 1DG).

10.2. Optimization Using Additional Content

In some situations, it is desirable to optimize a search for additional contents by tailoring the search in some manner and/or according to some criteria. Tailoring the search may be performed to obtain the search results that might be more appropriate for the user. The tailoring may be performed based on information that is related to, for example, the user's physical location, the user's preferences stored in the user's profile, and the like.

This could be illustrated using the following example: suppose that a user is attending an event, such as a wedding. Furthermore, suppose that the user parked his car at the wedding venue. The location of the user's car may be determined based on the information requested and received from, for example, a GPS system installed in the user's car, or based on a GPS system installed in the user's smartphone. That information may be used to determine the event location and implied as the user's location.

One of the benefits of the presented approach is the ability to leverage GPS data and certain real time information about, for example, events or experiences, to enhance searches, as it is described later. By accessing the GPS data and the real time information, the approach allows accessing, for example, the metadata embedded in images, the metadata embedded in various objects, and the like, to infer additional information that may be useful in performing, for example, searches for additional content, additional events, additional objects, and the like.

Metadata may be provided by, or extracted from, various sources. One of the sources is the GPS data mentioned above. The metadata associated with the GPS real time location of the user or the user's car can be extracted and used to enhance, for example, searches for additional information that may be relevant to the user based on the user's current location. Suppose that a user is driving to a wedding event, and is approaching the wedding venue; however, the user's car is running out of gasoline, and therefore, the user needs to find a gas station that is nearby the wedding venue. Based on the user's GPS location information and a product-token associated with the wedding venue, the presented approach may determine additional content that would include, for example, directions to the gas stations that are nearby the wedding venue. That type of information may be quite helpful for the user in these situations.

Most likely, however, a search engine would help to find a gas station. But finding, for example, the bride and groom's nearby recommended breakfast spots may be facilitated by using the product-token-based linkage and specificity linked to the bride/groom's possible recommendations.

This approach may also be used to optimize various types of the searches by utilizing the automatically provided GPS information, manually provided GPS information and any other information that may be extracted from the user-related information.

According to another example, if a user is a participant at a wedding, then the user may find useful not only the linkage to the product-tokens that are associated with the wedding, but also the information that may be searched based on, for example, the geographical region and geographical information. For example, if someone uploaded, for instance, an image that had the same timestamp and the same geolocation as an event, then the timestamp and the geolocation information may be used to enhance a search for additional content that in some way is related to the particular time, geolocation, and wedding. This may be implemented by establishing a new link. That link may facilitate the search for providing additional content. The additional content determined using the timestamp and the geolocation data may be displayed as an overlay imagery. This may also be part of the augmented reality overlays that is described in detail later.

Based on the user's location information, a search for product-tokens and/or additional content indexed using the product-tokens may be optimized to provide only the information that is somehow related to or limited by the user's location.

Using the above approach, instead of randomly searching for data associated with, for example, the user, the search may be optimized using the additional information, such as the user's location information.

FIG. 1DH is an example snapshot for generating product-tokens based on locations. Suppose that a user is attending a wedding at the Lake House in Oak Grove, California, US. The user's location information from a user smartphone 1DD106 (or the user's car) may be provided to optimize the search by showing additional content 1DH110 that in some sense is related to, or associated with, the Lake House and/or Oak Grove. Therefore, instead of retrieving an enormous amount of information collected from various sources, pertaining to different locations throughout the US, and using various product-tokens, the location information associated with the user's current location or the user himself may be used to optimize the search and provide the additional content that is indeed related to the user's current location.

According to the above example, the search optimization may be performed by, for example, using the user's location information or the user's profile information, to narrow down the search to only those additional content items that are more adequate for the user.

The location information used to optimize the search of product-tokens and/or additional contents may be provided in a variety of ways and may pertain to a variety of situations, which are illustrated below.

FIG. 1DI is an example snapshot for generating product-tokens based on locations. As shown in FIG. 1DI, the GPS location information of a user may be provided by a GPS system installed in a user's car 1DI100, and the GPS system coordinates indicating the location of the user may be communicated to user smartphone 1DH100.

According to another example, the GPS location information of a user may also be provided as GPS system coordinates indicating the location of the user himself. According to another example, the location information may pertain to a location coordinates indicating the location of the event, such as a wedding that the user is attending. That location information may be obtained from, for example, online maps or online map applications.

Another type of information used to optimize the search of product-tokens and/or additional contents may be obtained from the user's profile. For example, the location information of the user may be provided from the user's profile to indicate, for example, where the user lives, and the like. Other types of information used to optimize the searches that may be obtained from the user's profile may include the information about the user's preferences, the user's interests, the user's likes and dislikes, the user's purchase history, and the like.

In some implementations, the various locations (that are identified based on the GPS information, the user's profile, or the like) may have already associated tags. The tags may be used to retrieve the additional content and to present the retrieved additional content to the user.

An event that a user is attending may have its own attached tags, which may be then used to retrieve the additional content and to present the retrieved additional content to the user.

The above described approach allows performing optimized searches that narrow down the searches to only that additional contents that are related to, for example, the user's location, the user's profile information, and the like. This allows optimizing the searches and narrowing the scope and size of the retrieved additional content. These searches are significantly more beneficial to users than the searches that provide an abundance of information, some of which may be irrelevant to the users.

The optimization of the searches using the above described approach allows eliminating, for example, the content that, it is believed, may not be interesting to a user. For example, if the user is attending a wedding in Oak Grove, and the user is searching for a hotel near the wedding location, then most likely the user would like to see the information about the hotels near Oak Grove, not, for example, in San Francisco or Los Angeles. By providing the user's location information, a collaboration platform may narrow down the searches and additional contents to the hotels located in (or near) Oak Grove.

In general, the present approach allows adding additional data points to limit the scope of the search and improve the accuracy and relevancy of the search.

In some implementations, an optimized search is optional. For example, a client application executing on a user's device may provide a user interface that allows the user to decide whether the user wants to take advantage of the optimized search or proceed with another type of search. This may be implemented to allow the user to decide which type of search he wants to have performed.

Indeed, it may happen that, in some circumstances, the user may not want to request the optimized search. Suppose that the user is attending a wedding in Oak Grove. However, as the user is attending the Oak Grove wedding, perhaps the user met someone new, and therefore, the user would like to find out the address of the new friend. That friend may live far away from Oak Grove and thus the search optimized based on the user's current location (i.e., the Oak Grove location) may not be very useful for the user's search. Hence, in such a situation, the user would most likely select the search that could be performed using any product-tokens associated with the user's new friend, and not with the user's present location in Oak Grove.

11. Examples of Using Product-Tokens to Receive Additional Content

A product-token generated for a product may be used to identify and retrieve any related data, content, products, and the like, that have been associated with the product.

Suppose that a user has scanned a product-token embedded in a product (either a digital product or a physical product) using a client software application executing on the user's smartphone. The product-token may be communicated to a server software application executing by a collaboration platform. Upon receiving the product-token, the collaboration platform may execute, for example, various application extensions providing additional capabilities, additional functionalities, and additional content to a client application executed on the user's device.

Examples described in this chapter are related to events such as weddings. However, these examples may be extended to other events, objects, or situations, and should not be considered as limited in any way.

Figure 1E:
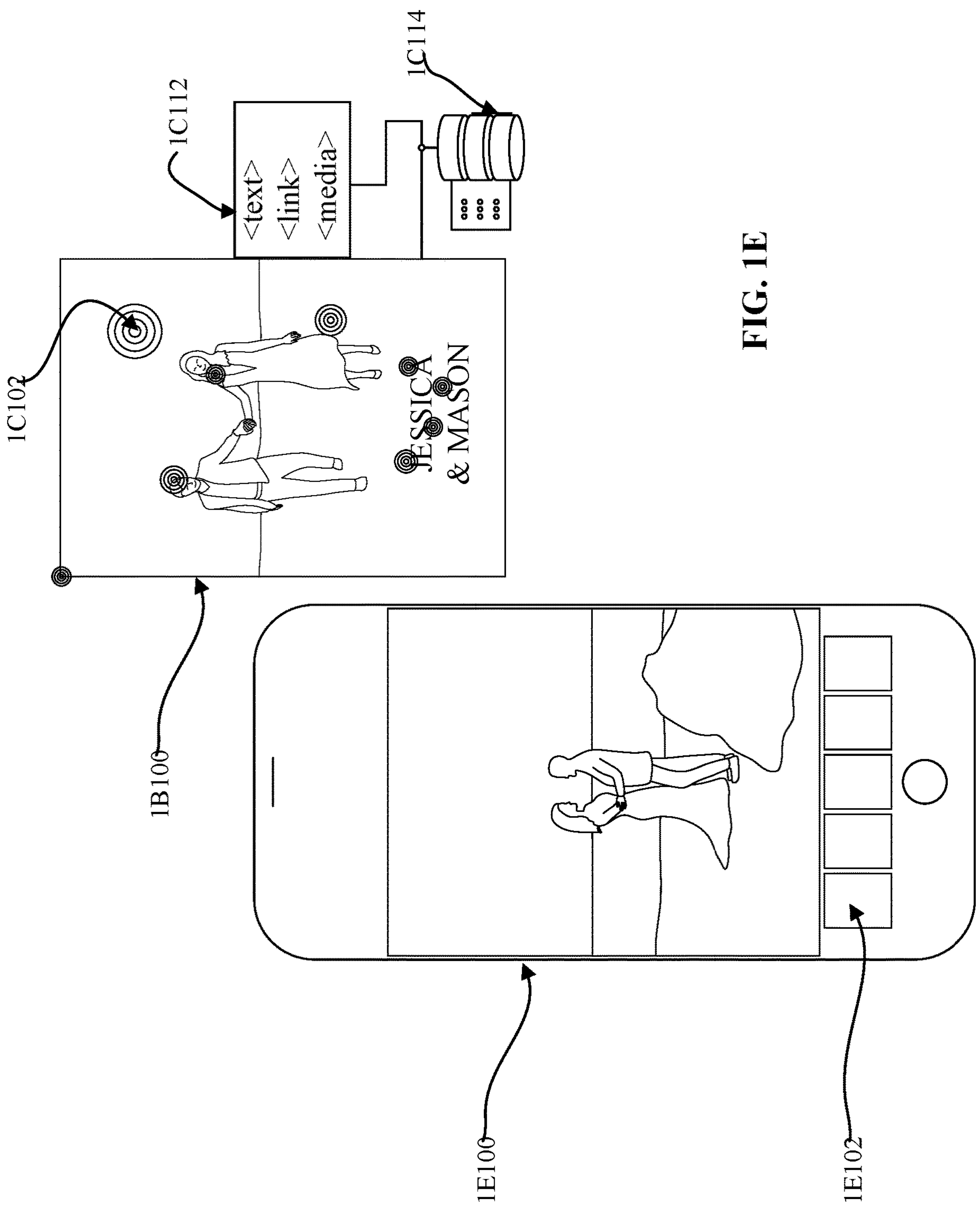
FIG. 1E is an example snapshot for generating and determining additional content and products based on product-tokens and using a digital product collaboration platform.

FIG. 1E is an example snapshot for generating and determining additional content and products based on product-tokens and using a digital product collaboration platform. As described below, the additional content may include an additional picture 1E100, or a collection of additional pictures 1E102 organized in, for example, a slider, or the like.

In some implementations, the additional content may be displayed on the same device as the user used to access a corresponding product-token. For example, if the user was using his smartphone to scan/access the product-token and to request the additional content, then the additional content may be displayed on the same smartphone. As described later, the additional content may be displayed as an overlay. In some other situations, the additional content may be displayed on other computer devices.

Suppose that a user scanned a product-token embedded in a wedding photograph that the user was viewing on his smartphone. In response, a collaboration platform may transmit to the user's device, or enable some additional functionalities allowing the user access to additional content. The additional functionality may include printing the wedding photograph(s), ordering a poster of the wedding photograph, or the like. Furthermore, the platform may facilitate sending the poster of the wedding photograph to the user's friends, ordering physical copies of the wedding photograph, and the like.

Continuing with the above example, some additional functionalities associated with the product-token may include retrieving and transmitting to the client application executing on the user's device, additional pictures from the wedding depicted in the wedding photograph. Additional information such as a guest list, the guests' contact information, a wedding menu, a wedding seating chart, and the like. The client's application may execute on various devices, such as workstations, smartphones, iPads, and the like.

According to another example, suppose that a user scanned a product-token associated with a mug that the user ordered from an online shopping network managed by, or communicating with, a collaboration platform. Upon scanning the product-token, the information about the product-token may be communicated to a server application executing by the collaboration platform, and the platform may retrieve information about, for example, similar products and push that information to the client application to cause the application to display the information about the similar products on the user's smartphone.

According to another example, based on a received product-token generated for a product, a collaboration platform may retrieve additional pictures that have been associated with the received product-token. For example, if the product is a picture from a wedding, then the additional content may include some additional pictures from the wedding, the pictures from an engagement party, the pictures depicting the couple's special places, trips, or the like.

Continuing with the above example of the wedding picture, the additional contents may include a gift list, a gift registry, and the like. Furthermore, the additional contents may include images of some additional products or trips that perhaps the couple may be interested in. The additional contents may also include pictures showing the popular honeymoon destinations, real estate house listings, and the like.

11.1. Overlays

Additional content may be presented and displayed on a user device as an overlay. For example, the additional photographs or additional contents may be displayed as an overlay on a user's screen and, using the overlay's menu, that the user may advance from one group of images to another group by swiping, for example, his finger horizontally over the user's screen.

Another way of displaying the additional photographs or additional contents may allow a user to scroll through the photographs/content either vertically or horizontally as they are displayed in an overlay over the depiction of the product. Other ways of implementing the overlay display of the additional content may also be implemented.

11.2. Augmented Reality

In some implementations, an overlay is arranged as a so-called rich overlay that may utilize augmented reality (AR). A rich overlay may be an overlay that is arranged in an attractive and user-friendly way. For example, the overlay may include not only a list of links, or a list of media, or rich media, or the like, but also the information that is recognized and provided as the overlay presented in a more sophisticated way, not just as a raw display.

As described before, a product-token generated for a product may be used to identify and retrieve any additional data, contents, products, and the like, that have been associated with the product. The additional data, content, products, and the like may be displayed as, for example, an AR-based overlay.

Figure 1F:
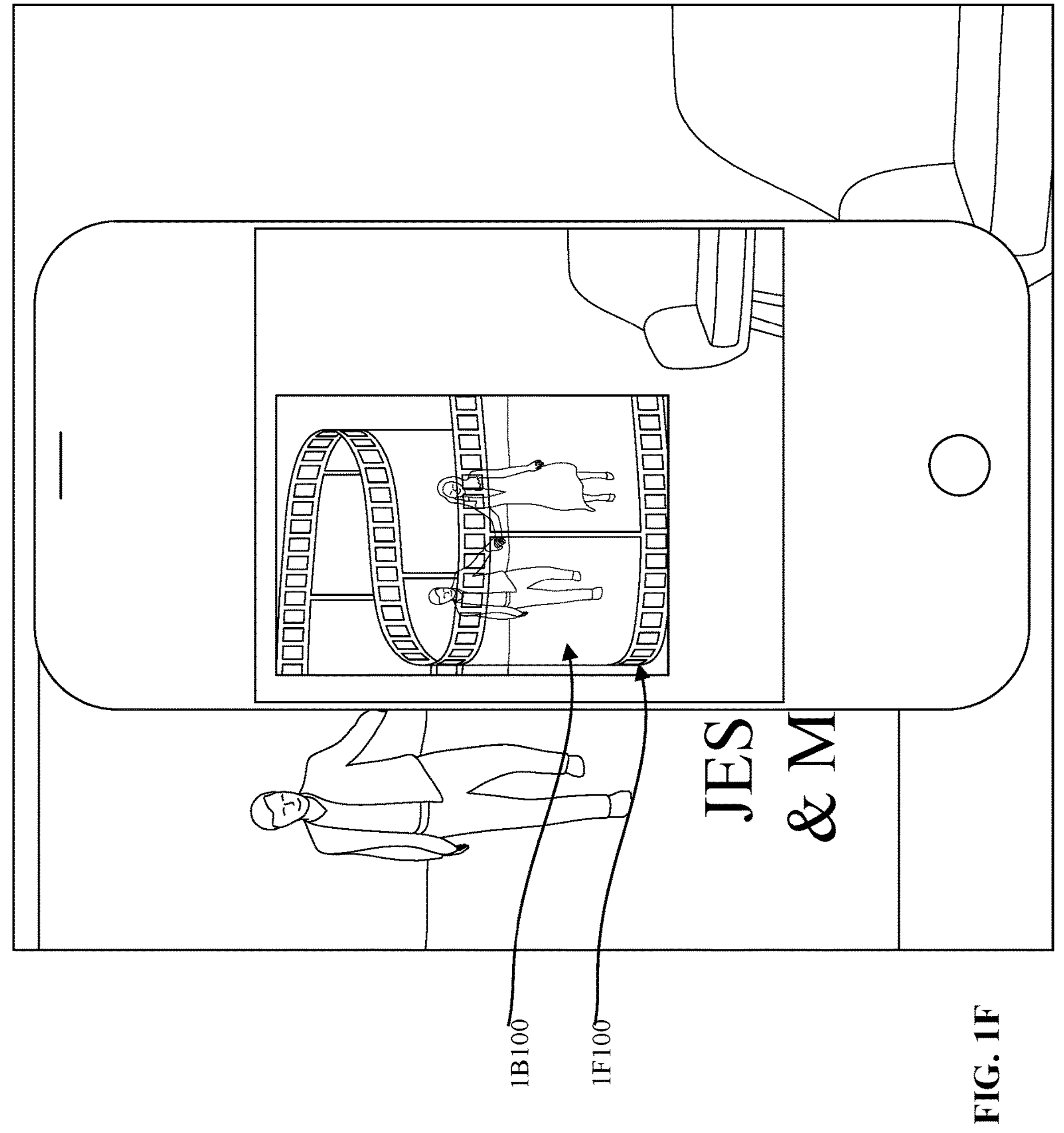
FIG. 1F is an example snapshot for generating and determining additional content and products based on product-tokens and using a digital product collaboration platform.

An example of an AR-based overlay is depicted in FIG. 1F. FIG. 1F is an example snapshot for generating and determining additional content and products based on product-tokens and using a digital product collaboration platform.

As shown in FIG. 1F, additional media 1F100 may be displayed as an overlay on top of, and within the constraints of the depiction of the physical product (which in FIG. 1F is a wedding photograph 1B100). Depending on the construction of the media, the overlay may be configured in such a way that it allows for playful interactions with the elements depicted in the physical surface. For example, the AR-based overlay may allow user-interactions with, for example, a depiction of the dog, or may allow playing an inserted video showing the dog running across the sand behind the groom and the bride. In response to the interactions, additional contents or information may be displayed on the user's device.

11.3. Examples of AR-Based Overlays

An augmented reality overlay allows finding and recognizing the features that are inherent in a depicted product or otherwise incorporated/linked with the depicted product. The AR also allows creating an interesting overlay based on the recognized features. Suppose that one found a rectangle, or a pattern, depicted in the displayed product. Based on the recognized rectangle/pattern, the additional content may be generated and displayed in an attractive overlay over the depiction of the product.

The recognized features may be identified or detected using, for example, an image analyzer or a similar process. The image analyzer may recognize or identify the features present on various planes of the imagery depicted in the media, including a front plane, a background plane, and any planes in between. For example, the AR-based overlay may depict the dog running in the background of the beach, or a slowly setting down sunset, or some other rich media overlaid on the top of the depiction of the product.

Implementations of AR-based overlay enhance the experience of viewing the media and provide interesting and enjoyable interactions with features depicted in the media. For example, if the imagery depicted in the media shows an airplane, then the AR-based overlay may cause displaying some additional content that includes, for example, a flier about a model plane local exhibition, and contact information to flying lesson local clubs, and the like. Then, if a user follows the provided hyperlink for the contact information, then the user may access the corresponding websites and appropriate web pages that allow the user to explore the flying lessons, and the like.

According to another example, if the imagery depicted in the media shows a t-shirt with, for example, a Disney™ logo, then the AR-based overlay may cause displaying some additional content that may include, for example, other t-shirts (e.g., having different colors, different designs, different sizes, logos other than a Disney™ logo, and so forth). Then, if the user follows the provided hyperlink and contact information, then the user may access the corresponding websites and appropriate web pages that allow the user to shop and order different t-shirts.

11.4. Feedback Loop

In some implementations, the presented methods and the systems allow a user to provide additional contents to a collaboration platform as the user interacts with the platform or views some content, photographs, products and the like. For example, as a user views the pictures from a wedding of his friend, the user may be provided with an interface that allows the user to upload additional pictures from that wedding, add some "thank you" notes, add some "best wishes" quotes, and the like. The user could also upload a guest list of the guests who attended that wedding, a list of gifts, and the like. Furthermore, the user could upload videos from the couple's honeymoon, various trips, various events, and the like.

Furthermore, a user may be provided with an interface that allows the user, as he is reviewing some content displayed for the user by a collaboration platform, to add some video files, animation files, and the like, and other content related to the content displayed on a screen of his smartphone (or a PC, etc.).

Figure 1G:
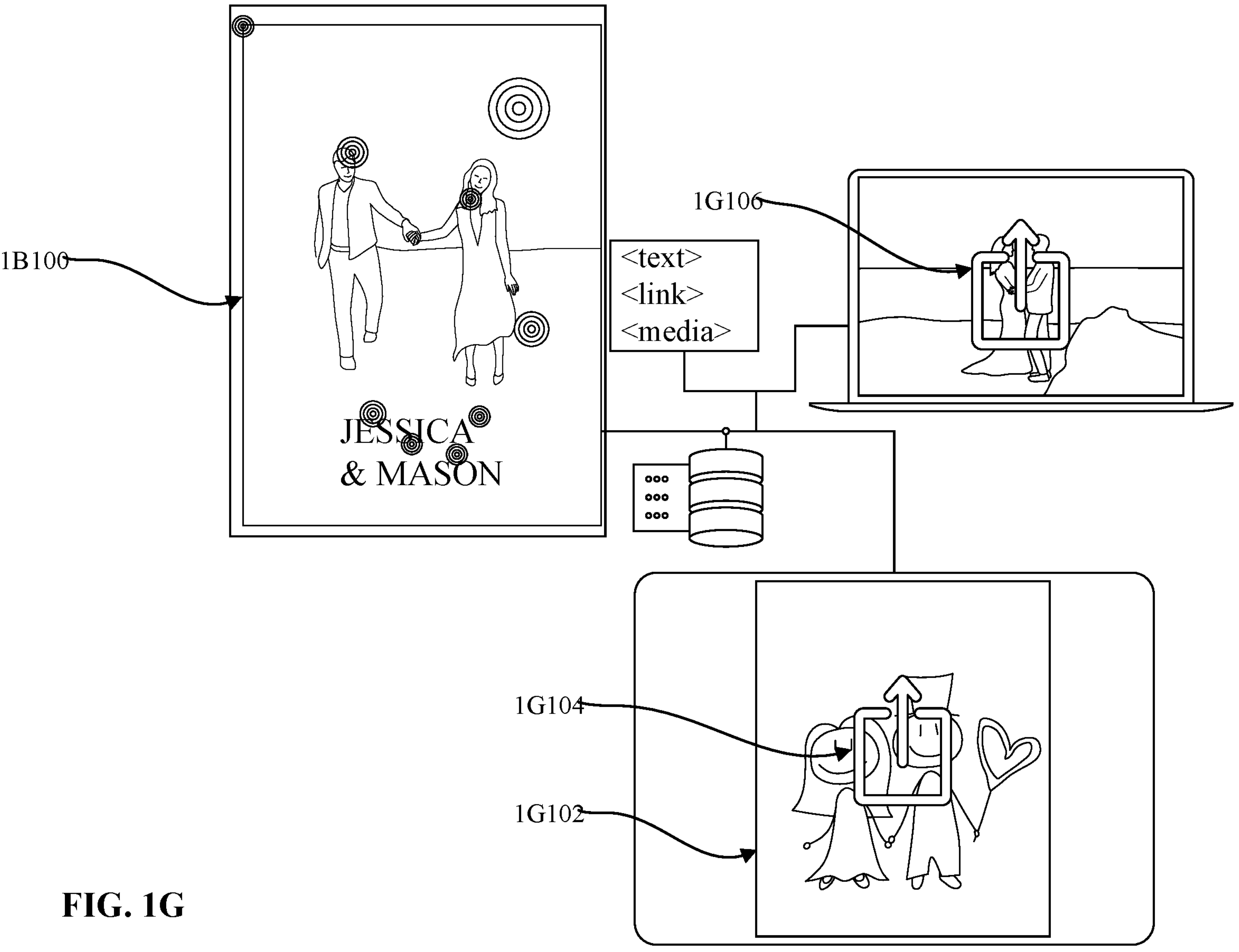
FIG. 1G is an example snapshot for generating and determining additional content and products based on product-tokens and using a digital product collaboration platform.

FIG. 1G is an example snapshot for generating and determining additional content and products based on product-tokens and using a digital product collaboration platform. in FIG. 1G, as a user is viewing a wedding photograph 1B100, the user may select or access a product-token. In response to the selection, a collaboration platform may send to the user's device some additional content, including, for example, an additional picture 1G100. As additional picture 1G100 is displayed on the user's device, the browser may generate an interface 1G102 that allows the user to access some additional content, additional files, and the like. The additional content may be also accessed from another interface, such as an interface 1G104, also shown in FIG. 1G.

According to another example, if the imagery depicted in the media shows a funeral announcement, then the AR-based overlay may cause displaying some additional content that includes, for example, an obituary, notes from the friends, and the like. Then, if a user follows one of the provided hyperlinks or contact information, then the user may access the corresponding websites and appropriate web pages that allow the user to read the obituary, the notes, and the like.

12. Examples of Benefits of Providing Additional Content

In some implementations, a presented approach provides sophisticated capabilities for enhancing a user's experience as he interacts with a collaboration platform. This includes allowing the user to receive additional content that, in some way, is related to what the user is viewing and that was provided to the user's device by a collaboration platform. The additional content may be presented to the user in a variety of ways, including the AR-based-overlay, which is a sophisticated way of presenting information, as described before.

Furthermore, the presented approach allows marketing the products by depicting them in overlays or any types of displays generated by user devices and available via a collaboration platform. The additional products may be selected by the collaboration platform as being related to the content already displayed for the user or associated with the currently displayed content.

13. Examples of Benefits of Implementing a Feedback Loop

In some implementations, a presented approach allows users to enhance the content repository associated in some way with the contents that the users can view and share with others. As described before, as a user is viewing some content on his device, the user may add some new pictures, additional lists, additional notes, and the like, and cause the added contents to be linked with the contents that the user was viewing.

13.1. Generating Product-Tokens for Added Content

Adding additional content to a repository of data and media and associating the additional data with the content that a user is viewing may include generating product-tokens for the added content and linking the newly-generated product-tokens with a product-token that has been already generated for the contents that the user has been viewing. Various ways of generating product-tokens have been described before.

14. Product-Tokenization Example

Various ways of generating product-tokens may be illustrated using examples described below. One of the examples includes a process of generating product-tokens associated with a wedding invitation and using such product-tokens generated in many different ways. These examples, however, should not be viewed as limited in any way.

14.1. Wedding Invitation Example

Suppose that a user designs a wedding invitation. The design may be, for example, based on a template displayed in a user interface that was generated from data provided by a collaboration platform. Alternatively, the user may design the wedding invitation by collaborating with, for example, a designer who may suggest some designs or templates, or who may collaborate with the user on an individual design. Another option is when the user designs the wedding invitation by himself or by collaborating with his friends or family members.

14.2. Content of an Invitation

Figure 1H:
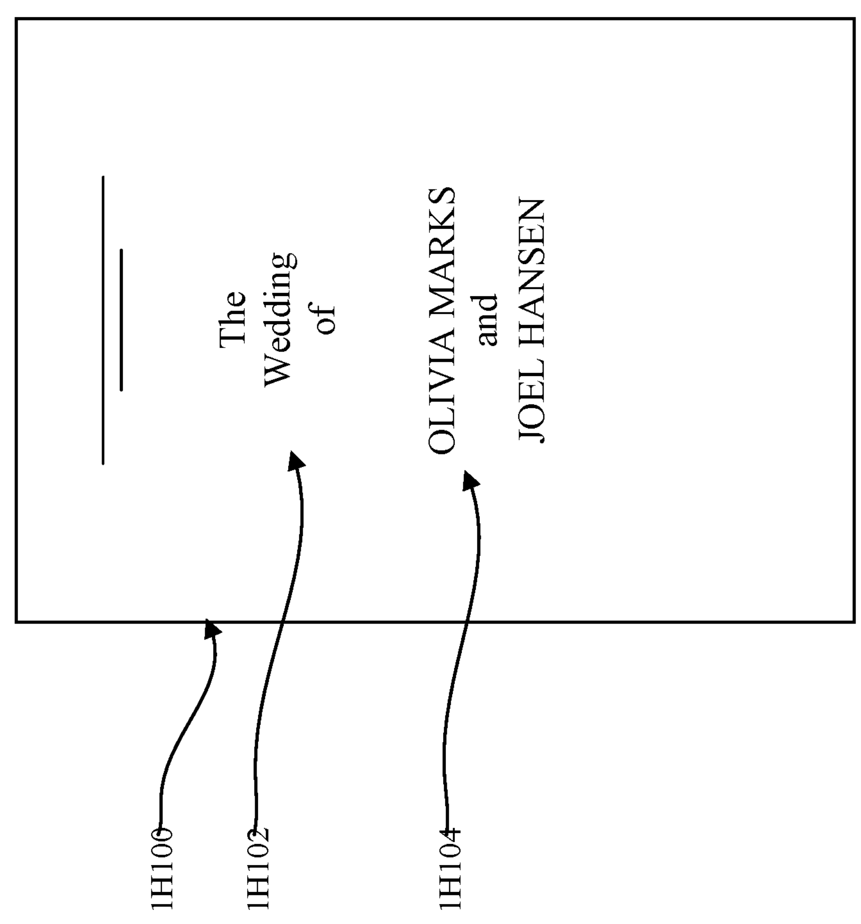
FIG. 1H is an example snapshot for generating and determining product-tokens.

FIG. 1H is an example snapshot for generating and determining product-tokens. In FIG. 1H, a wedding invitation 1H100 includes a title 1H102 of the invitation and details 1H104 of the invitation.

Continuing with the above example, a typical invitation for a wedding may include several types of information. Examples of such information may include information about the bride, the groom, the event itself, information about the guests (guests' names, guests' roles at the wedding-if applicable, and the like). The information printed on the invitation may also include other unique information that would allow for more granular interactions and for presenting additional content, as described later.

14.3. Product-Tokenization of an Example Invitation

Once a design of a wedding invitation is completed, the content of the wedding invitation may be product-tokenized. As described before, product-tokenization may include generating a product-token (or product-tokens) based on the content of the media. In this example, a product-token may be generated based on the content that is printed on the wedding invitation. For example, the product-token may be generated based on the full content of the invitation design (single product-token associated with the invitation/design content/event), or various portions of the content of the invitation (multiple product-tokens associated with the invitation/design/event). Other ways of generating product-tokens were described before.

14.3.1. Base Content

Generally, the content of an invitation may be used to generate a single product-token or multiple product-tokens. Each product-token may encode some content included in the invitation.

Figure 1I:
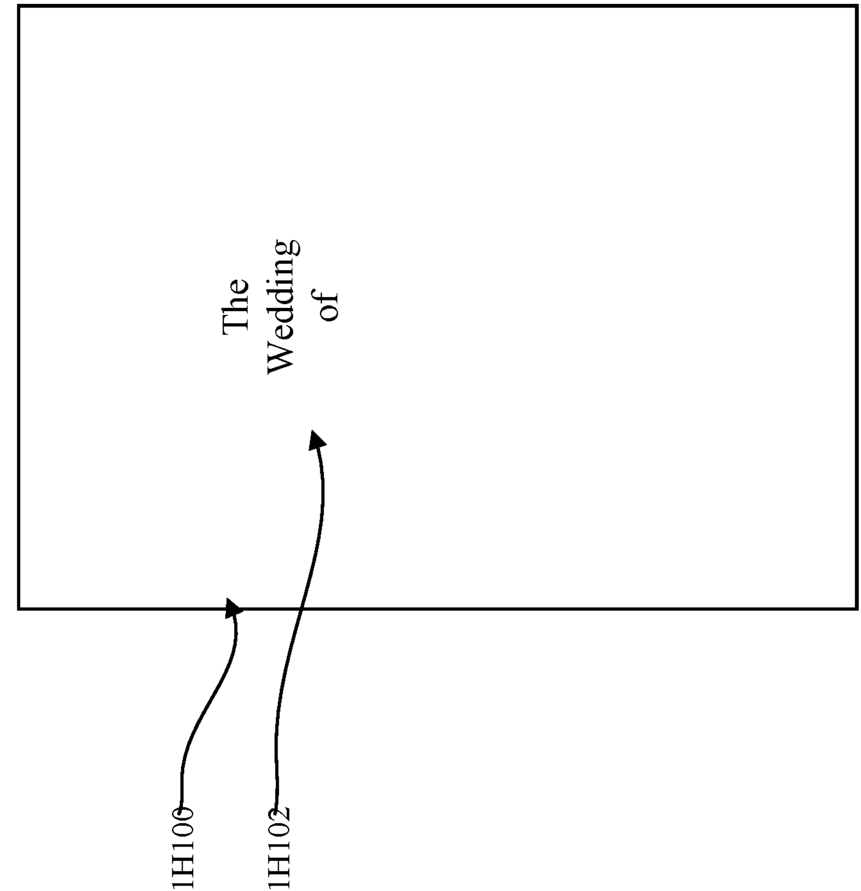
FIG. 1I is an example snapshot for generating and determining product-tokens.

FIG. 1I is an example snapshot for generating and determining product-tokens. In FIG. 1I, wedding invitation 1H100 includes title 1H102 of the invitation. Details 1H104 of the invitation have been omitted.

A product-token may be used as a template generated based content that also has the details of the event listed on the invitation. The details may include, for example, the names of the bride and groom, location, date, time, and the like, and/or the names of the guests, and the like.

Base content (e.g., a template) may be associated with a product-token for the event. In this example, the base content may be associated with a product-token generated for the wedding invitation.

In some implementations, the additional information included in the invitation (such as the date, time, location) can be scanned and saved as an associated information flow or sub-product-tokens.

14.3.2. Invitee Identifier

Figure 1J:
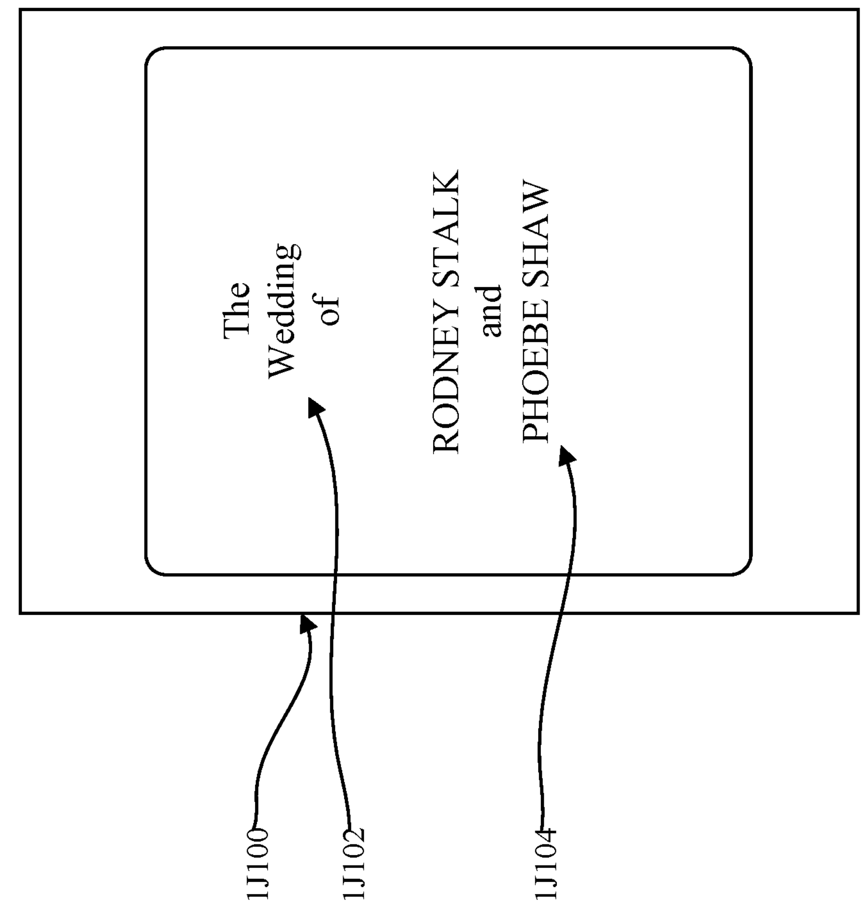
FIG. 1J is an example snapshot for generating and determining product-tokens.

FIG. 1J is an example snapshot for generating and determining product-tokens. In FIG. 1J, a wedding invitation 1J100 includes a title 1J102 of the invitation and details 1J104 of the invitation.

An invitee identifier (e.g., an invitee's name) can be used to generate another product-token with specific information for the invitee (who potentially has a user account with, for example, a collaboration platform).

14.3.3. Additional Information

Many types of additional information included in an invitation may be used to generate a product-token. That additional information may be linked to the products that are available via, or from, a collaboration platform. Those products may be offered to users for purchase (e.g., various products included in, for example, a digital wedding product suite offered by the platform).

Other information that may be product-tokenized may include the locations for the event, rehearsal, ceremony, reception, and the like. These can be linked to map applications that, once launched, may be used to provide, and display direction information to the particular venues.

Additional information that may be extracted from the wedding invitation may include the information about the dates/times. That information may be used to generate calendar events.

Further information may include instructions for the RSVP process for the wedding event, and method for submitting attendance decisions. Additional information may include seating arrangements, charts, or maps, as well as food and drink menus and options for selecting meal preferences.

Other information may include, for example, hyperlinks to wedding registries and gift options (e.g., charitable donations, and the like.) and custom products designed for wedding announcements and events that are available in the wedding products suite.

Figure 1K:
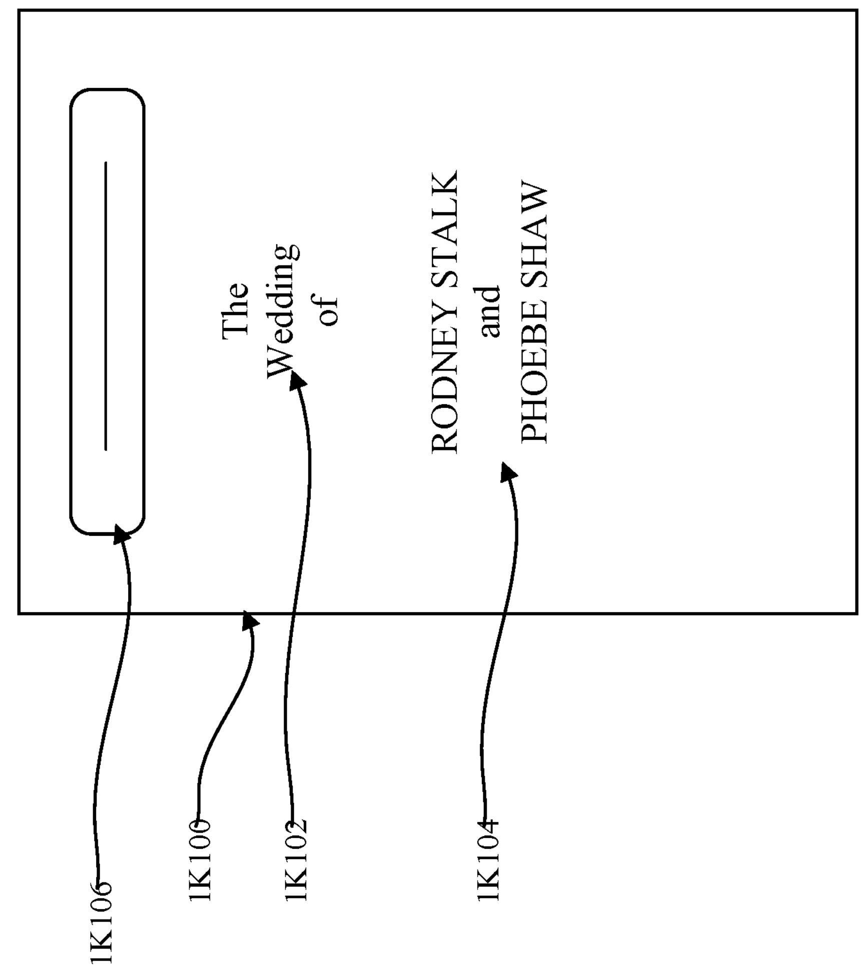
FIG. 1K is an example snapshot for generating and determining product-tokens.

FIG. 1K is an example snapshot for generating and determining product-tokens. In FIG. 1K, a wedding invitation 1K100 includes a title 1K102 of the invitation, details

1K104 of the invitation, and some additional information 1K106 related to the wedding event.

Figure 1L:
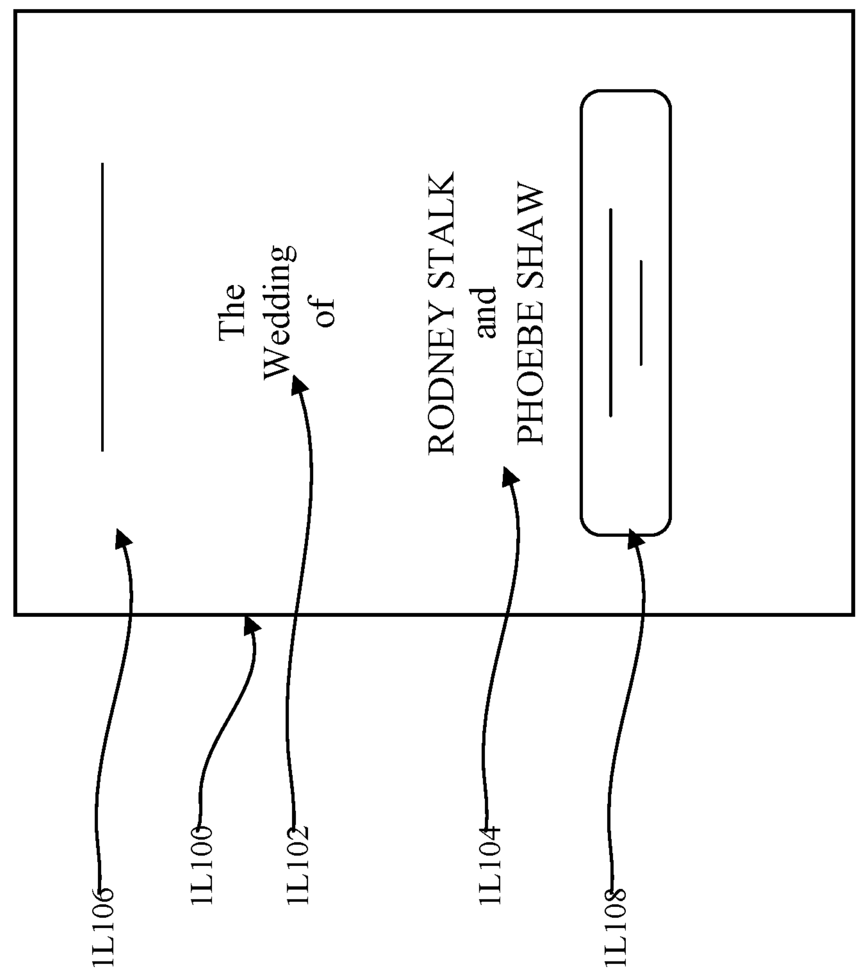
FIG. 1L is an example snapshot for generating and determining product-tokens.

FIG. 1L is an example snapshot for generating and determining product-tokens. In FIG. 1L, a wedding invitation 1L100 includes a title 1L102 of the invitation, details 1L104 of the invitation, some additional information 1L106 related to the wedding event, and some additional data 1L108 related to the wedding event.

Figure 1M:
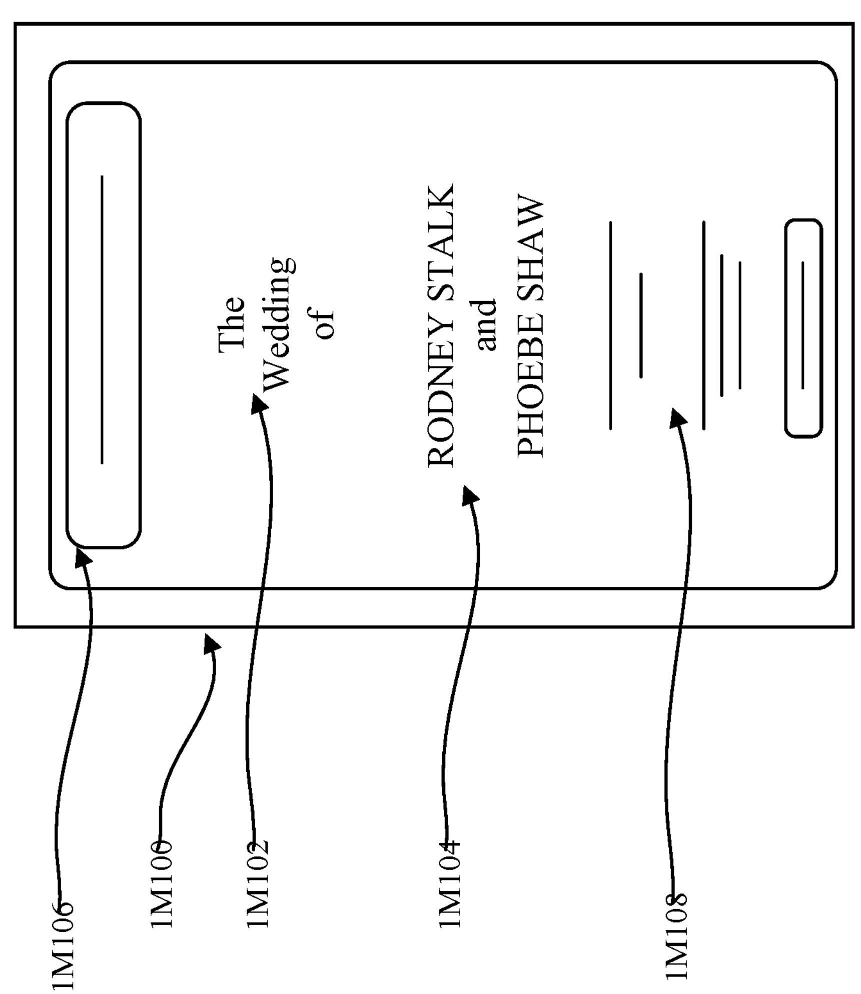
FIG. 1M is an example snapshot for generating and determining product-tokens.

FIG. 1M is an example snapshot for generating and determining product-tokens. In FIG. 1M, a wedding invitation 1M100 includes a title 1M102 of the invitation, details 1M104 of the invitation, some additional information 1M106 related to the wedding event, and some additional data 1M108 related to the wedding event.

The additional information on the invitation may include, for example, the links to the wedding preferences that have been selected by guests, or suggested to the guests, or sent to attendees after the event.

The additional information may also include the links to various hospitality options such as suggestions of hotels for the guests, recommended restaurants, and the like.

Some product-tokens may be generated from the information about tickets and access passes to various events that are related to, for example, a wedding event announced in a wedding invitation.

14.4. Product-Token Applications

Product-tokenization may include generating QR, or the like codes for, for example, passes for various events which are related to an announced wedding. The codes may be later scanned by users to gain access to the corresponding events.

Additional information may include hyperlinks to photographs or photograph albums of the event. Once selected by the users, the hyperlinks may facilitate several functionalities such as uploading, sharing, downloading and/or turning into commemorative products available for purchase.

Other functionalities may allow offering and/or redeeming coupons, monetary credit, and the like, that may be used toward purchases of, for example, wedding related products, or that may be used during the wedding. That may include purchasing, for example, beverages (using, for example, currency product-tokens), and the like.

A recipient of the wedding invitation may scan the invitation using, for example, his smartphone, tablet, or other device that is equipped with image scanning capabilities, like a camera. The scanning may include capturing the content of the invitation and either having the content product-tokenized or reading the product-token that has been already embedded in the image.

Upon scanning the invitation, the information linked to the product-token can be displayed on the scanning device. The information can be displayed in a user interface, which may, or may not, be separate from the scanning interface, and which may display the information relevant to the product-token. The information can also be displayed in a user interface as an overlay on the scanned image of the invitation as an augmented reality (AR) experience. Examples of the AR-based overlays have been described before.

15. Product-Tokenization—a Wedding Medium Example

The example described below summarizes the information disclosed above and illustrates the application of the product-tokens and product-tokenization process to a concrete example, which is a wedding media example. Furthermore, the example described below illustrates how the product-tokenization may be integrated to enhance, for example, the wedding experience.

Suppose that a wedding invitation includes information pertaining to a wedding itself, including the names of the bride and groom, the location of the wedding venue, and the like. During the process of product-tokenization, a product-token generator may generate a plurality of product-tokens, which then may be embedded or otherwise affixed to the wedding invitation itself. The detailed process is described below.

As described above, FIG. 1I depicts a basic wedding invitation. The example is provided merely to illustrate the product-tokenization process, not to limit the disclosure to any particular product or product design.

15.1. Product-Tokens Based on Text and Graphics

In FIG. 1I, the specific text includes "The Wedding of . . . ". The text is placed in a specific place, and includes a specific name, a specific location name, and the like. That information may be scanned and used to generate a product-token.

The simple invitation shown in FIG. 1I may be viewed as an invitation template, and the text included in the invitation may be used to generate a product-token. The invitation template may be generated by a template generator, while the product-token may be generated by a product-token generator.

There are many other options to generate product-tokens from an invitation. For example, another product-token may be generated from a design of the invitation, including, for example, the imagery or graphics shown on the invitation.

If an invitation is updated, enhanced, or otherwise revised, the revised invitation may be scanned again and used to generate a new product-token. For example, if some additional graphics or a background is added to the invitation, then a new product-token capturing the added graphics and/or the added background may be generated.

The product-tokens may be used to link some additional content to the invitation. A user or users may link the product-tokens with the additional content and allow a viewer of the invitation to also access the additional content.

As described before, there are many ways for presenting the additional content. One way is to present the additional content as an overlay displayed on the user device over the viewed invitation. Another way is to employ an AR-based approach described before. The additional content may include, as described before, additional photographs, maps to the wedding venue, a menu list, a list of quests, a gift registry, honeymoon destination recommendations, hotel recommendations, and the like.

Suppose that a first product-token is generated based on the names of the bride and the groom. That product-token may be used to provide additional content such as additional photographs, notes to and/or from/to the bride and the groom, captions from the places that are important or memorable to the couple, and the like.

Suppose that a second product-token is generated based on the name of the venue where the wedding is going to be held. That product-token may be used to provide additional content such as a map and/or directions to the wedding venue, driving directions and/or recommendations, and the like.

15.2. Product-Tokens Based on Points of Interest

Suppose that a template generator has identified two or more points of interest within a face page of the invitation. There are a variety of ways of identifying points of interest. One way is to scan the image (e.g., a face page of the invitation), and determining groups of pixels of the image that have the same or similar colors, or that indicate corners of the photograph, or that indicate edges or corners of lettering, or that have a pattern indicating a human face, or that have a pattern indicating a dog, or that have a pattern indicating a tree, and the like.

Referring again to FIG. 1C, examples of some interest-points are shown using circles (i.e., bubbles) 1C102, 1C104, 1C106. Suppose that each interest point is marked using three or four concentric circles, as 1C102 shown in FIG. 1C. The centers of the circles may mark the points of interest and form a geometric pattern, which may be encoded into a product-token. This type of product-token is also referred to as a product-token based on points of interest or based on a pattern. That type of product-token may also be used to link to additional content, examples of which were described before.

An example product-token 1C112 may include various types of information, including text, links, media, and the like. The product-tokens may be stored in a database or a storage device 1C114.

15.3. Product-Tokens as Defining Content Relationships

Generally, product-tokens are used to define relationships between different types of contents related in some way to a product, a user or users viewing the product, events, products, and the like.

15.4. Linking Product-Tokens with Additional Content

Continuing with the example of a wedding invitation, as a user is viewing the invitation (e.g., a product designed by a user or a product received by a user, etc.), a product-token generator may generate one or more product-tokens that are specific to different parts of the invitation. Alternatively, or in addition to, if the product is a physical product, a product-token may be already affixed to, or embedded on the product.

The product-tokens may be then linked with the additional content. Linking between the product-tokens and the additional content may be performed in many different ways. For example, it may be performed by the user himself, or by a designer who assists the user with designing the product, or by an operator of a collaboration platform, or others.

Another way of linking a product-token with additional content may be implemented when a user uploads some additional content himself and wants to link that additional content with some other product(s). For example, suppose that a user is viewing a wedding invitation. The user may want to upload some additional content such as, perhaps, some additional pictures from the wedding, some notes to the bride and the groom, or the like, and link them with the invitation.

The ability to link the additional content, which a user has uploaded with, for example, a wedding invitation that the user is viewing, may be implemented by generating and displaying a user interface that would allow the user to provide instructions for linking his additional content with, for example, the wedding invitation that the user is viewing.

A user interface may be, for example, a graphical user interface, or any other interface that can be implemented and executed on a user client device. The interface may allow the user to link his added content (e.g., some pictures, some notes, and the like) with, for example, the wedding invitation that the user is viewing. The interface may be, for example, overlaid over the wedding invitation and may implement buttons or input boxes that would allow the user to provide the instructions for linking his additional content with the wedding invitation.

The process of linking the additional content with products either digital or physical may be repeated multiple times with no limitations on links or additional content. The process of linking may be viewed as a process of building relationships between the products and the additional content.

15.5. Generating a Calendar of Events

Hyperlinks and products may be also linked with, for example, user accounts, user browsing history, user purchase history, accounts of the user's friends, and the like.

That information may be also used to generate, for example, a calendar of events. Continuing with the wedding invitation example, as a user is adding some new content, the link to the added new content may be associated with the wedding invitation. The added content may specify, for example, a location and time for a rehearsal dinner, a location and time for a bachelor party, a location and time for a bachelorette party, and the like. The additional events may be added to the calendar associated with the wedding announced in the wedding invitation.

15.6. Hierarchy of Product-Tokens

A group of product-tokens that are linked to a particular product and/or with each other may be organized in a variety of ways. For example, the product-tokens linking additional content such as additional photographs may be grouped into one group of a product-token's hierarchy, while the product-tokens linking additional content such as a list of guests, a list of gifts, a gifts registry, and the like may be grouped into another group of the product-token's hierarchy.

Furthermore, the product-tokens linking location information such as driving directions to the wedding venue, a map of the venue, a list of hotels reserved for the guests, and the like may be grouped into other groups of the product-token's hierarchy. The above examples are to be viewed merely to illustrate some levels of a hypothetical hierarchy of product-tokens. It should not be, however, viewed as limiting in any way or reserved to wedding products and invitations only.

15.7. Product-Tokens Pointing to Services

Product-tokens may point to services that are offered by various service providers, suppliers and the like. For example, a product-token, or product-tokens, pointing to a group of photographs may be linked with a service provider that specializes in creating and delivering photo albums.

Another product-token, or product-tokens, that points to, for example, a gift registry may also be linked with retailers or online shopping sites that sell and ship the gifts specified in the gift registry. For example, there might be a product-token that would link to an online-shopping-website that offers custom products such as those included in the gift registry described before.

15.8. Product-Tokens Offering Monetary Rewards

Product-tokens may be implemented to provide hyperlinks to websites that offer monetary discounts, monetary rewards, coupons and the like. For example, if a product-token was generated based on the information included in a wedding invitation, the product-token may provide a hyperlink to discounts offered by, for example, the local restaurants, the attraction venues in the wedding venue vicinity, and the like. The guests who attend the wedding could use the discounts while attending the wedding event.

According to another example, a product-token may provide a hyperlink to coupons offered by, for example, a collaboration platform that the platform offers to its users. For example, the product-token may provide a hyperlink to the coupons for ordering products from the collaboration platform. The coupons may allow the users to request assistance from designers who can help the users to customize a product offered by the collaboration platform, and the like.

15.9. Product-Tokens Used as Digital Wallets

According to another example, product-tokens may be linked to digital wallets, virtual monetary accounts, or other instruments that are configured to store things of value. A product-token may be used to, for example, record an amount of credit that is assigned to an individual account holder based on the information included in the printed or digital product-token or product-tokens. The credit may be used to, for instance, purchase products or services at an event to which the product-token is linked through the relationship of one or more product-tokens created for the event and defined in a collaboration platform.

Referring again to a wedding event example, suppose that a record of value, a store of credit, or other store of monetary value has been created on a collaboration platform and linked to the wedding event and corresponding product-tokens. Attendees of the event, as a whole, or individual events within the collection of events typically taking place at a wedding (e.g., a bachelor party, bachelorette party, receptions, and the like) may be assigned a value of money or credit that is linked to the individual through one or more product-tokens and may be linked to one or more events associated with the wedding.

A store of monetary value may be assigned to a product-token or product-tokens that are communicated to an attendee in the form of a digital code (e.g., a digital QR-code, barcode, digital wallet, or the like) or physical form (e.g., a QR-code embedded in an invitation, barcode, product-tokenized text, graphics printed on an invitation, or the like), and may be used at one or more events at the wedding. The store of monetary values can be accessed by presenting a physical or digital product-token or product-tokens at a point of sale (such as a bar, gift shop, hotel, or other vendor of goods or services associated with the wedding) related to the wedding, or at individual events within a collection of events at the wedding, as defined and allocated by the collaboration platform.

15.10. Tear-Off Portions with Product-Tokens

Figure 1N:
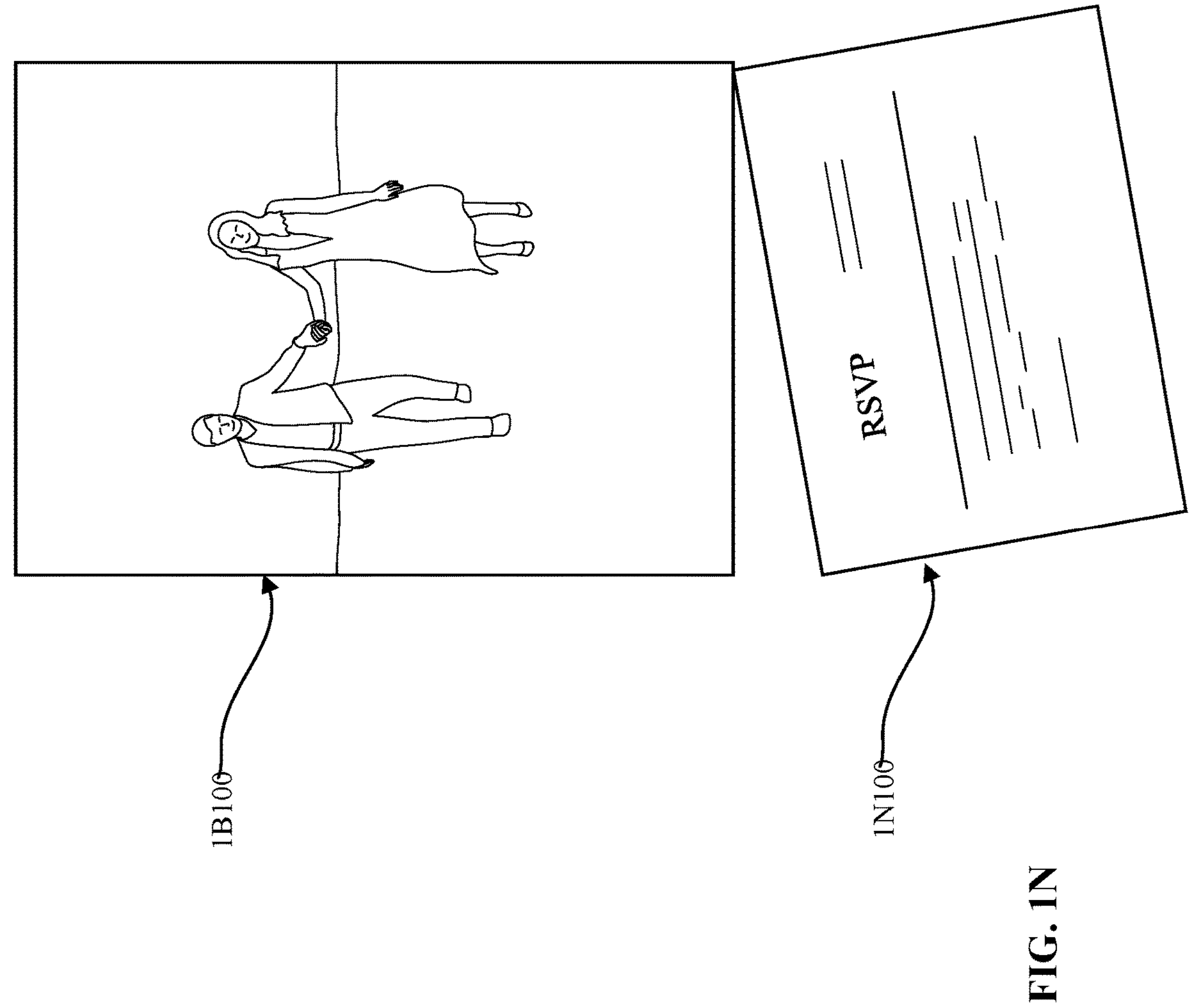
FIG. 1N is an example snapshot for generating and determining product-tokens.

FIG. 1N is an example snapshot for generating and determining product-tokens. Some product-tokens may be imprinted on products themselves and may be detachable. More specifically, some product-tokens may be imprinted on a portion of the product and the product-tokens can be detached, or teared-off from the product. For example, if a product is a wedding invitation 1B100 (as shown in FIG. 1N), then the invitation may have a detachable portion IN100 that includes a product-token and that is detachable from the invitation itself. The product-token may provide information about, for example, additional services, additional products, coupons, a store of monetary value for an individual attendee, and the like. This may be implemented in either physical or digital products.

16. Product-Token-Based Searches

Product-tokens may be used to perform and/or enhance searches. In this context, the searches are understood as searches for products, events, users, photographs, and the like.

Product-token-based searches are also beneficial in that they allow a search to be optimized based on their association with various products, data, and the like. Using the wedding invitation example, a collaboration platform may have many thousands of wedding invitations available to be customized or purchased. In a search that is not product-token-based, the collaboration platform would have to search through a large number of invitations to find the correct wedding invitation. Using a product-token-based search the collaboration platform can find the specified wedding invitation much more quickly than if each invitation and data-point or related information needed to be searched through.

The benefits of product-token-based search increase with the number of wedding invitations, for example, available on the collaboration platform and the amount of related information or data-points associated with the wedding invitations. Say, for example, a collaboration platform were to offer one hundred thousand invitations, each with their own collection of associated data. A product-token-based search would allow the collaboration platform to locate and return a specific invitation or information related to the invitation more quickly than having to search through all of the invitations and their related data.

16.1. Searches for Additional Information

Suppose that a user is viewing a wedding invitation. As the user is viewing the invitation, the user may notice a product-token embedded in the invitation. Subsequently, the user may scan that product-token and thus retrieve additional information about the event, the guests, the venue, and the like.

Suppose that a user wishes to find more information about a wedding venue. To facilitate such a search, a client application that the user is executing to view the wedding information may provide a user interface that displays various search keywords pertaining to the wedding events.

Search keywords related to the example of a wedding invitation may include terms such as "venue," "guests," "directions," "hotels", "events," and the like. Using the user interface, the user may select any of the terms displayed in the interface.

16.2. Searches for Places and Locations

Upon receiving a selection of a particular term from a user interface, a client application executing in, for example, the user's browser, may use the product-tokens associated with the term, and subsequently provide corresponding hyperlinks, additional contents, and the like to the user.

For example, suppose that the user selected the term "venue." In response to the selection, the client application may send the selection information to a collaboration platform and cause the collaboration platform to retrieve the product-token associated with the selected term, and then, using the product-token, retrieve the hyperlinks corresponding to the wedding venue, additional content pertaining to the driving location to the wedding venue, additional content depicting a map including the location of the venue, and the like.

The additional content and the corresponding hyperlinks may be transmitted from a server application executing on a collaboration platform to a client application executing on a client device. The additional content and the corresponding hyperlinks may be displayed on a screen of the user device as, for example an overlay or an AR-based overlay.

16.3. Searches for Products

Other types of the product-token-based searches may also be implemented. For example, a user may use the product-tokens to search for products similar to the product that the user is currently viewing. According to another example, a user may use the product-tokens to search other venues, other places, other events, and the like, that the user has viewed or attended in the past.

16.4. Searches for Individuals

Product-token-based searches may be also used to perform a search for individuals. For example, if a user is viewing a wedding invitation and the invitation lists a name of the groom and the name of the bride, then the user may request (i.e., search for) additional information about the bride and the groom.

This may be implemented in a variety of ways. For example, this may be implemented as follows: a product-token generator may generate product-tokens for the groom/bride mentioned/depicted in the invitation; the product-tokens may be linked to additional content that provides some additional information about the bride and about the groom. Depending on the implementation, the additional information may include information about, for example, the groom's/bride's biography, the groom's/bride's likes and dislikes, information about how the groom and the bride met, and the like. The linking between the product-tokens and the additional content may be performed by other users, operators of a collaboration platform, and the like.

According to another example, suppose that a user is viewing pictures from his wedding. As the user is viewing the pictures, he may notice a guest depicted in the pictures. Suppose that the user would like to find some additional information about that guest. Assuming that a product-token generator generated a product-token for that guest, the user may request the additional information by selecting the product-token that is associated with the guest. Upon receiving the user's selection of that product-token, a client application executing on the user's device communicates the request to a server application executing on the collaboration platform, which in turn causes the platform to retrieve the additional information about the guest and communicate the additional information to the user's client application. Then the additional information about the guest is displayed on a screen of the user device as, for example an overlay or an AR-based overlay.

17. Using Product-Tokens to Generate a Social Network

Product-tokens described herein may be viewed as instruments for setting up, or generating, a social network between the users who have accounts with, for example, a collaboration platform and individuals, who in some way have interacted with the collaboration platform. For example, as the product-tokens are created for various elements and contents depicted in the product viewed by a user, the product-tokens may be used to link additional contents that in some way is related to other users and the individuals. Those product-tokens may be linked to the additional information about others, and thus may be viewed as links between people who, therefore, form a virtual social network.

In some implementations, a social network may be created by recognizing a master product-token. That network may be expanded by adding information about additional product-tokens created or generated for the individual media, invitations, products, and the like.

Hence, creating, for example, an invitation using the features of a collaboration platform may be viewed as creating not just an event (e.g., a birthday event, a wedding event, a family reunion event, and the like), but also as creating a social network of users and customers.

18. Computer Environment for Implementing Product-Tokens

The presented approach may be implemented as an automated concierge system supported by a product collaboration platform in which users generate interactive digital designs of custom products and the platform supports creating product-tokens (described before), related gifts and designs and facilitate memorializing and calendaring events, gifts, and design-related moments.

In some implementations, a product collaboration platform automatically generates and suggests gifts and designs related to activities and interactions taking place between users and the platform. The platform may generate, for example, a user interface to allow additional interactions between the users and the platform and to automatically prompt the users to contribute to generating the gifts and designs related to the already custom products and designs.

A product collaboration platform is a computer-based system configured to facilitate computer-based designing of custom products. The collaboration platform may be implemented in a computer server, a distributed computer system, a cloud-based system, and the like. The platform may be configured to allow users, designers, agents, customers, and support engineers to design, create, collaborate, and modify digital designs of products. Examples of the products may include digital products, i.e., the products designed and delivered digitally-such as digital gift cards, party invitations in digital forms, digital greeting cards, announcements in digital forms, and the like. The products may also include physical products, i.e., the products may be designed digitally but delivered as physical things-such as physical t-shirts, physical mugs, physical water bottles, physical picture frames, and the like.

Digital designs may be transmitted from a product collaboration platform to manufacturing servers, or manufacturing entities, that may use the received digital designs to manufacture products either digitally or physically. The manufactured product may, in turn, be delivered to recipients. An example computer environment for collaborating and creating digital designs, manufacturing products based on the designs, and delivering the products to recipients is described in FIG. 2B.

A product collaboration platform may be used to provide various services. Examples of services provided by the platform may include supporting creating and collaborating on interactive product designs, processing requests for assistance in creating interactive product designs, processing requests for services such as sending thank-you cards, joining a community of designers and users that use the platform, and reordering the products. For example, the services may include creating and designing party invitations, greeting cards, gifts, and the like. The services may also include scheduling and planning events that occur periodically, such as birthdays, anniversaries, due dates, and the like. The services may further include planning events such as engagement parties, weddings, baby-shower parties, welcome-home parties, graduation parties, religious-event parties, and the like. Moreover, the services may include sharing pictures and comments with friends, families, acquaintances, coworkers, and the like.

Users of a product collaboration platform may have assigned roles. A role assigned to a user is a function of the role that is assumed, or played, by the user who participates in a collaboration session established to create an interactive digital design. Examples of roles may include a user role, a graphics designer role, a user peer role, an agent role, an editor role, and the like. Based on the assigned roles, the users may be granted different types of access to product descriptions of interactive digital designs.

A user role may be assigned to a user who is using a product collaboration platform to customize one or more interactive digital designs offered by the platform. A user may, for example, edit/modify attributes of an interactive object, view a rendering of the custom design, publish the custom design, and the like. A designer role may be assigned to a designer who is using a product collaboration platform to assist someone else in designing an interactive product design. Details descriptions of the roles are provided later.

In some implementations, an approach for generating and determining additional content based on product-tokens and using a digital product collaboration platform includes managing interactions taking place between users and the platform and enables creating additional gifts and designs of custom products. That may include managing access to product description data that captures key-value pairs describing the parameters and characteristics of the interactive digital designs as the user and the designers collaborate on the designs. Details about the key-value pairs are provided later.

In some implementations, an approach for generating product-tokens using a digital product collaboration platform provides a mechanism for capturing context of a user's visit on the collaboration platform, and more specifically, the context of the user's interactions with a product options framework implemented as part of a design framework of the collaboration platform.

One of the benefits of capturing and utilizing the context information for the user's visits is to be able to offer, to the users, additional functionality of the collaboration platform, suggest additional products and designs, increase the interactions between the users and the platform, increase a number of transactions between the users and the platform, and the like.

Additional benefits of capturing and utilizing the context information include expanding a social network of the users of the collaboration platform. For example, the context information may be used to create new events involving the current and new users, identify relationships between users, create new relationships between the users, create new relationship between the current users and new users, invite new users to interact and transact with the collaboration platform, and expand the community of users transacting with the collaboration platform.

18.1. Context Information

An approach for generating and determining additional contents may include collecting and maintaining knowledge of the context of the interactions between users and a collaboration platform. That may include collecting information about the type of the users' interactions, the timing of the interactions, the requests received from the users, the custom designs created by the users, and the like. The context information may include the data collected during the user's interactions with the platform, the data stored in the user's profile, the historical data collected for and about the user, the data about the products that the user created, custom and/or purchased, and the like.

Context information may be used to provide the form of the transactions between the users and the platform and to track the users' visits on the platform. The context information may also be used to unlock additional interaction opportunities for future transactions between the users and the platform.

Depending on the type of interactions between users and a collaboration platform, different context information may be collected. For example, referring again to FIG. 1A, when user 602A interacts with platform 100 to select and purchase, for example, a pet bowl for his dog, the related context information may include information about the user's dog, the type of bowl that the user selected, the type of food that the user has ordered, and the like.

According to another example, when user 602A interacts with platform 100 to plan his wedding, the related context information may include information about the names of the bride and groom, the date for the wedding, the names of guests that the user is inviting for his wedding, the relations between the guests and the user, and the like.

According to other example, when user 602A interacts with the platform to create invitations to his birthday party, the related context information may include information about the date of the user's birthday, the names of the guests that the user is inviting to his party, the relations between the guests and the user, and the like. Details about the context information are described later.

In some embodiments, based on context information collected based on, and about, a particular visit of user 602A on platform 100, the platform creates a bi-directed graph of user interactions where the graph nodes are represented by the individual user data, and the connected directional graph arcs are represented by the role-based transactions to and from each user. In this manner, the graph captures relationships between the user and other users or guests and captures and memorializes experiences that are highly relevant to the particular visit. The platform may also capture information about the products that user 602A has custom or created, the guests that the user invited, and the like. The context information may, therefore, be viewed as a fundamental building block for extending interactions between the users and the platform and for expanding the utilization of the platform in terms of supporting and memorializing the present and future events.

In some implementations, an approach for generating and determining additional contents based on product-tokens and using a product collaboration platform utilizes key-value pairs that capture information and design details of products that users created or used while interacting with the platform. The key-value pairs may describe the appearance, finishes, and other characteristics of the products. The key-value details may be then processed to determine context constraints, which in turn may be used to determine corresponding product-tokens. Details about key-value pairs and constraints are provided later.

18.2. Using Context Information to Unlock Additional Interaction Opportunities

Referring again to FIG. 1A, suppose that user 602A is creating and customizing a birthday card for his friend, user 602B, by interacting with platform 100. As user 602A interacts with the platform, context information related to the interaction may be collected and saved. That information may include a date of the birthday, a name of user 602B, additional information about user 602B, such as his age, his likes and no-likes, and the like. The context information may also include additional information about the birthday celebration, including a theme for the birthday party, gift information for the party, and the like. That information may be obtained by the platform via a user interface that the platform may generate and display for user 602A.

Collected context information may be used to unlock, or to enable, additional interaction opportunities for future transactions between the users and platform 100. For example, if the collected context information indicates that user 602A is creating a birthday card for user 602B, then platform 100 may suggest to user 602A to create a memory-based event for his own birthday. In addition, or in alternative, platform 100 may suggest to user 602A to create a memory-based birthday event for any person that user 602A knows, including user 602A himself, user 602B, and the like.

19. Example Computer Environments

In some embodiments, an approach for generating and determining additional contents based on product-tokens is implemented in a product collaboration platform. The platform allows users, designers, agents, customers, and support engineers, to collaborate with each other on designing and creating digital designs of custom products. A custom product may be a digital product, such as a digital gift card, or a physical product, such as a physical t-shirt. An example computer environment is described in FIG. 2A.

Figure 2A:
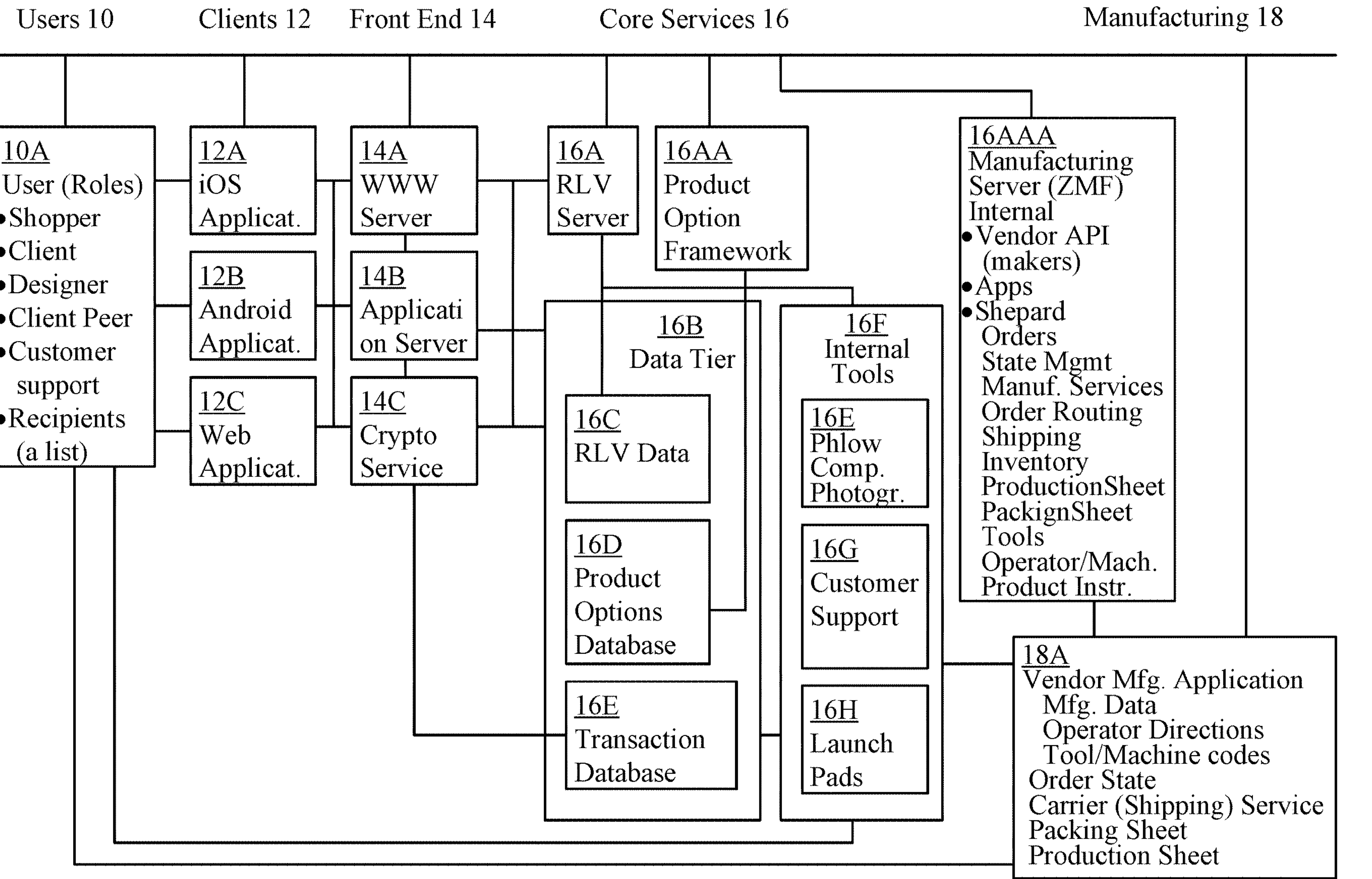
FIG. 2A is a block diagram showing an example of a role-based collaboration platform.

FIG. 2A is a block diagram showing an example environment for designing and manufacturing products. FIG. 2A, the other drawing figures, and all of the description and claims in this disclosure are intended to present, disclose, and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In FIG. 2A, users 10 are individuals who create and design digital designs of products; clients 12 correspond to software applications configured to facilitate communications between users 10 and front end servers 14; core services 16 correspond to software applications and tools configured to facilitate creating and designing of the digital designs and generating manufacturing instructions for manufacturing final products based on the digital designs; and manufacturing 18 corresponds to manufacturing servers and applications configured to manufacture, or cause manufacturing, the final products, generate product-tokens that allow recipients of the final products to request services and access to core services 16, and attach the product-tokens to, or depict the product-token on, the final products.

19.1. User Devices

FIG. 2A depicts several examples of users 10. Each of users 10 may use its own, or shared, computer device.

In some embodiments, examples of users 10 are determined based on the roles that may be assigned to the users. Examples 10A of roles may include a user, a designer, a client peer, a user support engineer, a recipient, and the like. Examples of user roles are described in detail in FIG. 8.

19.2. Client Applications

Clients 12 in FIG. 2A refer to client applications that are implemented in client servers and that are configured to support requests received from users 10A. Non limiting examples of Clients 12 may include iOS applications 12A, Android applications 12B, Web applications 12C, and the like.

19.3. Front End Servers

Front end servers 14 refer to computer-based servers that are configured to process requests received from clients 12 and from core services 16. Examples of front end servers 14 include one or more WWW servers 14A, one or more application servers 14B, one or more cryptographic servers 14C. Cryptographic servers 14C may be configured to provide cryptographic services for encrypting/decrypting, transmitting, or otherwise communicating data between the entities depicted in FIG. 2A.

19.4. Core Services

In FIG. 2A, core services 16 refer to servers and services implemented in a role-based collaboration platform configured to provide functionalities for creating and designing digital designs, handle collaboration requests, and facilitate the customization requests received from users 10. The role-based collaboration platform is described in detail in FIG. 2.

19.4.1. Generating Product Description Data

Referring again to FIG. 2A, a customization process performed by a user, of users 10, and intended to generate a digital design of a custom product is captured in so-called product description data, which then may be translated into a manufacturing description comprising product and manufacturing instructions.

The product and manufacturing instructions may include digital design specifications, data, and code needed to manufacture a custom product. That may include instructions for generating, for example, a 3D geometry for digital final products. This may also include generating instructions for generating 2D and/or 3D patterns that may be used to cut, cast, or form physical components of physical final products. The patterns may be parametric, i.e., they may have parameters that, through encoded relationships, adjust the form of the pattern for a specific need.

For instance, a set of 2D patterns for a t-shirt graded based on size, may become a parametric pattern by interpolating grade curvatures. A single parametric value may set this automatic grading. The single parametric value is usually called a 'size.'

The product instructions may also include models, including 2D and 3D models that are used to form, through additive manufacturing, or subtractive manufacturing, portions of a product. The models may be parametric, i.e., they may have parameters that, through coded relationships, adjust the form of the model for a specific need. For instance, a set of 3D models may represent a bike helmet. Each model may fit a statistically normed human head of a specific age. A coded relationship between the models may allow for interpolation of the set of models for a specific age. A single parametric value may set the automatic interpolation. The single parametric value in this case is usually called an 'age.'

The product instructions may also include material properties such as a physical material used to form a product from a pattern. Some material properties may be parametric, i.e., they may be selected or changed during the manufacturing time.

The properties may also include a body color. For instance, the color of a fabric may be selected for manufacturing a t-shirt. According to another example, the color of a plastic may be selected for manufacturing a bike helmet.

The properties may also include a body texture such as the fabric weave of a t-shirt may be specified to be smooth or rigid. For instance, the surface of a plastic bike helmet may be polished or satin. Each property is necessarily specific to each class of materials. Examples of materials and properties may include a fabric (such as a weave or knit type), a fiber type (cotton, wool, flax, polyester, polypropylene), a thread size, a thread count, a color, an integral design (ikat, knit, tapestry), a bolt width, a selvage type, a surface (hand), and the like.

The properties may also include plastics, which may include sub-properties such as a color, a surface quality (a bidirectional luminance function), a melting point, impact resistance, a forming method (thermoplastic, cast), a type (acrylic, abs, polypropylene, etc.), and the like.

The properties may also include metals, which may include sub-properties such as a type (aluminum, steel, copper, brass, etc.), a color, a surface quality (e.g., a bidirectional luminance function), a melting point, a tensile strength, a shear strength, a toxicity, and the like.

The properties may also include non-woven specified by a type (paper, felt, Tyvek, etc.), a color, a surface quality (e.g., a bidirectional luminance function), a surface type (hot pressed, natural, textured, etc.), a weight per square meter, an acid content, a compatible media, coating, and the like.

The properties may also include metamaterials which may be described as a combination of multiple materials created during a manufacturing process. For instance, during a fused deposition manufacture, plastics with a variety of properties may be mixed to provide a physical product with gradations of flexibility, durometer, and the like. According to another example, during laser sintering of metals, a mix of metal alloys with a variety of properties may be deposited, resulting in a product composed of gradations of metallic properties. According to yet another example, during high resolution UV-printing, layers of the UV-cured material with different refractive indices may be deposited, resulting in a large variety of optical effects.

The properties may also include embellishment such as a trim-color, designs, and applied ornaments. The trim colors may indicate the color of the edging around the sleeve of a t-shirt, the color of the trim around the base of a bike helmet, and the like.

The designs may indicate a custom printed front of a t-shirt, a custom thermal printed design to the side of a bike helmet, and the like.

The applied ornaments may indicate rhinestones on a t-shirt, holographic spangles on a bike helmet, and the like.

Some properties may apply to a large class of products and may allow for a limited set of properties to be transferred from one product to another. Other properties may be specific to a particular product or manufacturing method.

It may be appreciated that much of the novel art of the system and method is in enumerating the constraints imposed by manufacturing a specific custom product and crafting these constraints as a set of product option key-value pairs. The manufacturing constraints are propagated through the entire system and method, and by using these product option key-values, allowing for the manufacturing of a series of custom products that meet these physical constraints.

Referring again to FIG. 2A, in some embodiments, core services 16 refer to services implemented in a role-based collaboration platform. In the depicted example, core services 16 may be provided by one or more real-view (RLV) servers 16A and a product option framework 16AA. Both RLV servers 16A and product option framework 16AA may use one or more data tier databases 16B, including RLV Data 16C, a product options database 16D, a transaction database 16E, and the like. Examples of the RLV approaches are described, for example, in U.S. Pat. Nos. 8,856,160, 9,436,963, 8,654,120, 8,712,566, 8,958,633 B2, and 9,436,963; and U.S. patent application Ser. Nos. 17/193,512, 17/143,955, 17/038,659, and 16/867,898.

In some embodiments, core services 16 may also utilize internal tools 16F, such as a "Phlow" computational photographical tools 16E, a customer support tools 16G, a launch pads tools 16H, and the like.

Product option framework 16AA is also referred to as a persistent design data framework. The framework data may include a product options set, which may include a set of product options pertaining to a specific product type. In some embodiments, depicted in FIG. 2, a set of product options contains the product instructions generated by, for example, a product option framework 110 and collaboration components 106, shown in FIG. 2, for manufacturing, or producing, the product. Examples of the product option frameworks are described, for example, in U.S. Pat. Nos. 8,856,160, 9,436,963, 8,654,120, 8,712,566, 8,958,633 B2, and 9,436,963; and U.S. patent application Ser. Nos. 17/193,512, 17/143,955, 17/038,659, and 16/867,898. Examples of various tokens used by a collaboration platform are described, for example, in U.S. patent application Ser. Nos. 17/337,799, 17/955,394, and 17/955,392.

Referring again to FIG. 2A, product option framework 16AA is configured to provide services for transforming ProductOption key-value pairs (i.e., manufacturing constraints) from one product to the other. Transforming the ProductOption key-value pairs from one product to another may require, for example, transforming the color space (i.e., sRGB to CMYK US Web Coated (SWOP) v2), transforming an image from raster to vector, and/or resizing the image for the fit. An example use case of the product option framework is described in detail in FIG. 2.

In some embodiments, there are two basic types of product instructions (1) fixed (that include the instructions for the product which are fixed and not customized), and (2) custom (that contain the logic to transform a user interface parameter into a product instruction).

In some embodiments, the product option set contains the logic to enumerate each customizable option in a manner that presents a complete user interface to change the parametric product instructions.

The instructions for manufacturing a custom product are usually parametric. The parameters include the size of the custom product (this can be multi-dimensional, and include width, height, depth). The parameters may also relate to human sizes or ages. The parameters may also be custom and based on biometric information.

The parameters may also include a component body color, a component body texture, a trim body color, a trim body texture, a design area, and the like.

19.4.2. Generating Key-Value Pairs

In some embodiments, a product option may be represented as a key-value pair. The key-value pair is a label that may span individual products and represent a class of products. The keys of pairs may include a material type, a color, a size, and the like.

The value in a key-value pair is a specific discrete or continuous value that sets a manufacturing instruction. Examples of discrete (enumerated) values may include a discrete type of fabric such as cotton, cotton-polyester blend, silk, and the like. The discrete values may also include specific colors, such as white, navy, black, and the like.

Examples of continuous values of key-value pairs may include a single element, such a length or a ribbon, a vector, such as a size of a frame for a print (width (in inches)) or a height (in inches)), or the size of a box for the European countries, such as a size of a box for the EU (width (in millimeters), height (in millimeters), depth (in millimeters)).

The values may also reference a known file type, such as an image for the design on a t-shirt, such as an embroidery file for the back of a jacket, such as an engraving design for a bracelet, and the like.

In some embodiments, values in key-value pairs may include a set of graphic primitives for a design, such as an image, a line, a circle, a rectangle, a text, a group, and the like.

The product option key-values may have default values. Default values are pre-set values that will produce a product without changing any key-value pairs through customization. When key-values are changed they may produce a product option framework event chain. A product option framework event chain is a journal of each key-value change ordered in time.

A product type may itself be represented by a product option key-value. Using this option type, one product type may be associated with another product type through a well-known relationship.

In some embodiments, a product option framework event chain includes one or more products, and the chain may represent or memorialize an event. The products may represent or memorialize an event. Examples of events may include invitations, save the date cards, birthday cards, birthday gifts, anniversary cards, birth announcements, RSVP cards, holiday cards, holiday gifts, thank-you cards, get-well cards, and the like.

Many products fit into an event chain. For example, the products that fit into a wedding event may include the following products: save the date products, invitations, RSVPs, bachelor party invite products, bachelorette party invite products, party favors products, gift registry cards, place cards, napkins, wedding programs, wedding gifts, thank-you cards, wedding keepsake photos, and the like.

Examples of products that may fit into a birthdate event may include the following products: invitations, RSVPs, party bags, party keepsake photos, and the like.

In some embodiments, in a product option set event chain, a key-value pair encodes the next product in the chain. For example, an invitation may be chained to an RSVP card. A key-value may also encode the role for the chained event. For example, a chained RSVP card key-value may further include a recipient of the invitation as the sender role for the RSVP card.

A key-value pair may also encode the shared properties used to set the chained product's properties. For instance, a design for the invitation may be shared with the RSVP card. A key-value may also encode the timing for the chained product. Typically, the event chain properties are custom (parametric), and they may be changed by a product designer to fit a specific product set.

19.4.3. Generating a Graphical User Interface

In some embodiments, a product option framework is configured to generate a product option framework user interface. Accordingly, each product option set is associated with logic and code to build a user interface element for each parametric product option. Furthermore, each product options set contains style hints so that each user interface element may be artfully placed to produce a high quality user experience.

Typically, user interface elements are designed to match each class of values found in all products covered by a product option framework. New user interface elements may be added as the product categories expand. The user interface elements may include a design view, a color editor, a font editor, a size selector, a texture selector, a text editor, a fabric swatch selector, a product real view, and the like.

In some embodiments, a product options framework cooperates with a user product renderer that may be implemented in, for example, a RealView server 16A. The user product renderer may be configured to render views of a custom product as though it is already manufactured. Typically, it uses a product option set of key-values as input. It creates one or more run-time assets using computational photography of the manufactured product.

19.5. Example Manufacturing System

Referring again to FIG. 2A, manufacturing instructions may be communicated from core services 16 to manufacturing 16, which may include one or more manufacturing servers 16AAA. Servers 16AAA may receive the manufacturing instructions, process the instructions, and communicate with a vendor manufacturing application 18A to generate, for example, manufacturing data, operator directions, tool/machine codes, and the like. The application may also generate information about an order state, a packing slip, a production sheet, and the like. Some of that information may be communicated to a carrier (shipping) service selected to deliver the final products to the recipients.

For creation of RealView assets, a final product may be manufactured using markups. A markup for, for example, a body color of a product may be made by specifying a distinct and separate color for BodyColor key-value. A markup for the trim color of a product may be made by specifying a distinct and separate color for, for example, a TrimColor key-value pair. A markup for a design area of a product may be made by specifying a specific marker type (e.g., a removable linear markup, a digital markup, or a digital field markup) for a design-area image.

Construction of a so-called Product RealView geometry may be performed using computational photographic techniques using products manufactured with markup. For example, a BodyColor area of a surface may be recognized and layered as a custom computer graphics shader for rendering light, color, and texture. Each TrimColor area's surface may be recognized and layered as a custom computer graphics shader for rendering light, color, and texture. Rendering of the Product Real View may be performed by setting its product option key-values, and shading each of its constructed layers.

19.6. Example Manufacturing Process

A manufacturing process may pertain to manufacturing a digital product as well as manufacturing a physical product. Since the manufacturing instructions for generating a product are generated based on a plurality of key-value pairs for a digital design of the product, in some situations, the same manufacturing instructions may be used to manufacture the digital product as well as to manufacture the physical product.

In some implementations, a product options framework (described in detail in FIG. 2A) builds an interface for a key called OutputStyle. The interface for the OutputStyle key may allow a designer (or any other collaborator) to select values for the media for the presentation of an interactive design. The choices may include a JPEG_Image, a GIFF_Image, and an H264_Video.

If a designer chooses the GIFF_Image option, then the product options framework may send the instructions to the manufacturing system to traverse each of the key-values in the Key ValueJournal, and for each key, and use a User Product Renderer to render the state of the custom physical product with that modification as images in the sRGB 32-bit RGBA format. Subsequently, the manufacturing system may store the renderings in a local image cache.

Then, the manufacturing system may traverse the images stored in the local image cache and determine an optimal color palette for that collection of images.

Subsequently, the manufacturing system may convert the images in the local image cache from 32-bit RGBA format to 8 bit Indexed color.

Then, the manufacturing system may embed a digital watermark which encodes the input Key ValueJournal's UUID in the 8 bit indexed color image cache.

Next, the manufacturing system may begin encoding the image file. For example, the manufacturing system may write the header bytes; write the Logical Screen Descriptor bytes; write the found color palette as a gif Global Color Table; write the gif 8 bit character application name; and embed metadata as a comment (or a watermark) which encodes the input Key ValueJournal's UUID.

Next, the manufacturing system sets a FrameCount to 1 and proceeds to processing each frame in the image file. The processing includes checking if there is an image in the 8 bit indexed color image cache; and if so, then the manufacturing system continues; otherwise, the manufacturing system proceeds to taking the next image.

To continue, the manufacturing system writes the gif Graphic Control Description for the FrameCount, and then processes the first 8 bit indexed color image cache into blocks of 255 LZW compressed bytes.

Next, the manufacturing system writes the compressed bytes, and removes the first image from the 8 bit indexed color image cache. Then, the manufacturing system increments the FrameCount and repeats the process for the next frame.

Once the manufacturing system processes all frames, the manufacturing system writes the file terminator (such as an ASCII code for zero) to the image file and outputs the manufactured GIF product.

At this point, executing the manufacturing instructions for the purpose of manufacturing the product ends, and the manufacturing of the product is completed.

20. Example Product Collaboration Platform

In some implementations, the approach presented herein is implemented in one or more computer systems that host a product collaboration platform. Alternatively, the approach may be implemented in one or more computer systems that communicate with the collaboration platform but that do not actually host the platform itself. For the clarity of the description, it is assumed that the computer environment supporting the approach presented herein is implemented in the product collaboration platform.

Figure 2B:
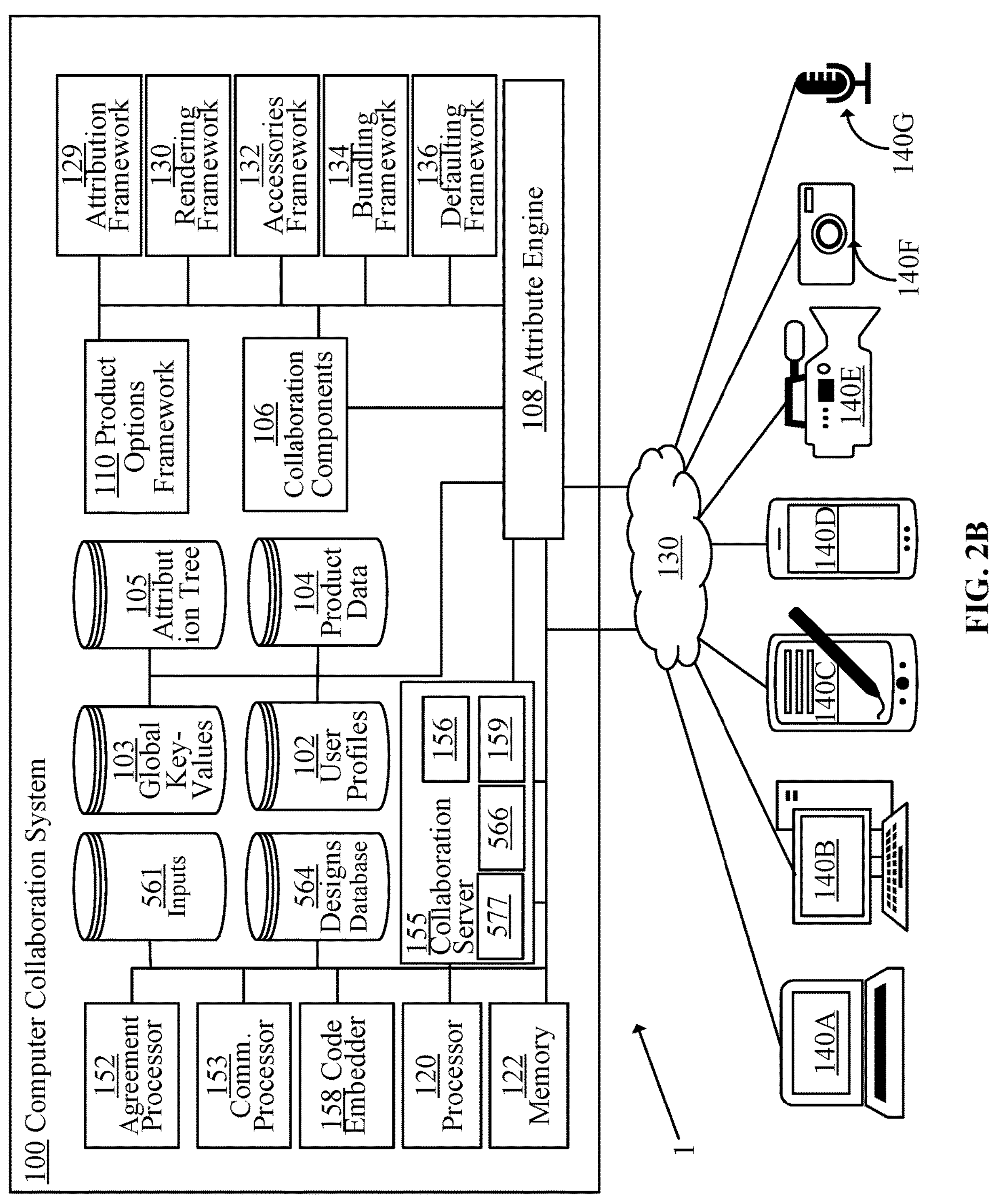
FIG. 2B is a block diagram showing an example of a role-based collaboration platform.

FIG. 2B is a block diagram showing an example of a role-based collaboration platform 1. In the example depicted in FIG. 2B, a computer collaboration system 100 includes a user profiles database 102, a global-key-values database 103, a product data definitions database 104, an attribution trees database 105, collaboration components 106, a product options framework 110, an attribute engine 108, one or more processors 120, one or more memory units 122, and one or more frameworks 129-136.

Furthermore, computer collaboration system 100 includes a collaboration server 155, one or more designer databases 562, one or more design databases 564, an agreement processor 152, a communications processor 153, and a code embedder 158. Computer collaboration system 100 may communicate directly, or via one or more communications networks 130, with one or more user computers 140A-140G, all described in detail later.

In some embodiments, collaboration server 155 comprises a monitoring system 156, a request analyzer 159, an interactivity module 577 and a designer selector 566. Additional modules may also be included in collaboration server 155. Details about collaboration server 155 are described later.

Computer collaboration system 100 shown in FIG. 2B is provided herein to illustrate clear examples and should not be considered as limiting in any way. Other computer collaboration systems may include additional components such as computer servers, various input/output devices, and additional software and/or hardware components that are not depicted in FIG. 2B. Other computer collaboration systems may be implemented in cloud-based systems, distributed computer networks, and the like. Other computer collaboration systems may include fewer components than example computer collaboration system 100 shown in FIG. 2B.

Product options framework 120 comprises a plurality of modules and applications which, when executed by one or more processors 120, cause the processors to implement the method for role-based and attribution-tracking collaborative design of custom products. Product options framework 120 may be configured to communicate with an attribution framework 129, a rendering framework 130, an accessories framework 132, a bundling framework 134, and a defaulting framework 136.

Attribution framework 129 may be configured to, for example, generate an attribution tree based on global-key-values collected during a customization session. Attribution framework 129 may also be configured to use the attribution tree to determine and verify corresponding licenses and copyright privileges for users/collaborators who participated in the customization session. Furthermore, attribution framework 129 may be configured to track the contributions of the collaborators and to derive the manufacturing instructions from the global-key-values collected during the session.

Product options framework 120 may be configured to receive inputs from rendering framework 130 to generate a rendering of an interactive design based on, at least in part, a current representation stored in collaboration components 106. Product options framework 120 may be also configured to receive inputs from accessories framework 132 to determine one or more accessories for an interactive design, and to include the determined accessories in the customization of the product.

Furthermore, product options framework 120 may be configured to receive inputs from building framework 134 to determine constraints for customizing an interactive design. This may include determining one or more attributes that are associated with the design and that can be custom by users. This may also include assigning default values to the determined attributes, determining ranges of values for the attributes, and/or determining sets of values that may be assigned to the attributes.

Product options framework 120 may be also configured to receive inputs from defaulting framework 126 to determine a default design for an interactive design, determine default roles that may be assigned to the user, and determine initial values for various parameters and attributes associated with the designs and collaboration sessions.

20.1. Attribute Engines

Attribute engine 108 may be configured to facilitate role-based collaboration of customizable products according to roles assigned to users and according to manufacturing constraints set forth for the products.

Attribute engine 108 may be configured to, for example, interact with collaboration components 106, product options framework 120, frameworks 130-136 and user devices 140A-140D to allow the users using devices 140A-140G to collaborate in customizing interactive designs offered by platform 10.

In some embodiments, attribute engine 108 may be configured to interact directly with users of user devices 140A-140G. In other embodiments, attribute engine 108 may be configured to interact with users of user devices 140A-140G via a computer network 130, as shown in FIG. 2B.

Computer network 130 may be implemented as any type of communications network, including a local area network (LAN), wide area network (WAN), a wireless network, a secure virtual LAN (vLAN), a secure virtual WAN (vWAN), and the like.

20.2. User Computers

User devices 140A-140G may include any type of communications devices configured to facilitate communications between users and computer collaboration system 100. In the example depicted in FIG. 2B, a user device 140A is a laptop, a user device 140B is a personal computer, a user device 140C is a personal assistant device, a user device 140D is a mobile device such as a smartphone, a user device 140E is a video camera, a user device 140F is a digital camera, and a user device 140G is a microphone configured to capture audio data and communicate the audio data to computer collaboration system 100.

The types and counts of user devices 140A-140G are not limited to the examples shown in FIG. 2B. For example, even though FIG. 2B depicts only one laptop 140A, one personal computer 140B, one personal assistant 140C, one smartphone 140D, one video camera 140E, one digital camera 140F, and one microphone 140G, platform 10 may include a plurality of laptops 140A, a plurality of personal computers 140B, a plurality of personal assistants 140C, a plurality of smartphones 140D, a plurality of video cameras 140E, a plurality of digital cameras 140F, and a plurality of microphones 140G. In other examples, user devices may include fewer devices than those depicted in FIG. 2B. In yet other examples, the user devices may include devices that are not depicted in FIG. 2B.

20.3. Collaboration Server

Collaboration server 155 may be implemented in software, hardware, or both, and may be configured to cooperate with monitoring system 156 to provide monitoring capabilities to operators of the platform and/or a third-party monitoring service. The capabilities may include the ability to intercept contents of communications exchanged between the users of the collaboration platform, determine whether the communications meet the terms of the collaboration agreements, and pursue actions to address violations when the communications fail to meet the rules set forth in the agreements.

Collaboration server 155 may be part of computer collaboration system 100, as shown in FIG. 2B. Alternatively, a collaboration server may be a system implemented in a computer server (not shown) that is separate from computer collaboration system 100.

In some embodiments, collaboration server 155 may comprise monitoring system 156, as shown in FIG. 2B. In other embodiments, collaboration server 155 may be separate from monitoring system 156.

In some embodiments, collaboration server 155 is configured to transform ownership and license agreements, embedded in a plurality of key-value pairs journaled during a collaboration session between collaborators, into a graph-network and then into an ownership-agreement tree. The ownership-agreement tree may be used to represent the ownership and license agreements between the collaborators participating in the collaboration session.

Collaboration server 155 may be also configured to evaluate the ownership-agreement tree with respect to a plurality of role-based communications channels, established between the collaborators, for each constraint of a plurality of constraints on each collaborator of the collaborators.

The constraints may be identified from the ownership-agreement tree, and may include rules, guidance, conditions, specifications, and provisions that set forth the manner in which collaborators may communicate with each other during collaboration sessions. Examples of constraints may include agreement constraints (such as ownership agreements, license agreements, and the like), use constraints (that impose limits on editing and modifying design elements produced by collaborators), communications constraints (that impose limits to durations of the sessions, inactivity during the sessions, and the like), interactions constraints (such as contractual constraints and professional-conduct constraints), and content constraints (imposing blacklists and whitelists on the communications). Some of the constraints may be system-wide constraints and apply to one or more, or all, collaborations supported by a collaboration platform.

20.4. Monitoring System

In some embodiments, monitoring system 156 is implemented as a component of collaboration server 155, as shown in FIG. 2B. In other embodiments, monitoring system 156 is implemented as a server (not shown) separate from collaboration server 155.

Monitoring system 156 may be configured to cooperate with collaboration server 155 in terms of tracking and monitoring the communications exchanged between collaborators, generating transcripts of the communications, and parsing the transcripts to determine characteristics of the corresponding data streams.

Monitoring system 156 may also be configured to assist collaboration server 155 in evaluating an ownership-agreement tree with respect to role-based communications channels, established between the collaborators, to determine whether any communications exchanged between the collaborators violate any constraints of a plurality of constraints.

20.5. Processors

In some embodiments, computer collaboration system 100 comprises agreement processor 152, communications processor 153, processor 120, and/or monitoring system 156. Among other things, components 152-153, 120 and 156 are configured to support collaboration server 155 in journaling key-value pairs that capture ownership and license agreements. They may also be configured to support transforming the key-value pairs into a graph-network and then into an ownership-agreement tree.

Components 152-153, 120 and 156 may also be configured to support collaboration server 155 in evaluating the ownership-agreement tree with respect to a plurality of role-based communications channels, established between the collaborators, for each constraint on each collaborator.

Moreover, components 152-153, 120 and 156 may support collaboration server 155 in determining whether one or more communications, monitored in the plurality of role-based communications channels, violate one or more constraints of the plurality of constraints.

That determination may include, among other things, generating transcripts of data intercepted from data communications channels supporting communications sessions established between collaborators. For example, components 152-153, 156 and 120 may generate a video transcript of the video chat and associate the transcript with the corresponding collaboration session. Components 152-153, 120 and 156 may provide the content of the transcript, including video frames, audio clips and chat texts, to monitoring system 156 and/or collaboration server 155.

Components 152-153, 120 and 156 may also be configured to collect statistical and diagnostic information about communications sessions established to support collaboration between users. For a communications session, the information may include information about the duration of the session, a count of retransmissions performed during the session, an indication of whether the session ended abruptly, and the like.

21. Example of Generating Customized Products 21.1. Collaboration

Figure 2C:
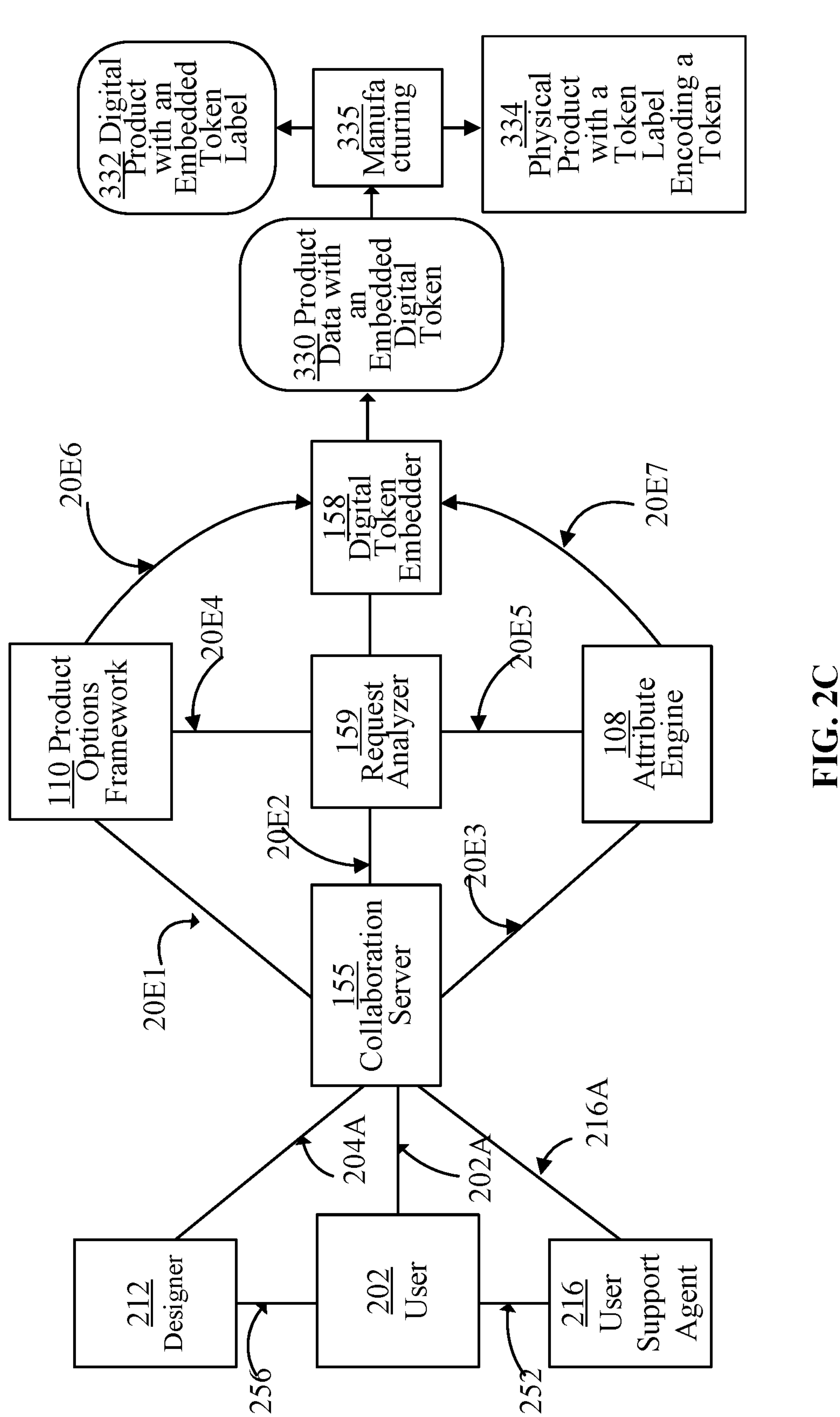
FIG. 2C is a block diagram showing a collaboration example implemented in a product collaboration platform.

FIG. 2C is a block diagram showing a collaboration example implemented in a product collaboration platform. In the depicted example, a user 202 collaborates with a designer 212 and/or a user support agent 216. The roles of individuals 202, 212 and 216 and the different ways of collaborating are described in detail in FIG. 8. In other examples, user 202 may contemporaneously collaborate with several peers, several support agents, and/or several designers.

In FIG. 2C, user 202 communicates with designer 212 via a communications session established along link 256 and communicates with user support agent 216 via a communications session established along link 252. The data communicated by designer 212 are transmitted to collaboration server 155 via a link 204A; the data communicated by user 202 are transmitted to collaboration server 155 via a link 202A; and the data communicated by agent 216 are transmitted to collaboration server 155 via a link 216A.

In some embodiments, monitoring system 156 of collaboration server 155 intercepts a data stream exchanged along link 256 and/or intercepts a data stream exchanged along link 252. Collaboration server 155 may cooperate with product options framework 110 and transmit (20E1) data to product options framework 110. Collaboration server 155 may also collaborate with attribute engine 108 and transmit (20E3) data to collaboration server 155.

Furthermore, collaboration server 155 may cooperate with request analyzer 159 and transmit (20E2) a request made by user 202 for, for example, assistance from designer 212 (or agent 216), to request analyzer 159.

In some embodiments, request analyzer 159 may request and receive (20E4) the data from product options framework 110. Furthermore, request analyzer 159 may request and receive (20E5) the data from attribute engine 108. Request analyzer 159 may also request information from designer database 562, designs database 564, and the like. Processing of the request is described in detail later.

Collaboration server 155, product option framework 110, attribute engine 108 and request analyzer 159 may cooperate with each other. This may include journaling a plurality of key-value pairs generated during the interactive session during which designer 212, user 202 and user support agent 216 create the interactive digital design. This may also include transforming ownership and license agreements, embedded in the plurality of key-value pairs journaled during a collaboration session, into, for example, a graph-network and then into an ownership-agreement tree. This may also include evaluating the ownership-agreement tree with respect to communications channels 256 and 252, established between user 202, designer 212 and user support agent 216, respectively to determine whether any communications between any users 202, 204 and 216 violated any constraints included in the ownership-agreement tree.

Collaboration server 155, product option framework 110, attribute engine 108 and request analyzer 159 may also cooperate with each other when a request for ordering, for example, a physical product corresponding to the interactive digital design is received. In response to receiving the request, collaboration server 155, product option framework 110, attribute engine 108 and request analyzer 159 may collaborate to generate, determine, or retrieve, a product-token 330 that represents a plurality of key-value pairs for the interactive design.

In some embodiments, digital product-token 330, capturing a plurality of key-value pairs for the product, may be stored at a location in a storage unit. The location may be identified using a hyperlink or a UUID, described before. The generating of the product-token and storing of the product-token may be performed by, for example, a code embedder 158, depicted in FIG. 2B.

In some embodiments, the hyperlink pointing to the location at which the plurality of key-value pairs is stored, or the UUID, is communicating to a manufacturing server 335. Manufacturing server 335 may retrieve, based on the hyperlink or the UUID, the plurality of the key-value pairs, and translate the pairs into, for example, manufacturing instructions for manufacturing an actual product. Then, manufacturing server 335 may use the manufacturing instructions to manufacture, based on the key-value pairs, an actual product. Depending on the manufacturing instructions, the actual product may be either a digital product 332 or a physical product 334.

Digital product 332 may be a digital greeting card, a digital invitation, or the like. Physical product 334 may be a physical water bottle, a physical mug, or the like.

In some embodiments, manufacturing server 335 generates a product-token that captures product-token data and describes how a user may request services related to the manufactured product, and how to access a product customization platform. The product-token, i.e., product-token digital data, may be encoded in a product-token label.

In some embodiments, if the actual product is digital product 332, then a product-token label is a product-token digital label pasted into an image of digital product 332. However, if the actual product is physical product 334, then a product-token label is a product-token physical label attached to the physical product 334.

21.2. User Roles

Various roles may be assigned to users who interact with digital product collaboration platform 100 via user devices 140A-140G. Examples of roles may include a user role, a user support agent role, a graphics designer role, a user peer role, and a user product artist role. Based on the assigned roles, the users may be granted access to a product description of an interactive design as editors, viewers, managers, and the like.

A user role may be assigned to a user who is a user and who wants to customize one or more interactive designs offered by platform 100. A user may, for example, edit/modify attributes of an interactive object, view a rendering of the customized design, publish the customized design, request that another user (a designer or a user support agent) modify the interactive design according to the users' description, request a list of modifications that the user proposed for the interactive design, and/or delete or revert some of the modifications included in the list.

A user support agent role may be assigned to a user who may assist other users in customizing an interactive design. A user support agent may, for example, help in modifying the interactive design, provide various views of the rendered design, publish the rendered design on behalf of the user, and the like.

A graphics designer role may be assigned to a user who may assist in defining attributes for an interactive design, defining default values for the attributes for the design, defining ranges of the values for the attributes for the design, and/or customizing the interactive design. For example, a graphics designer may define a set of attribute-default values pairs and store the pairs in product data definitions 104. A graphics designer may also define a set of roles that may be assigned to the users and store the set of roles in user profiles 102.

A user peer role may be assigned to a user who may view an interactive design customized by someone else. A user peer may, for example, view the interactive design and provide comments or feedback on the design to the user. A user peer may be granted access to a product description for the customized design, and in some embodiments, may modify the attributes associated with the design.

A user product artist role may be assigned to a user who may provide tutorials and online help in customizing interactive designs. A user product artist may define attributes for the designs, determine default values for the attributes, determine ranges of values for the attributes, determine the roles for the user who may be allowed to customize the interactive designs, and/or demonstrate how to use the customization functionalities.

Figure 3:
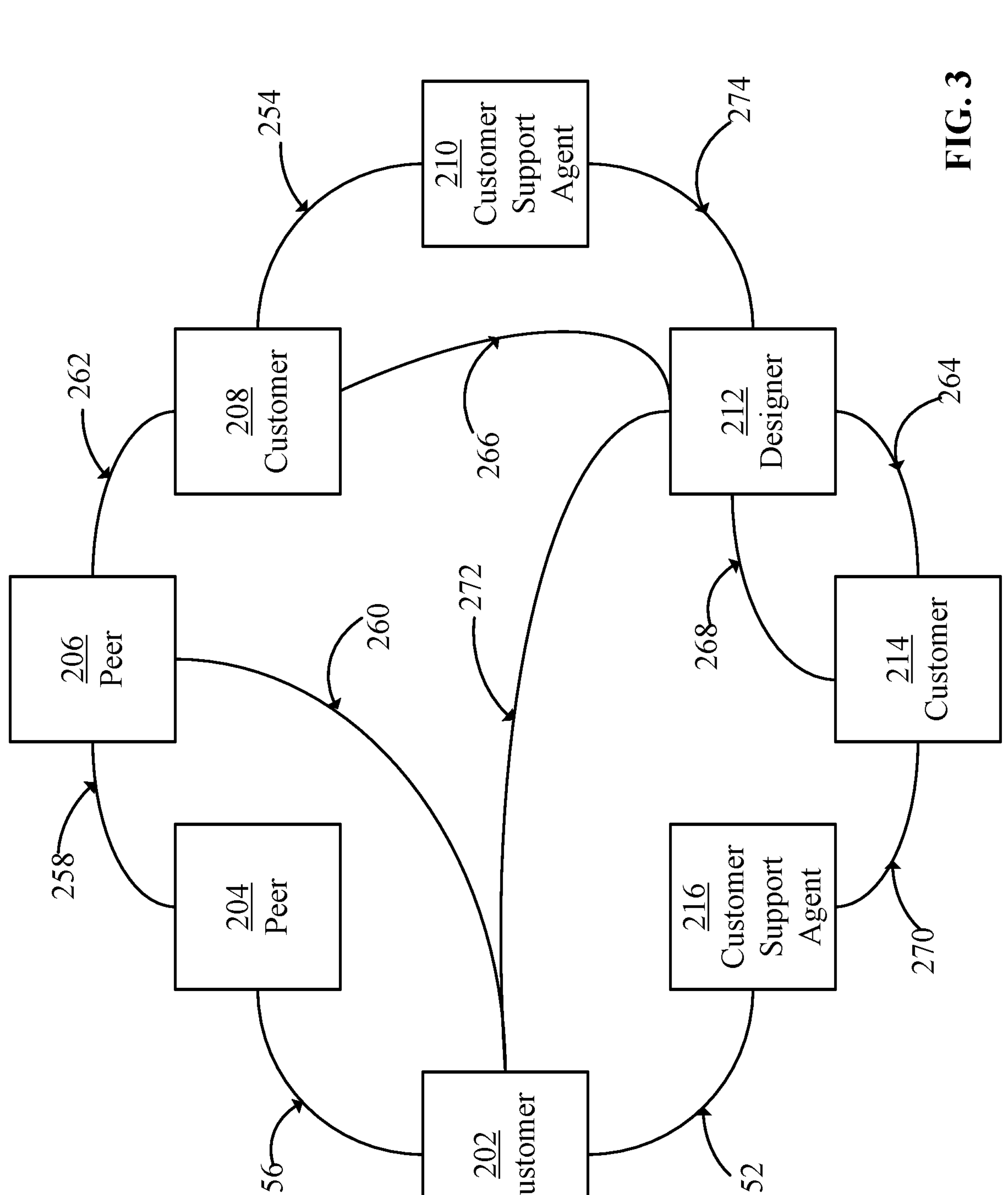
FIG. 3 is a block diagram showing a collaboration example implemented in a product collaboration platform.

FIG. 3 is a block diagram showing examples of roles in a product collaboration platform. In FIG. 3, examples of user-agent collaboration sessions include a session 252 between a user 202 and a user support agent 216, a session 254 between a user 208 and a user support agent 210, a session 264 between a user 214 and a designer 212, a session 266 between user 208 and designer 212, a session 268 between a user 214 and a designer 212, a session 270 between a user 214 and user support agent 216, and a session 272 between user 202 and designer 212.

Figure 4:
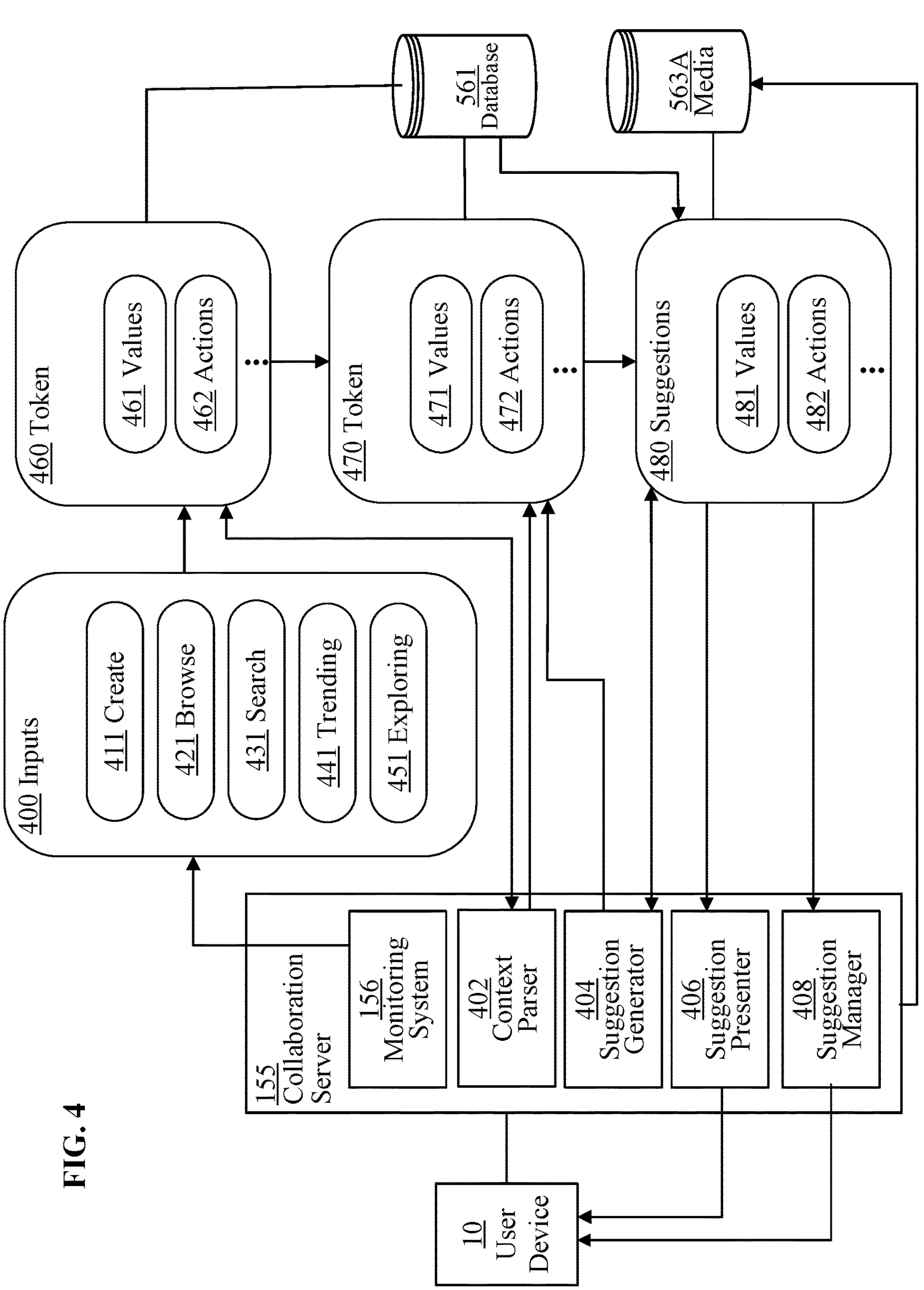
FIG. 4 is a block diagram showing examples of generating and determining additional content and products based on product-tokens.

FIG. 4 is a block diagram showing examples of generating and determining additional content and products based on product-tokens. A user of user device 10 may use email, text, phone, and any other type of comm Once the user explains to the agent the desired design, collaboration platform 100 (comprising a suggestion generator 404, a suggestion presenter 406, and a suggestion manager 408) may provide user interface data to the user's device. The interface may provide various input 400 options, including creating 411, browsing 421, searching 431, trending 441, exploring 451, and the like.

Using the interface, the user may select, from his user interface, a user interface element that would allow setting an editor role to the agent so that the agent could edit the interactive digital design for the user. The user may also request generating product-tokens 460/470 and associating with the product-tokens values 461/471 and actions 462/472. The user may also provide suggestions 480 with their corresponding values 481 and actions 482. The product-tokens and suggestions may be saved in databases 561 and 563A.

In response to that, the agent may be provided with an updated user interface or a new user interface that would allow the agent to modify the interactive digital design. For example, the agent could select, from his user interface, a location-based attribute (or a group of attributes) and modify a value associated with the attribute, select another attribute, and modify it, and so forth. Each modification may be automatically saved as a serialized key-value pair, and this solves the technical problem of navigating through countless sets of attributes and dealing with, for example, countless clicks to complete the customization as required in conventional customization platforms. The pairs may be transmitted to a product options framework, which would update the product description for the interactive digital design. Then, a product options framework may render a modified depiction of the interactive digital design and propagate the rendering to the user computers for rendering in the corresponding user interfaces.

21.3. User Profiles

Referring again to FIG. 2B, computer collaboration system 100 may include one or more storage devices for storing user profiles database 102. User profiles database 102 may be used to store information indicating roles assigned to individual users, access codes or keys assigned to the users, identifiers and passwords assigned to the users, and the like.

21.4. Product Definitions

Referring again to FIG. 2B, computer collaboration system 100 may further include one or more storage devices for storing product data definitions database 104. Product data definitions database 104 may include product descriptions of one or more interactive designs that are offered by computer collaboration system 100. A product description of an interactive design may include, for example, a global-key-values set, a set of attributes that are associated with the design, and default values that may be assigned to the attributes of the design.

21.5. Attribute Representations

Referring again to FIG. 2B, collaboration components 106 may include a component that is used to store a representation of attributes of an interactive design. The attributes may correspond to characteristics of the products and may be selected or provided by manufacturers of the products. The attributes may have assigned default values and the default values may be assigned either by the manufacturers, system administrators managing computer collaboration system 100 or platform 10, or artistic designers, as described earlier.

Descriptions of the attributes for each interactive design, or groups of designs, may be stored as part of collaboration components 106 or in a separate data structure that may be organized as a data table or storage space that is accessible to collaboration components 106. The descriptions of the attributes and values of the attributes associated with the products may be provided and/or requested by other components of computer collaboration system 100, such as a product options framework 120, which is described later.

For each interactive design available for customization using platform 100, default values of the attributes associated with the product may be modified by users according to the roles assigned to the users and according to the manufacturing constraints provided by a manufacturer. For example, if a customized product is a t-shirt, its default color may be red, but a user may modify the color by selecting any of three colors (e.g., red, green, or blue) to the tee-shirt. The modification may be stored in, for example, product data definitions 104.

An interactive design can be defined as the subset of the custom product attributes that may be altered, added, manufactured, or embellished for the purpose of custom product manufacturing. While the product attributes are product specific, they may include the substrate color or material choice for an area of the product, the trim material or color of a product, printed, engraved, or embroidered embellishments, and/or color palettes applied to the design.

Attribute definitions and types, as well as default values for the attributes of an interactive design, may be provided by a manufacturer or a designer of the design. The attributes and default values may be changed by the users according to, for example, the roles assigned to the users. For example, a user who is assigned a role of an artistic designer may be allowed to edit/modify the attributes associated with the design, edit the default values of the attributes, as well as edit the ranges of the values that may be assigned to the attributes.

Suppose that an interactive design is a mug. Then an artistic designer may define several attributes for the mug and define default values for the attributes. The attributes may include a color, a size, a label, and an ornamental design imprinted on the mug. The default values for the attributes may include red for the color, large for the size, hello for the label, and white stripes for the ornamental design. The artistic designer may also define that a user may modify the color of the mug by selecting either red or blue and may modify the size of the mug by selecting either large or small.

In some embodiments, a product description may include, or be associated with, a journaled list of modifications that have been submitted by users for an interactive design. The list may also include other information such as identifiers of the users who provided the modifications, global-key-values generated as the collaborators collaborated on the customized product, a history log of the modifications that have been accepted, reverted or deleted, comments that have been provided by the user, and the like. For example, one or more modifications stored in the list may be undone or redone by using a couple of clicks, not by performing countless clicks to undo or redo the customization as in conventional customization platforms.

21.6. Global-Key-Values

Referring again to FIG. 2B, computer collaboration system 100 may include one or more storage devices for storing global-key-values database 103. Global-key-values database 103 may store global-key-values sets that are used to track the contribution of each collaborator in a collaboration session, and to impartially establish copyrights and ownership for the customized product developed during the collaboration session.

All global-key-values pairs created and modified during a particular collaboration session are global in scope of that particular collaboration session. A global-key-value may correspond to a tuple, or a pair, that has a key and a value. While the key has a persistent meaning across all transactions, the value is scoped to a specific collaboration session. The key may indicate an attribute identifier/key, while the value may indicate a specific value for the key. For example, a global-key-value for an attribute called "owner" may include an "owner" as a key and a specific "user identifier" as a value. Detailed examples of global-key-values are described later.

For each customization project, at least one global-key-values set is generated. For example, when a customization project starts and a project owner initiates a collaboration customization session, collaboration system 100 may initiate global-key-values to indicate, for example, an identification of the owner, an identification of his license, and the like. Thus, the initial global-key-values set may include the following pairs: {Owner, user ID1}, {License, User ID1}. When the owner invites, for example, a designer to assist the owner with the customization, collaboration system 100 updates the set of global-key-values by adding an additional global-key-value pair to indicate, for example, an identification of the designer. Thus, the additional global-key-values pair may include: {Designer, user ID2}. When the owner decides to finish the collaboration customization session, collaboration system 100 may, for example, combine the relevant global-key-values pairs and initiate the processing of the pairs, as will be described later.

Examples of global-key-values may include constraints that specify rules and applicability of the rules to a product customization process, and transactions that specify entities and customization instructions for customizing the product. An example of a constraint global-key-value may include an age restriction constraint that prohibits individuals younger than 12 to customize the product. An example of a transaction global-key value may include a key-value pair that comprises customization instructions for a product customization.

In some embodiments, constraint global-key-values may be specified by an owner, a designer, and the like, during a product customization session, and may be used to specify one or more constraints to be applied to a product customization process. The examples of constraint global-key-values may include an age restriction constraint which may be represented as a key-value pair {Age, 12}. Age restriction constraint may, for example, indicate the minimum age of a user who could purchase a custom product. Since certain products may be inappropriate for children, using a constraint global-key-value pair {Age, 12} may indicate that only users who are at least 12 years old may purchase that product.

Another example of a constraint global-key-value is a content lock constraint, which may specify that a key-value or set of key-values may not be modified. Content lock may be a full lock, a partial lock, or a specific lock. For example, a user may specify that a first design is fully locked, while a second design is locked only if one attempts to modify a particular portion of the design (a partial lock or a specific lock).

Examples of constraint global-key-values may also include a blacklist content restriction constraint. This constraint may pertain to a list of content, such as imagery, text, color, or material composition. Blacklist constraint may include a blacklist key "Blacklist," and one or more names, words, and the like, to form: {Blacklist, name1, word1, . . . }.

Additional examples of constraint global-key-values may include a whitelist content restriction constraint. This constraint may pertain to a list of content, such as imagery, text, color, or material composition, that may be used to modify a key-value, or a set of key-values in the saved data of a product description, which is described later, or when a key value journal is applied to a custom product. Whitelist constraint may include a whitelist key "Whitelist," and one or more names, words, and the like, to form: {Whitelist, name1, word1, . . . } Additional details of constraint global-key-values are described later herein.

21.7. Additional Collaboration Components

Referring again to FIG. 2B, computer collaboration system 100 may include one or more software applications configured to implement collaboration components 106. Collaboration components 106 may include modules that are used to implement a role-based collaboration between users. The types of the modules included in collaboration components 106 may vary and may depend on the implementation of platform 100. In the example depicted in FIG. 2BA, collaboration components 106 include components configured to generate a plurality of representations. The examples of the representations are not shown in FIG. 2B, but they are, however, described below.

21.8. User Interface Elements

Collaboration components 106 may include a component that is used to store a representation of user interface elements (not shown) that users may use to collaborate with each other and to customize interactive designs.

A user may modify values of attributes defined for an interactive design by using user interface elements presented and displayed for the user in a user interface. Examples of user interface may include a graphical user interface, a command-line interface, and the like. The user may use the user interface elements to customize/modify a style, color, size, label, ornamental design, surface qualities, material type, and the like of the interactive design. Furthermore, the user may customize individual portions of the customizable product or groups of portions of the customizable product.

The type and selection of user interface elements to be provided to a user may depend on a role assigned to the user. For example, if a user is a user, then the user may edit his own interactive design, and thus he may be provided with a user interface that includes the interface elements that allow the user to edit and view the design, invite others to help the user in editing the design, invite others to view the design, and the like.

User interface elements may be specific not only to a role assigned to a user, but also to an interactive design itself. For example, if platform 10 offers customizable ties and customizable scarfs, and a user profile for a user includes information indicating that the user is a male, then it is assumed that the user might want to customize a tie, not a scarf. Furthermore, it may be assumed that the user would like to customize a color, a material, and a shape of the tie. Based on that information, collaboration components 106 may select the user interface elements that are specific to the tie and to the selection of the tie attributes.

22. Manufacture of Customized Products

Suppose that a custom digital product is a customized greeting card. Furthermore, suppose that in the course of one or more collaboration sessions, collaborators developed an interactive, digital design of the customized greeting card. The processes described above may be employed to digital print the customized greeting card.

In some embodiments, various means are provided for handling manufacturing of custom products provided in a digital form. In this context, a digital product is a product that may be fully realized in software and digital media. Such products may have functionalities that are similar to functionalities of physical products. For example, it is possible to manufacture a physical custom greeting card using the methods described herein, and it is also possible to produce a digital greeting card by using very similar means. Instead of publishing a greeting card using a printing process, a digital greeting card may be manufactured by publishing it in a digital form which may be viewed by a specific digital service.

Constraints for generating digital and physical greeting cards may be similar. The constraints may be managed by a product options framework, described above. Furthermore, generating digital and physical greeting cards may have resolution constraints. That means that for an optimal quality of the visual presentation of the cards, each card generating process may have a constraint in the number of pixels-per-inch that is required.

Furthermore, generating digital and physical greeting cards may have size and ratio aspect constraints. Based on the paper size in the physical case, and on screen size in the digital case, there are constraints on the formatting and placement of design elements for the greeting card.

Moreover, both have color constraints. Each may have a target ICC color profile that imposes a specific gamut of colors for manufacturing the product. In the case of the physical product, it may be a CMYK profile such as U.S. Web Coated (SWOP) v2. In the case of the digital version, it may be sRGB IEC61966-2.1. Publishing each product requires rendering each design element to fit the constraints.

Furthermore, both are published using manufacturing instructions that meet specific digital standards. Each must be expressed as a specific set of manufacturing instructions that meet the constraints. Finally, the customization and collaboration of each are usually the same.

In some embodiments, supporting digital products may include, but is not limited to, greeting cards, invitations, business insignias (such as logos, email and social media tags), birth announcements, personal identities, corporate communications, and virtual products, and as a product-token or representation of a physical product.

23. Flow Charts 23.1. Using Product-Tokens to Provide Additional Content

Figure 5:
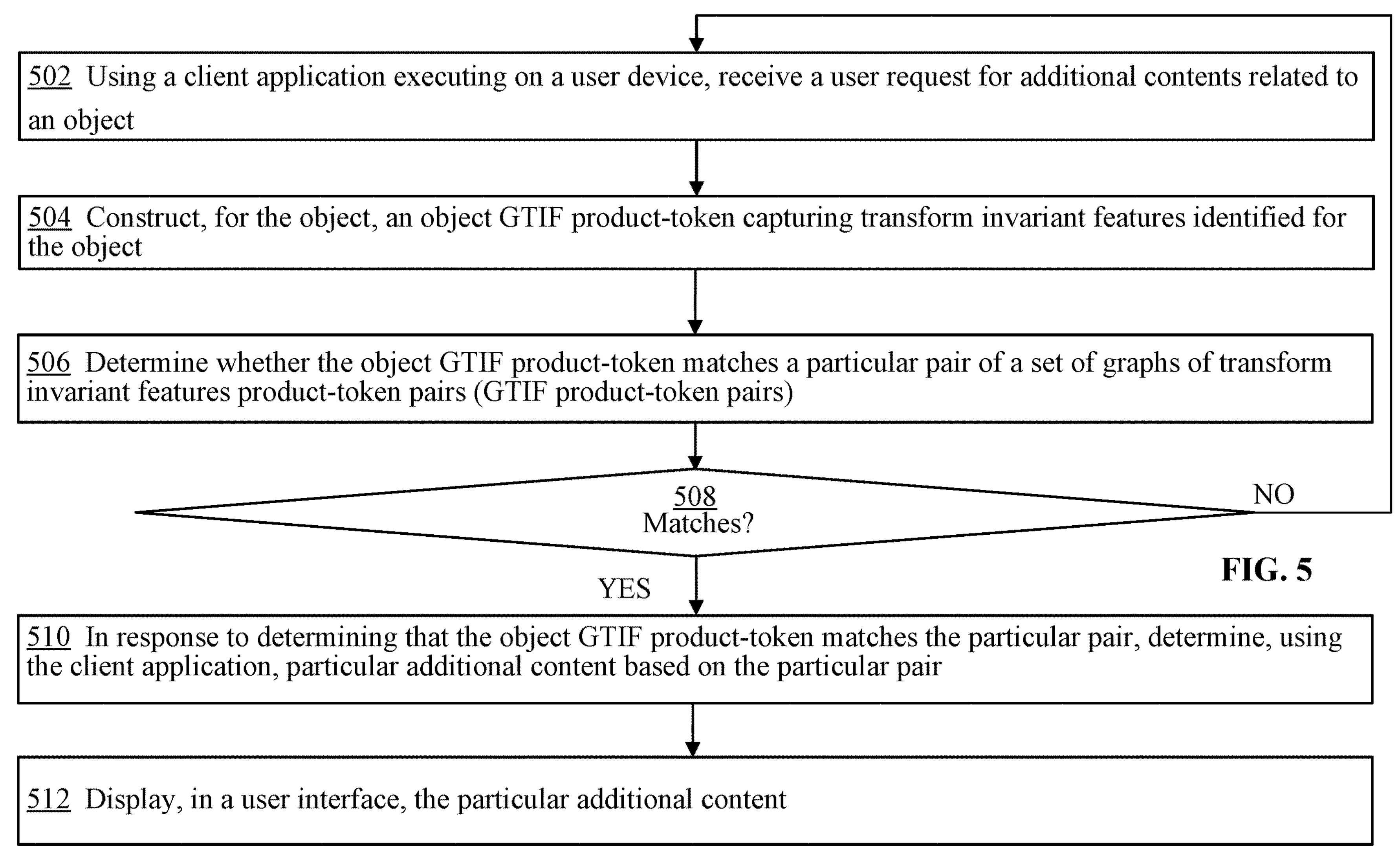
FIG. 5 is a flow diagram showing an example process implementing an approach for using product-tokens to provide additional content.

FIG. 5 is a flow diagram showing an example process implementing an approach for using product-tokens to provide additional content.

In step 502, a client application executing on a user device, receives a user request for additional contents related to an object.

In step 504, the client application constructs, for the object, an object GTIF product-token capturing transform invariant features identified for the object.

In step 506, the client application determines whether the object GTIF product-token matches a particular pair of a set of graphs of transform invariant features product-token pairs (GTIF product-token pairs). The set of GTIF product-token pairs typically comprises one or more of: a pair comprising a known GTIF product-token and a location data determined for a location of a user device, a pair comprising known GTIF product-token associated with a user of the user device and one or more social relationships defined for the user, a pair comprising known time based data associated with one or more events defined for the user and the one or more events, a pair comprising a GTIF product token and a representation of a physical object detected by a camera or sensors and communicated to the user device, or a pair comprising a GTIF product token and a representation of a digital object provided by the user device.

If, in step 508, it is determined that the object GTIF product-token matches a particular pair of a set of graphs of GTIF product-token pairs, then the client application proceeds to step 510. Otherwise, the client application may display an error message, or use a second set of graphs of GTIF product token pairs, as described later.

In step 510, in response to determining that the object GTIF product-token matches the particular pair, the client application determines particular additional content based on the particular pair and displays the particular additional content on the user device.

In step 512, the client application displays the particular additional content for a user. The particular additional content may be displayed in, for example, a user interface generated by the user application executing on the user device.

Typically, a GTIF product-token for a product is a complex data structure that is generated using advanced computer-based techniques. The techniques may include one or more: encoding spatial representations of certain features identified in the product or determining a set of invariant features that are specific to the product.

The invariant features are features that remain invariant of any 2D transformation performed on the features of the product.

A GTIF product-token for a product, of a pair of the set of GTIF product-token pairs, represents one or more of: one or more of relationships between a plurality of transform-invariant features identified for the product, or one or more relationships between the plurality of transform-invariant features identified for the product and other transform-invariant features identified for other products.

The set of GTIF product-token pairs is preloaded and updated on the user device from a server hosted by a collaboration platform.

In some implementations, in response to determining that the object GTIF product-token does not match any pair of the set of GTIF product-token pairs, the client application accesses, for example, a second set of GTIF product-tokens pairs that is different from the set of GTIF product-tokens pairs; and determines whether the object GTIF product-token matches a second particular pair of the second set of GTIF product-token pairs. In response to determining that the object GTIF product-token matches the second particular pair, the client application determines particular additional content based on the second particular pair and displays the particular additional content on the user device.

Typically, a product has a plurality transform invariant features and a corresponding plurality of GTIF product-tokens, wherein a GTIF product-token is used to determine whether the GTIF product-token matches a particular pair of the set of GTIF product-token pairs.

A GTIF product-token pair comprises additional context data that include one or more of: location data determined based on GPS location data obtained from one or more of: the location of the user device, a photo, an address of an event, or an address of customers or users; social relationship data of a creator or a recipient of the product; or time based data determined based on one or more of: a time of an event, a time when a photo was taken, or a time when a message was sent.

In some implementations, finding additional content that is related to the object is a search that requires comparisons between non-directed graphs having a plurality of nodes, wherein the nodes represent transform invariant features, wherein a time for comparison performed as a series of instructions on computing machinery increases based on a number of comparisons, and wherein a number of transform invariant features exceeds practical limits of user interaction time;

A GTIF product-token is usually generated using one or more of: a scale-invariant feature transform feature recognition method (SIFT), a simultaneous localization and mapping feature recognition method (SLAM), or a speed up robust features feature recognition method (SURF).

According to another implementation, in the first step, a client application executing on a user device generates a product-token that captures information depicted or otherwise included in a custom product. The product-token is generated based on one or more portions or types of the information included in, or depicted on, the custom product. The product-token comprises one or more digital hyperlinks indicating one or more locations in a storage device at which one or more additional contents and identifiers of additional products have been stored. The one or more additional contents and the additional products are related to the custom product, have been constructed around the custom product, or are associated with circumstances related to an event related to the custom product. The one or more additional contents may be displayed as an overlay over a graphical representation of the custom product. An additional content, of the one or more additional contents, may be displayed by launching and causing executing a software application on the user device to generate a webpage that displays a graphical representation of the additional content. Furthermore, the one or more additional contents may include one or more of: customizable products, photographs, videos, notes, lists, maps, or events.

In a next step, the client application transmits the product-token from the client application to a server application executing by a collaboration platform to cause the collaboration platform to: determine, based on the product-token, one or more additional contents, where the one or more additional contents are related to the custom product, or are associated with one or more characteristics of the custom product. Furthermore, the client application causes the collaboration platform to transmit the one or more additional contents from the server application executing by the collaboration platform to the client application executing on the user device.

In a next step, the client application generates a user interface configured to display the one or more additional contents and displays the one or more additional contents on the user device.

In a next step, the client application determines whether a selection of a particular content, from the one or more additional contents displayed on the user device, has been received via the user interface. If the selection was received, then the client application proceeds to execute a step described below. Otherwise, the client application continues testing.

In a next step, in response to receiving, via the user interface, the selection of the particular content from the one or more additional contents displayed on the user device, the client application transmits the particular content from the client application to the server application executing by the collaboration platform to cause the collaboration platform to determine, based on the particular content, one or more additional subjects. The one or more additional subjects are related to the particular content or are associated with one or more characteristics of the particular content. Furthermore, the client application causes the collaboration platform to transmit the one or more additional subjects from the server application executing by the collaboration platform to the client application executing on the user device.

In a next step, the client application causes displaying, in the user interface, the one or more additional subjects on the user device.

23.2. Using Product-Tokens to Enhance Searches

Figure 6:
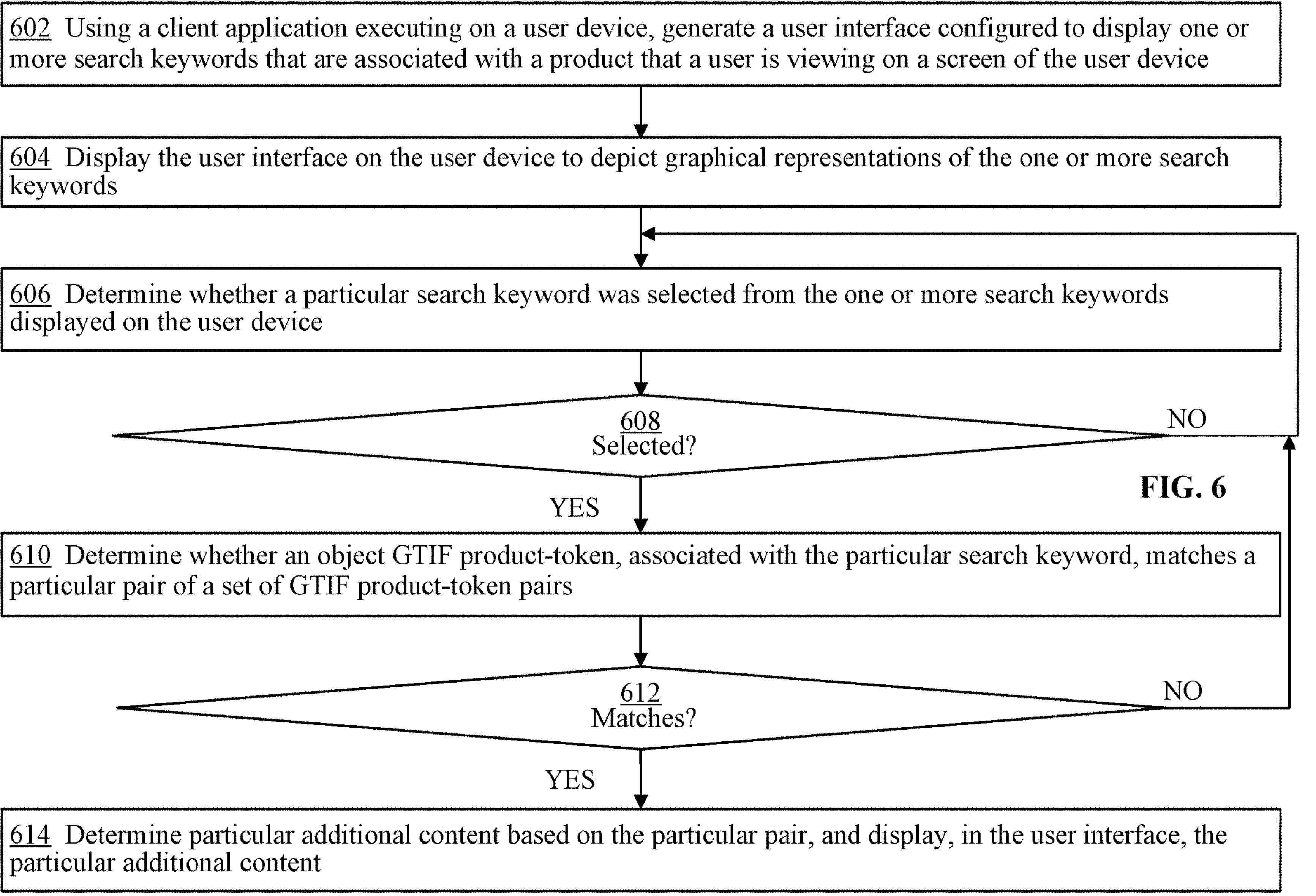
FIG. 6 is a flow diagram showing an example process implementing an approach for using product-tokens to enhance searches.

FIG. 6 is a flow diagram showing an example process implementing an approach for using product-tokens to enhance searches.

In step 602, a client application executing on a user device, generates a user interface configured to display one or more search keywords that are associated with a product that a user is viewing on a screen of the user device.

Usually, the search keywords are the keywords that have been associated with one or more corresponding graphs of transform invariant features product-tokens (GTIF product-tokens).

In step 604, the client application displays the user interface on the user device to depict graphical representations of the one or more search keywords.

In step 606, the client application determines whether a particular search keyword was selected from the one or more search keywords displayed on the user device.

If in step 608, the client application determines that the particular search keyword was selected from the one or more search keywords displayed on the user device, then the process proceeds to step 610. Otherwise, either new keywords are generated or the process awaits a selection of another keyword from the one or more keywords in step 606.

In step 610, in response to determining that the particular search keyword was selected from the one or more search keywords displayed on the user device, the client application determines whether an object GTIF product-token, associated with the particular search keyword, matches a particular pair of a set of GTIF product-token pairs.

In some implementations, the set of GTIF product-token pairs comprises one or more of: a pair comprising a known GTIF product-token and a location data determined for a location of a user device, a pair comprising known GTIF product-token associated with a user of the user device and one or more social relationships defined for the user, a pair comprising known time based data associated with one or more events defined for the user and the one or more events, a pair comprising a known GTIF product-token and a representation of a physical object detected by a camera or sensors and communicated to the user device, or a pair comprising a known GTIF product-token and a representation of a digital object provided by the user device.

In step 612, the client application tests whether the match is found. If the match is found, then the process proceeds to step 614. Otherwise, the testing is either repeated or the process proceeds to step 606.

In step 614, in response to determining that the object GTIF product-token matches the particular pair, the client application determines particular additional content based on the particular pair and displays the particular additional content on the user device.

Usually, a GTIF product-token, of the one or more corresponding GTIF product-tokens, is a complex data structure that is generated using advanced computer-based techniques that include one or more: encoding spatial representations of certain features identified in the product or determining a set of invariant features that are specific to the product.

The set of invariant features includes features that remain invariant of any 2D transformation performed on the features of the product.

The one or more search keywords include one or more terms such as: product, venue name, guests name, directions, maps, hotels, events, individuals' names, things, or vegetation.

A GTIF product-token for a product, of a pair of the set of GTIF product-token pairs, represents one or more of: one or more of relationships between a plurality of transform-invariant features identified for the product, or one or more relationships between the plurality of transform-invariant features identified for the product and other transform-invariant features identified for other products.

The particular additional content is displayed as an overlay over a graphical representation of the product. The particular additional content is displayed by launching and causing execution of a software application on the user device to generate a webpage that displays a graphical representation of the additional content. The product has usually a plurality transform invariant features and a corresponding plurality of GTIF product-tokens. A GTIF product-token is used to determine whether the GTIF product-token matches a particular pair of the set of GTIF product-token pairs.

Usually, a GTIF product-token pair comprises additional context data that include one or more of: location data determined based on GPS location data obtained from one or more of: the location of the user device, a photo, an address of an event, or an address of customers or users; social relationship data of a creator or a recipient of the product; or time based data determined based on one or more of: a time of an event, a time when a photo was taken, or a time when a message was sent.

In some implementations, the determining of the particular additional content based on the particular pair is a search that requires comparisons between non-directed graphs having a plurality of nodes. The nodes represent transform invariant features, wherein a time for comparison performed as a series of instructions on computing machinery increases based on a number of comparisons, and wherein a number of transform invariant features exceeds practical limits of user interaction time.

A GTIF product-token is generated using one or more of: a scale-invariant feature transform feature recognition method (SIFT), a simultaneous localization and mapping feature recognition method (SLAM), or a speed up robust features feature recognition method (SURF).

According to other implementations, in the first step, a client application executing on a user device generates a user interface configured to display one or more search keywords that are associated with a custom product that a user is viewing on a screen of the user device. The one or more search keywords have been associated with one or more corresponding product-tokens. A product-token, of the one or more corresponding product-tokens, has been generated based on one or more portions or types of information included in, or depicted on, the custom product.

The search keywords may include one or more terms such as: product, venue, guests, directions, maps, hotels, events, individuals, things, or vegetation.

In a next step, the client application displays the user interface on the user device to present graphical representations of the one or more search keywords.

In a next step, the client application determines whether a selection of a particular search keyword, from the one or more search keywords displayed on the user device, has been received via the user interface. If the selection has been received, then the client application proceeds to a next step. Otherwise, the client application continues testing.

In a next step, in response to receiving, via the user interface, the selection of the search keyword from the one or more search keywords displayed on the user device, the client application transmits the particular search keyword from the client application to a server application executing by a collaboration platform to cause the collaboration platform to: determine, based on the particular search keyword, a corresponding product-token from the one or more corresponding product-tokens, based on the corresponding product-token, determining one or more additional contents.

The one or more additional contents can be related to the particular search keyword or are associated with one or more characteristics of the particular search keyword. Furthermore, the client application causes the collaboration platform to transmit the one or more additional contents from the server application executing by the collaboration platform to the client application executing on the user device.

The additional contents may be displayed as an overlay over a graphical representation of the custom product. An additional content, of the one or more additional contents, may be displayed by launching and causing executing a software application on the user device to generate a webpage that displays a graphical representation of the additional content. The additional contents may include one or more of: customizable products, photographs, videos, notes, lists, maps, or events.

In a next step, the client application causes displaying, in the user interface, the one or more additional contents on the user device.

Furthermore, the client application may determine whether a selection of a particular content, from the one or more additional contents displayed on the user device, has been received via the user interface.

In response to receiving, via the user interface, the selection of the particular content from the one or more additional contents displayed on the user device, the client application transmits the particular content from the client application to the server application executing by the collaboration platform to cause the collaboration platform to: determine, based on the particular content, one or more additional subjects. The one or more additional subjects may be related to the particular content or are associated with one or more characteristics of the particular content. Furthermore, the client application may cause the collaboration platform to transmit the one or more additional subjects from the server application executing by the collaboration platform to the client application executing on the user device.

Then, the client application causes displaying, in the user interface, the one or more additional subjects on the user device.

Generally, the product-token comprises one or more digital hyperlinks indicating one or more locations in a storage device at which the one or more additional contents and identifiers of additional products have been stored, while the one or more additional contents and the additional products are related to the custom product, have been constructed around the custom product, or are associated with circumstance related to an event related to the custom product.

23.3. Graphical User Interface for Managing and Using Product-Tokens

In some implementations, a client application has a preloaded and updated set of GTIF-product-token pairs. Based on known GTIF-product-token pairs and, for example, location data indicating the location near the location of the client device, a GUI may be generated.

Generating the GUI may also take into consideration known GTIF-product-token associated with the user, or with their social relationships. Furthermore, the GUI may be also generated based on known time based data, such as the likely time a gift is received or sent.

Additional elements may include physical objects that are within view of the client camera or sensors may assemble a GTIF of that object.

Based on some, or all, the above listed elements, an object match may be optimized by searching the pre-loaded set.

Figure 7A:
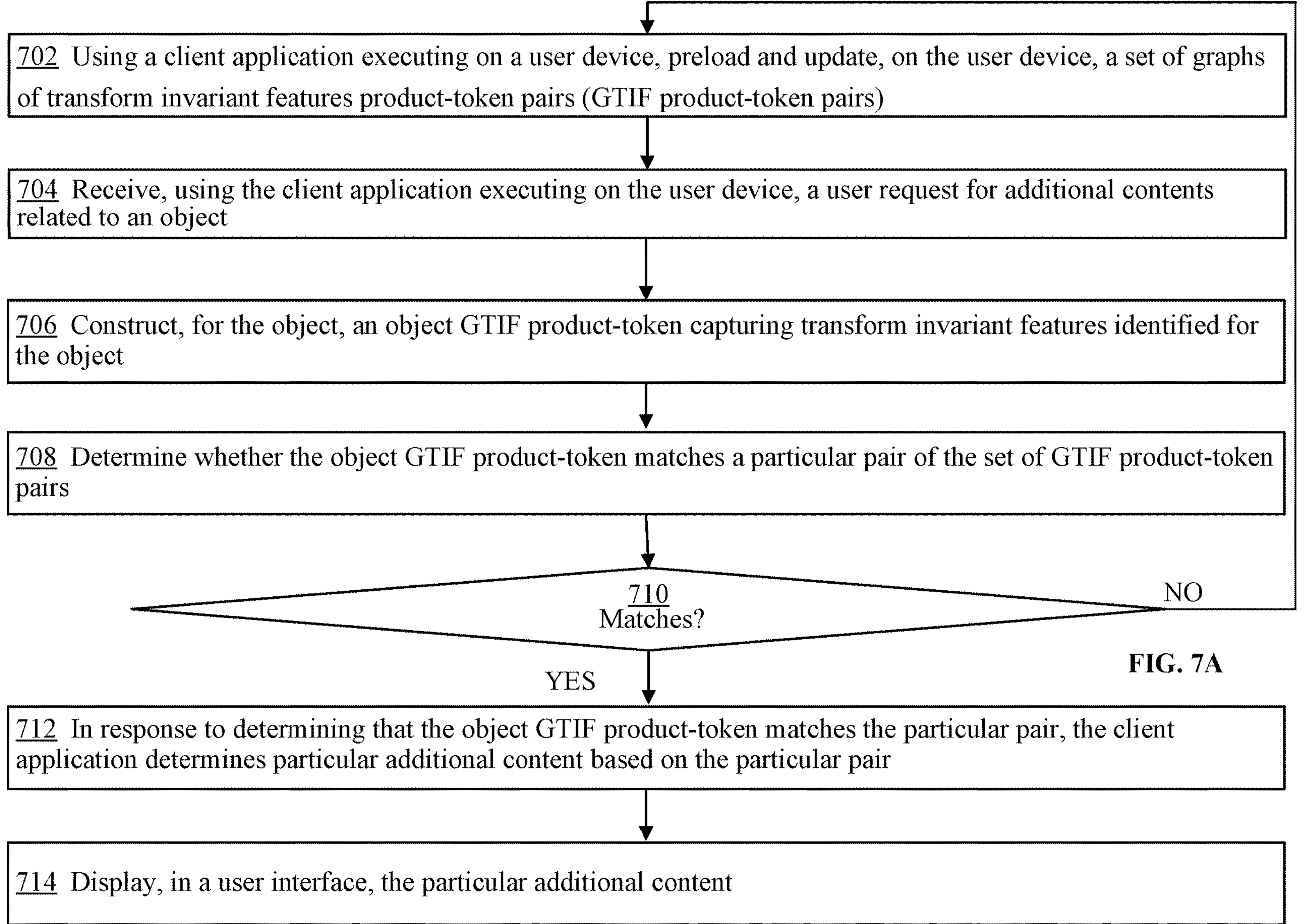
FIG. 7A is a flow diagram showing an example process implementing an approach for generating a product-token-based graphical user interface (GUI).

FIG. 7A is a flow diagram showing an example process implementing an approach for generating a product-token-based GUI. In step 702, a client application executing on a user device preloads and updates, on the user device, a set of graphs of transform invariant features product-token pairs (GTIF product-token pairs). The set of GTIF product-token pairs comprises one or more of: a pair comprising a known GTIF product-token and a location data determined for a location of a user device, a pair comprising known GTIF product-token associated with a user of the user device and one or more social relationships defined for the user, a pair comprising known time based data associated with one or more events defined for the user and the one or more events, a pair comprising a GTIF product token and a representation of a physical object detected by a camera or sensors and communicated to the user device, or a pair comprising a GTIF product token and a representation of a digital object provided by the user device.

In step 704, the client application receives a user request for additional contents related to an object.

In step 706, the client application constructs, for the object, an object GTIF product-token capturing transform invariant features identified for the object.

In step 708, the client application determines whether the object GTIF product-token matches a particular pair of the set of GTIF product-token pairs.

If in step 710, the client application determines that the match has been found, then the process proceeds to step 712. Otherwise, the client application can update (or preload) the set of GTIF product-token pairs in step 702.

In step 712, in response to determining that the object GTIF product-token matches the particular pair, the client application determines particular additional content based on the particular pair, and, in step 714, the client application displays the particular additional content on the user device.

However, in response to determining that the object GTIF product-token does not match any pair of the set of GTIF product-token pairs: the client application accesses a second set of GTIF product-tokens pairs that is different from the set of GTIF product-tokens pairs. Then the client application determines whether the object GTIF product-token matches a second particular pair of the second set of GTIF product-token pairs.

In response to determining that the object GTIF product-token matches the second particular pair, the client application determines particular additional content based on the second particular pair and displays the particular additional content on the user device.

Typically, a GTIF product-token for a product is a complex data structure that is generated using advanced computer-based techniques that include one or more: encoding spatial representations of certain features identified in the product or determining a set of invariant features that are specific to the product.

The invariant features are usually the features that remain invariant of any 2D transformation performed on the features of the product.

A GTIF product-token for a product, of a pair of the set of GTIF product-token pairs, usually represents one or more of: one or more of relationships between a plurality of transform-invariant features identified for the product, or one or more relationships between the plurality of transform-invariant features identified for the product and other transform-invariant features identified for other products.

A product has usually a plurality transform invariant features and a corresponding plurality of GTIF product-tokens.

A GTIF product-token is used to determine whether the GTIF product-token matches a particular pair of the set of GTIF product-token pairs.

A GTIF product-token pair comprises additional context data that include one or more of: location data determined based on GPS location data obtained from one or more of: the location of the user device, a photo, an address of an event, or an address of customers or users; social relationship data of a creator or a recipient of the product; or time based data determined based on one or more of: a time of an event, a time when a photo was taken, or a time when a message was sent.

In some implementations, finding additional content that is related to the object is a search that requires comparisons between non-directed graphs having a plurality of nodes, wherein the nodes represent transform invariant features, wherein a time for comparison performed as a series of instructions on computing machinery increases based on a number of comparisons, and wherein a number of transform invariant features exceeds practical limits of user interaction time.

A GTIF product-token is generated using one or more of: a scale-invariant feature transform feature recognition method (SIFT), a simultaneous localization and mapping feature recognition method (SLAM), or a speed up robust features feature recognition method (SURF).

In some other implementations, in a first step, a client application executing on a user device receives a first indication that a user requested additional contents as the user views a custom product.

In a next step, the client application generates, based on the first indication, a first user interface configured to display one or more product-tokens that are associated with the custom product that the user is viewing on a screen of the user device. The product-tokens have been generated based on one or more portions or types of information included in, or depicted on, the custom product.

In a next step, the client application causes displaying the first user interface on the user device to present graphical representations of the one or more product-tokens.

In a next step, the client application tests whether the client application received, via the first user interface, a selection of a product-token, from the one or more product-tokens, displayed on the user device. If the selection has been received, then the client application proceeds to a next step. Otherwise, the client application continues testing.

In a next step, the client application transmits the product-token from the client application to a server application executing by a collaboration platform to cause the collaboration platform to: determine, based on the product-token, one or more additional contents. The additional contents may be related to the custom product or are associated with one or more characteristics of the custom product. Furthermore, the client application causes the collaboration platform to transmit the one or more additional contents from the server application executing by the collaboration platform to the client application executing on the user device.

In a next step, the client application causes displaying in the first user interface the one or more additional contents on the user device.

23.4. Using Images of Objects to Generate Tokens and Provide Additional Content

Figure 7B:
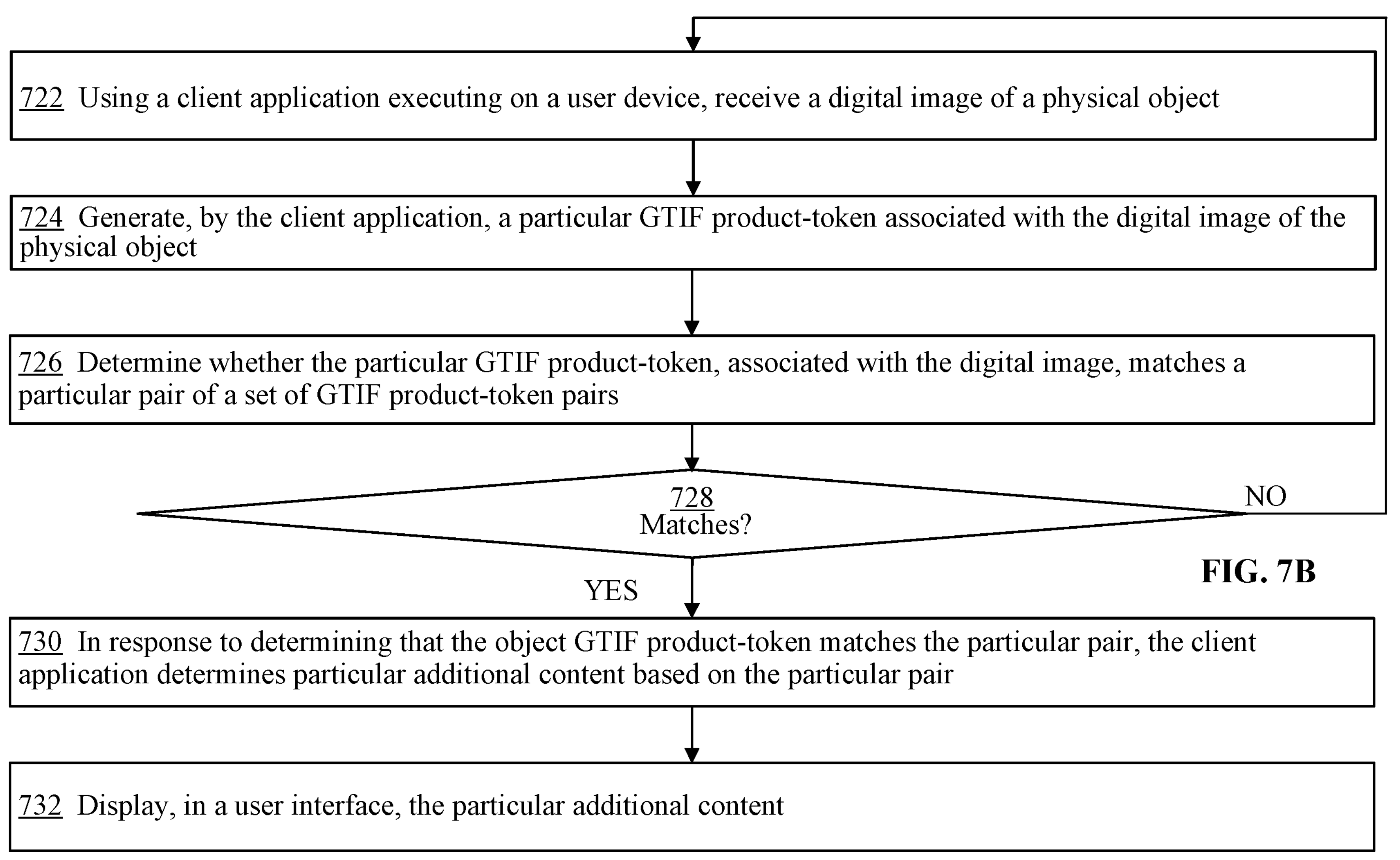
FIG. 7B is a flow diagram showing an example process implementing an approach for using images of objects to generate tokens and provide additional content.

FIG. 7B is a flow diagram showing an example process implementing an approach for using product-tokens and user data to enhance searches. In step 722, a client application executing on a user device, receives a digital image of a physical object.

In step 724, the client application generates a particular GTIF product-token associated with the digital image of the physical object.

In step 726, the client application determines whether the particular GTIF product-token, associated with the digital image, matches a particular pair of a set of GTIF product-token pairs.

Usually, the set of GTIF product-token pairs comprises one or more of: a pair comprising a known GTIF product-token and a location data determined for a location of a user device, a pair comprising known GTIF product-token associated with a user of the user device and one or more social relationships defined for the user, a pair comprising known time based data associated with one or more events defined for the user and the one or more events, a pair comprising a known GTIF product-token and a representation of a physical object detected by a camera or sensors and communicated to the user device, or a pair comprising a known GTIF product-token and a representation of a digital object provided by the user device.

If in step 728, the client application determines that the particular GTIF product-token, associated with the digital image, matches a particular pair of a set of GTIF product-token pairs, then the process proceeds to step 730. Otherwise, either the testing is repeated or another digital image is processed in step 722.

In step 730, in response to determining that the particular GTIF product-token matches the particular pair, the client application determines particular additional content based on the particular pair, and, in step 732, the client application displays the particular additional content on the user device.

The digital image may be obtained by scanning the physical object using a scanner, such as a standalone camera communicatively coupled to the user device, a camera installed in the user device, or a standalone scanner communicatively coupled to the user device. The user device is any one of: a smartphone, an iPad, a laptop, or a PDA.

In some implementations, a GTIF product-token comprises one or more digital hyperlinks indicating one or more locations in a storage device at which the particular additional content and identifiers of additional products have been stored.

The particular additional content and the additional products are related to the physical object, have been constructed around the physical object, or are associated with circumstance related to an event related to the physical object or the digital image.

A GTIF product-token is a complex data structure that is generated using advanced computer-based techniques that include one or more: encoding spatial representations of certain features identified in the digital image or determining a set of invariant features that are specific to the digital image.

The set of invariant features includes features that remain invariant of any 2D transformation performed on the features of the digital image.

A GTIF product-token pair, of the set of GTIF product-token pairs, represents one or more of: one or more of relationships between a plurality of transform-invariant features identified for the digital image, or one or more relationships between the plurality of transform-invariant features identified for the digital image and other transform-invariant features identified for other products.

The digital image has a plurality transform invariant features and a corresponding plurality of GTIF product-tokens.

A GTIF product-token is used to determine whether the GTIF product-token matches a particular pair of the set of GTIF product-token pairs.

A GTIF product-token pair comprises additional context data that include one or more of: location data determined based on GPS location data obtained from one or more of: the location of the user device, a photo, an address of an event, or an address of customers or users; social relationship data of a creator or a recipient of the digital image; or time based data determined based on one or more of: a time of an event, a time when a photo was taken, or a time when a message was sent.

In some implementations, determining that the particular GTIF product-token matches the particular pair is a search that requires comparisons between non-directed graphs having a plurality of nodes, wherein the nodes represent transform invariant features, wherein a time for comparison performed as a series of instructions on computing machinery increases based on a number of comparisons, and wherein a number of transform invariant features exceeds practical limits of user interaction time.

A GTIF product-token may be generated using one or more of: a scale-invariant feature transform feature recognition method (SIFT), a simultaneous localization and mapping feature recognition method (SLAM), or a speed up robust features feature recognition method (SURF).

23.5. Using Product-Tokens and User Data to Enhance Searches

Figure 7C:
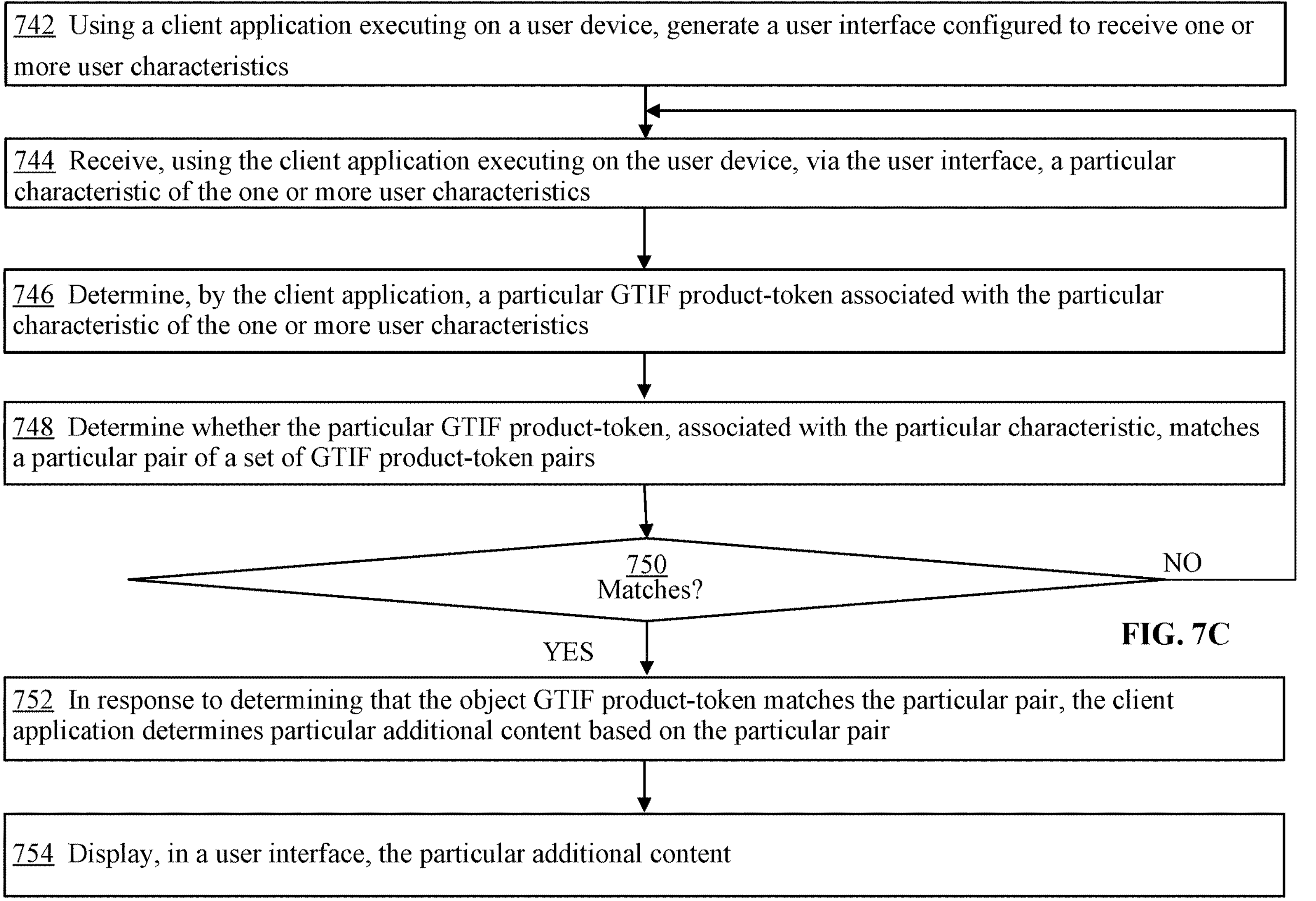
FIG. 7C is a flow diagram showing an example process implementing an approach for using product-tokens and user data to enhance searches.

FIG. 7C is a flow diagram showing an example process implementing an approach for using product-tokens and user data to enhance searches.

In step 742, a client application executing on a user device generates a user interface configured to receive one or more user characteristics. The one or more user characteristics have been associated with one or more corresponding graphs of transform invariant features product-tokens (GTIF product-tokens).

In step 744, the client application receives, via the user interface, a particular characteristic of the one or more user characteristics.

In step 746, the client application determines a particular GTIF product-token associated with the particular characteristic of the one or more user characteristics.

In step 748, the client application determines whether the particular GTIF product-token, associated with the particular characteristic, matches a particular pair of a set of GTIF product-token pairs. The set of GTIF product-token pairs comprises one or more of: a pair comprising a known GTIF product-token and a location data determined for a location of a user device, a pair comprising known GTIF product-token associated with a user of the user device and one or more social relationships defined for the user, a pair comprising known time based data associated with one or more events defined for the user and the one or more events, a pair comprising a known GTIF product-token and a representation of a physical object detected by a camera or sensors and communicated to the user device, or a pair comprising a known GTIF product-token and a representation of a digital object provided by the user device.

If, in step 750, the client application determines that a match is found, then the process proceeds to step 752. Otherwise, either the testing is repeated, or the receiving of another characteristic is performed in step 744.

In step 752, in response to determining that the particular GTIF product-token matches the particular pair, the client application determines particular additional content based on the particular pair, and, in step 754, the client application displays the particular additional content on the user device.

Usually, the user characteristics comprise a user characteristic retrieved from a user profile associated with a user. The user profile stores information about the user and includes one or more of: a user location, a user preference, a user address, a username, a user age, user favorites, a user purchase history, or user travel destinations.

The user characteristics comprise a geographic location of a user, wherein the geographic location of the user is determined using a Global Positioning System (GPS) installed in any of a user smartphone, a user car, or a user computing device.

A GTIF product-token, of the one or more corresponding GTIF product-tokens, is typically a complex data structure that is generated using advanced computer-based techniques that include one or more: encoding spatial representations of certain features identified in the product or determining a set of invariant features that are specific to the product.

The set of invariant features includes features that remain invariant of any 2D transformation performed on the features of the product.

A GTIF product-token for a product, of a pair of the set of GTIF product-token pairs, represents one or more of: one or more of relationships between a plurality of transform-invariant features identified for the product, or one or more relationships between the plurality of transform-invariant features identified for the product and other transform-invariant features identified for other products.

The product has a plurality transform invariant features and a corresponding plurality of GTIF product-tokens. A GTIF product-token is used to determine whether the GTIF product-token matches a particular pair of the set of GTIF product-token pairs.

23.6. Handling Product-Token-Based Requests by a Server

Figure 7D:
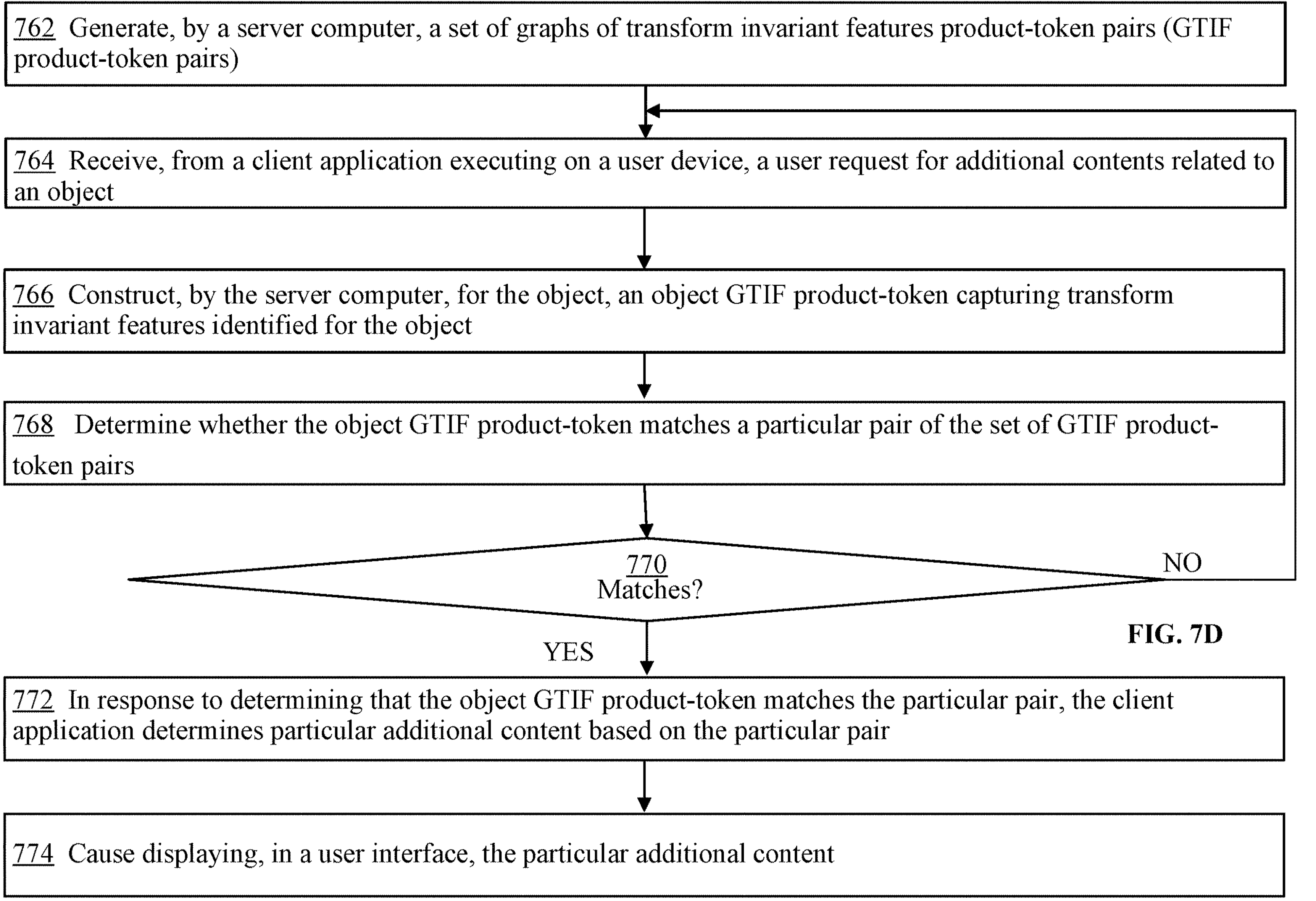
FIG. 7D is a flow diagram showing an example process implementing an approach for handling product-token-based requests by a server application.

FIG. 7D is a flow diagram showing an example process implementing an approach for handling product-token-based requests by a server application. In step 762, a server computer generates a set of graphs of transform invariant features product-token pairs (GTIF product-token pairs). The set of GTIF product-token pairs usually comprises one or more of: a pair comprising a known GTIF product-token and a location data determined for a location of a user device, a pair comprising known GTIF product-token associated with a user of the user device and one or more social relationships defined for the user, a pair comprising known time based data associated with one or more events defined for the user and the one or more events, a pair comprising a known GTIF product token and a representation of a physical object detected by a camera or sensors and communicated to the user device, or a pair comprising a known GTIF product token and a representation of a digital object provided by the user device.

In step 764, the server computer receives from a client application executing on a user device, a user request for additional contents related to an object.

In step 766, the server computer constructs, for the object, an object GTIF product-token capturing transform invariant features identified for the object.

In step 768, the server computer determines whether the object GTIF product-token matches a particular pair of the set of GTIF product-token pairs.

If in step 770, the server computer determines that the match is found, then the process proceeds to step 772. Otherwise, a new request for additional content is awaited in step 764.

In step 772, in response to determining that the object GTIF product-token matches the particular pair, the server computer determines particular additional content based on the particular pair and transmits the particular additional content to the user device to cause, in step 774, the user device to display the particular additional content on the user device.

However, in response to determining that the object GTIF product-token does not match any pair of the set of GTIF product-token pairs: the server computer accesses a second set of GTIF product-tokens pairs that is different from the set of GTIF product-tokens pairs; determines whether the object GTIF product-token matches a second particular pair of the second set of GTIF product-token pairs; in response to determining that the object GTIF product-token matches the second particular pair: determines particular additional content based on the second particular pair, and transmits the particular additional content to the user device to cause the user device to display the particular additional content on the user device.

Typically, a GTIF product-token for a product is a complex data structure that is generated using advanced computer-based techniques that include one or more: encoding spatial representations of certain features identified in the product, or determining a set of invariant features that are specific to the product.

The invariant features are features that remain invariant of any 2D transformation performed on the features of the product.

A GTIF product-token for a product, of a pair of the set of GTIF product-token pairs, usually represents one or more of: one or more of relationships between a plurality of transform-invariant features identified for the product, or one or more relationships between the plurality of transform-invariant features identified for the product and other transform-invariant features identified for other products.

Figure 8:
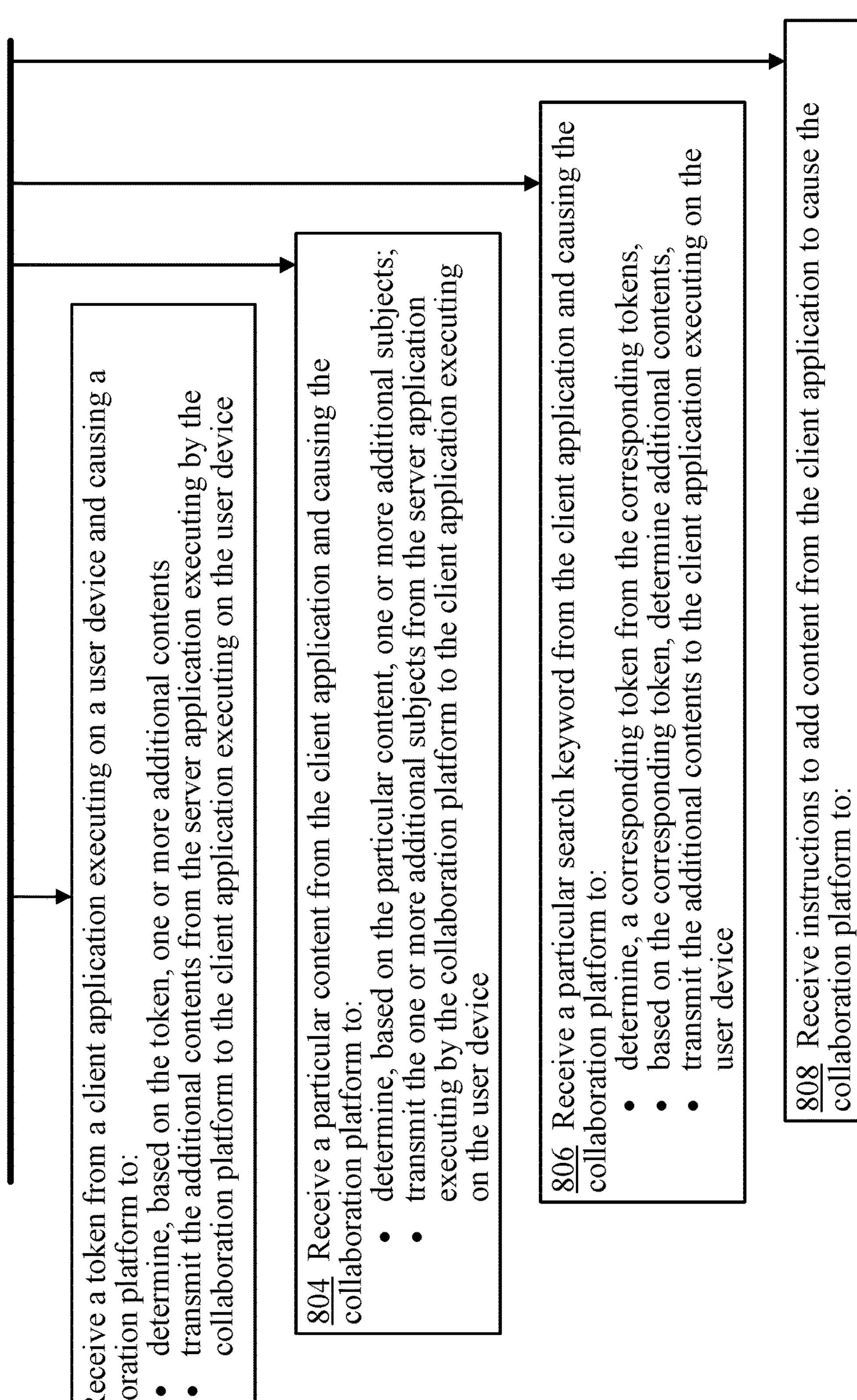
FIG. 8 is a flow diagram showing an example process implementing an approach for handling product-token-based requests by a server application.

FIG. 8 is a flow diagram showing another example process implementing an approach for handling product-token-based requests by a server application. In step 802, a server application executing on a collaboration platform, determines that a request has been received. In response to determining that the request is a product-token: the server application transmits the product-token to the collaboration platform to cause the collaboration platform to: determine, based on the product-token, one or more additional contents, wherein the one or more additional contents are related to the custom product, or are associated with one or more characteristics of the custom product, transmit the one or more additional contents from the server application executing by the collaboration platform to the client application executing on the user device.

In step 804, the server application transmits, in response to determining that the request is a particular content, the particular content to the collaboration platform to cause the collaboration platform to: determine, based on the particular content, one or more additional subjects, transmit the one or more additional subjects from the server application, executing by the collaboration platform to the client application executing on the user device.

In step 806, the server application transmits, in response to determining that the request is a particular search keyword, the particular search keyword to the collaboration platform to cause the collaboration platform to: determine, a corresponding product-token from the one or more corresponding product-tokens, based on the corresponding product-token, determine one or more additional contents, transmit the one or more additional contents to the client application executing on the user device.

In step 808, the server application transmits, in response to determining that the request is an instructions to add additional content, the instructions to the collaboration platform to cause the collaboration platform to: determine, a product-token based on the content, determine one or more additional contents based on the product-token, transmit the one or more additional contents to the client application executing on the user device.

24. Implementation Mechanisms

Although the flow diagrams of the present application depict a particular set of steps in a particular order, other implementations may use fewer or more steps, in the same or different order, than those depicted in the figures.

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
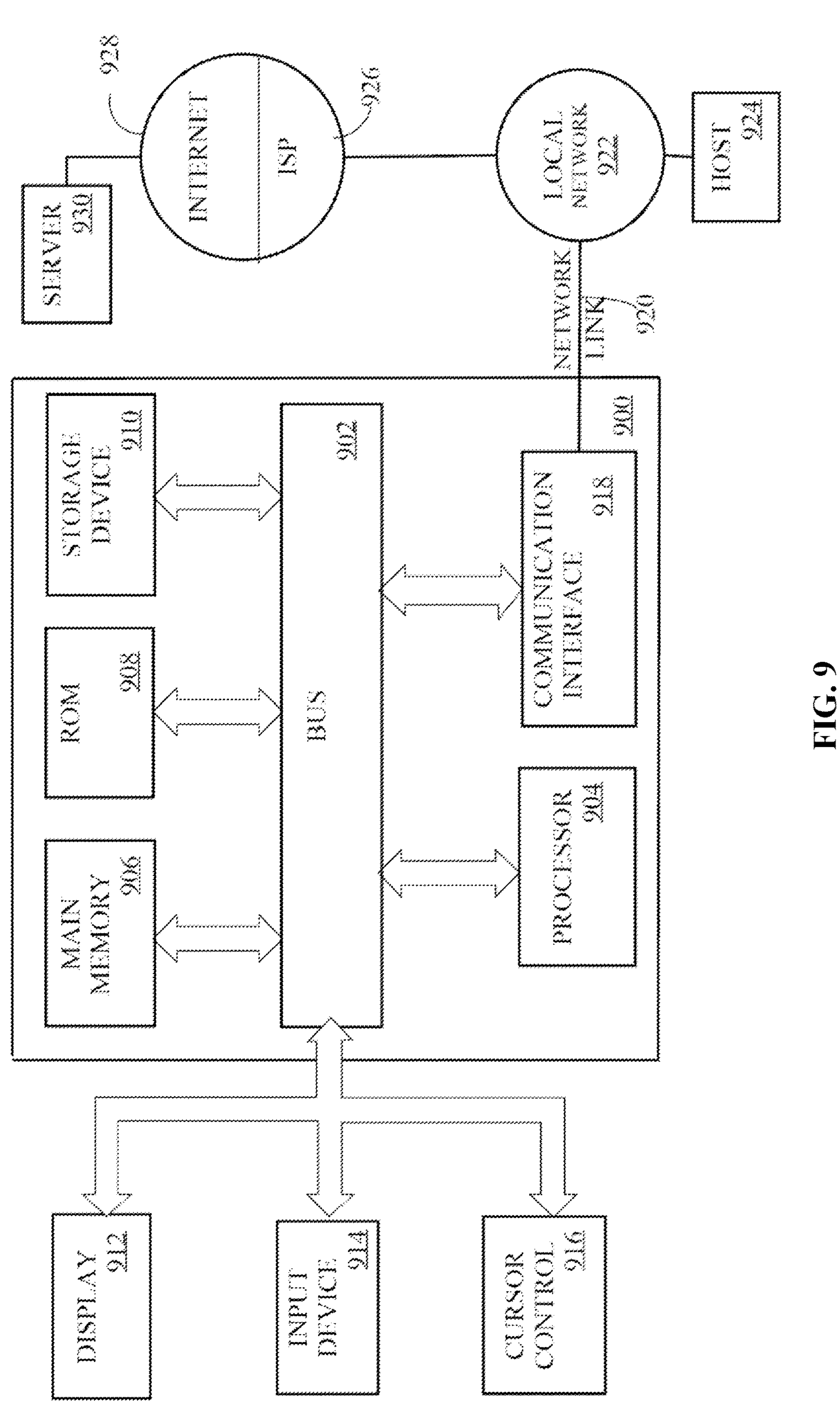
FIG. 9 is a block diagram of a computer system on which embodiments of the approach may be implemented.

FIG. 9 is a block diagram that depicts an example computer system 900 upon which embodiments may be implemented. Computer system 900 includes a bus 902 or other communication mechanism for communicating information, and a processor 904 coupled with bus 902 for processing information. Computer system 900 also includes a main memory 906, such as a random-access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. Although bus 902 is illustrated as a single bus, bus 902 may comprise one or more buses. For example, bus 902 may include without limitation a control bus by which processor 904 controls other devices within computer system 900, an address bus by which processor 904 specifies memory locations of instructions for execution, or any other type of bus for transferring data or signals between components of computer system 900.

An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input-device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic or computer software which, in combination with the computer system, causes or programs computer system 900 to be a special-purpose machine. According to one embodiment, those techniques are performed by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the embodiments. Thus, embodiments are not limited to any specific combination of hardware circuitry and software.

The term "computer-readable medium" as used herein refers to any medium that participates in providing data that causes a computer to operate in a specific manner. In an embodiment implemented using computer system 900, various computer-readable media are involved, for example, in providing instructions to processor 904 for execution. Such a medium may take many forms, including but not limited to, non-volatile media and volatile media. Non-volatile media includes, for example, optical or magnetic disks, such as storage device 910. Volatile media includes dynamic memory, such as main memory 906. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip, or memory cartridge, or any other medium from which a computer can read.

Various forms of computer-readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated service digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic, or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world-wide packet data communication network now commonly referred to as the "Internet" 928. Local network 922 and Internet 928 both use electrical, electromagnetic, or optical signals that carry digital data streams.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. The received code may be executed by processor 904 as it is received, and/or stored in storage device 910, or other non-volatile storage for later execution.

In the foregoing specification, embodiments have been described with reference to numerous specific details that may vary from implementation to implementation. Thus, the sole and exclusive indicator of what is, and is intended by the applicants to be, the approach is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:

using a client application executing on a user device, generating a user interface configured to receive one or more user characteristics of a custom product;

wherein the one or more user characteristics have been associated with one or more corresponding graph of transform invariant features product-tokens (GTIF product-tokens);

receiving, by the client application executing on the user device, via the user interface, a particular characteristic of the one or more user characteristics;

determining, by the client application, a particular GTIF product-token associated with the particular characteristic of the one or more user characteristics;

wherein the particular GTIF product-token is generated to comprise social relationship data of a product creator, using one or more of:

a scale-invariant feature transform feature recognition method (SIFT), a simultaneous localization and mapping feature recognition method (SLAM), or a speed up robust features feature recognition method (SURF);

wherein the social relationship data of the product creator is a link that is between the product creator and another user, and that is used to assign the product creator and another user to a sub-group of attendees that are participating in a specific event;

determining whether the particular GTIF product-token, associated with the particular characteristic, matches a particular pair of a set of GTIF product-token pairs;

wherein the set of GTIF product-token pairs comprises one or more of:

a pair comprising a known GTIF product-token and a location data determined for a location of a user device, a pair comprising known GTIF product-token associated with a user of the user device and one or more social relationships defined for the user, a pair comprising known time based data associated with one or more events defined for the user and the one or more events, a pair comprising a known GTIF product-token and a representation of a physical object detected by a camera or sensors and communicated to the user device, or a pair comprising a known GTIF product-token and a representation of a digital object provided by the user device;

in response to determining that the particular GTIF product-token matches the particular pair:

determining particular additional content based on the particular pair, and displaying the particular additional content on the user device;

generating manufacturing instructions for manufacturing a physical product corresponding to the custom product including the particular additional content;

encoding information about the particular GTIF product-token in the manufacturing instructions;

transmitting the manufacturing instructions, having the information about the particular GTIF product-token encoded in the manufacturing instructions, to a manufacturer;

causing the manufacturer to:

generate a physical product-token based on the information about the particular GTIF product-token encoded in the manufacturing instructions; and embed the physical product-token onto the physical product.

2. The method of claim 1, wherein the one or more user characteristics comprise a user characteristic retrieved from a user profile associated with a user;

wherein the user profile stores information about the user and includes one or more of: a user location, a user preference, a user address, a username, a user age, user favorites, a user purchase history, or user travel destinations.

3. The method of claim 1, wherein the one or more user characteristics comprise a geographic location of a user;

wherein the geographic location of the user is determined using a Global Positioning System (GPS) installed in any of a user smartphone, a user car, or a user computing device.

4. The method of claim 1, wherein a GTIF product-token, of one or more corresponding GTIF product-tokens, is a complex data structure that is generated using advanced computer-based techniques that include one or more: encoding spatial representations of certain features identified in the product or determining a set of invariant features that are specific to the product;

wherein the set of invariant features includes features that remain invariant of any 2D transformation performed on the features of the product.

5. The method of claim 1, wherein a GTIF product-token for a product, of a pair of the set of GTIF product-token pairs, represents one or more of:

one or more of relationships between a plurality of transform-invariant features identified for the product, or one or more relationships between the plurality of transform-invariant features identified for the product and other transform-invariant features identified for other products.

6. The method of claim 1, wherein the product has a plurality transform invariant features and a corresponding plurality of GTIF product-tokens;

wherein a GTIF product-token is used to determine whether the GTIF product-token matches a particular pair of the set of GTIF product-token pairs;

wherein a GTIF product-token pair comprises additional context data that include one or more of:

location data determined based on GPS location data obtained from one or more of: the location of the user device, a photo, an address of an event, or an address of customers or users;

social relationship data of a creator or a recipient of the product; or time based data determined based on one or more of: a time of an event, a time when a photo was taken, or a time when a message was sent.

7. The method of claim 1, wherein the determining of the particular additional content based on the particular pair is a search that requires comparisons between non-directed graphs having a plurality of nodes, wherein the nodes represent transform invariant features, wherein a time for comparison performed as a series of instructions on computing machinery increases based on a number of comparisons, and wherein a number of transform invariant features exceeds practical limits of user interaction time.

8. One or more non-transitory computer readable storage media storing one or more instructions which, when executed by one or more processors, cause the one or more processors to perform:

using a client application executing on a user device, generating a user interface configured to receive one or more user characteristics of a custom product;

wherein the one or more user characteristics have been associated with one or more corresponding graph of transform invariant features product-tokens (GTIF product-tokens);

receiving, by the client application executing on the user device, via the user interface, a particular characteristic of the one or more user characteristics;

determining, by the client application, a particular GTIF product-token associated with the particular characteristic of the one or more user characteristics;

wherein the particular GTIF product-token is generated to comprise social relationship data of a product creator, using one or more of:

a scale-invariant feature transform feature recognition method (SIFT), a simultaneous localization and mapping feature recognition method (SLAM), or a speed up robust features feature recognition method (SURF);

wherein the social relationship data of the product creator is a link that is between the product creator and another user, and that is used to assign the product creator and another user to a sub-group of attendees that are participating in a specific event;

determining whether the particular GTIF product-token, associated with the particular characteristic, matches a particular pair of a set of GTIF product-token pairs;

wherein the set of GTIF product-token pairs comprises one or more of:

a pair comprising a known GTIF product-token and a location data determined for a location of a user device, a pair comprising known GTIF product-token associated with a user of the user device and one or more social relationships defined for the user, a pair comprising known time based data associated with one or more events defined for the user and the one or more events, a pair comprising a known GTIF product-token and a representation of a physical object detected by a camera or sensors and communicated to the user device, or a pair comprising a known GTIF product-token and a representation of a digital object provided by the user device;

in response to determining that the particular GTIF product-token matches the particular pair:

determining particular additional content based on the particular pair, and displaying the particular additional content on the user device;

generating manufacturing instructions for manufacturing a physical product corresponding to the custom product including the particular additional content;

encoding information about the particular GTIF product-token in the manufacturing instructions;

transmitting the manufacturing instructions, having the information about the particular GTIF product-token encoded in the manufacturing instructions, to a manufacturer;

causing the manufacturer to:

generate a physical product-token based on the information about the particular GTIF product-token encoded in the manufacturing instructions; and embed the physical product-token onto the physical product.

9. The one or more non-transitory computer readable storage media of claim 8, wherein the one or more user characteristics comprise a user characteristic retrieved from a user profile associated with a user;

wherein the user profile stores information about the user and includes one or more of: a user location, a user preference, a user address, a username, a user age, user favorites, a user purchase history, or user travel destinations.

10. The one or more non-transitory computer readable storage media of claim 8, wherein the one or more user characteristics comprise a geographic location of a user;

wherein the geographic location of the user is determined using a Global Positioning System (GPS) installed in any of a user smartphone, a user car, or a user computing device.

11. The one or more non-transitory computer readable storage media of claim 8, wherein a GTIF product-token, of one or more corresponding GTIF product-tokens, is a complex data structure that is generated using advanced computer-based techniques that include one or more: encoding spatial representations of certain features identified in the product or determining a set of invariant features that are specific to the product;

wherein the set of invariant features includes features that remain invariant of any 2D transformation performed on the features of the product.

12. The one or more non-transitory computer readable storage media of claim 8, wherein a GTIF product-token for a product, of a pair of the set of GTIF product-token pairs, represents one or more of:

one or more of relationships between a plurality of transform-invariant features identified for the product, or one or more relationships between the plurality of transform-invariant features identified for the product and other transform-invariant features identified for other products.

13. The one or more non-transitory computer readable storage media of claim 8, wherein the product has a plurality transform invariant features and a corresponding plurality of GTIF product-tokens;

wherein a GTIF product-token is used to determine whether the GTIF product-token matches a particular pair of the set of GTIF product-token pairs;

wherein a GTIF product-token pair comprises additional context data that include one or more of:

location data determined based on GPS location data obtained from one or more of: the location of the user device, a photo, an address of an event, or an address of customers or users;

social relationship data of a creator or a recipient of the product; or time based data determined based on one or more of: a time of an event, a time when a photo was taken, or a time when a message was sent.

14. The one or more non-transitory computer readable storage media of claim 8, wherein the determining of the particular additional content based on the particular pair is a search that requires comparisons between non-directed graphs having a plurality of nodes, wherein the nodes represent transform invariant features, wherein a time for comparison performed as a series of instructions on computing machinery increases based on a number of comparisons, and wherein a number of transform invariant features exceeds practical limits of user interaction time.

15. A custom product computer system generator comprising:

a memory unit;

one or more processors; and a custom product computer storing one or more instructions, which, when executed by one or more processors, cause the one or more processors to perform:

using a client application executing on a user device, generating a user interface configured to receive one or more user characteristics of a custom product;

wherein the one or more user characteristics have been associated with one or more corresponding graph of transform invariant features product-tokens (GTIF product-tokens);

receiving, by the client application executing on the user device, via the user interface, a particular characteristic of the one or more user characteristics;

determining, by the client application, a particular GTIF product-token associated with the particular characteristic of the one or more user characteristics;

wherein the particular GTIF product-token is generated to comprise social relationship data of a product creator, using one or more of:

a scale-invariant feature transform feature recognition method (SIFT), a simultaneous localization and mapping feature recognition method (SLAM), or a speed up robust features feature recognition method (SURF);

wherein the social relationship data of the product creator is a link that is between the product creator and another user, and that is used to assign the product creator and another user to a sub-group of attendees that are participating in a specific event;

determining whether the particular GTIF product-token, associated with the particular characteristic, matches a particular pair of a set of GTIF product-token pairs;

wherein the set of GTIF product-token pairs comprises one or more of:

a pair comprising a known GTIF product-token and a location data determined for a location of a user device, a pair comprising known GTIF product-token associated with a user of the user device and one or more social relationships defined for the user, a pair comprising known time based data associated with one or more events defined for the user and the one or more events, a pair comprising a known GTIF product-token and a representation of a physical object detected by a camera or sensors and communicated to the user device, or a pair comprising a known GTIF product-token and a representation of a digital object provided by the user device;

in response to determining that the particular GTIF product-token matches the particular pair:

determining particular additional content based on the particular pair, and displaying the particular additional content on the user device;

generating manufacturing instructions for manufacturing a physical product corresponding to the custom product including the particular additional content;

encoding information about the particular GTIF product-token in the manufacturing instructions;

transmitting the manufacturing instructions, having the information about the particular GTIF product-token encoded in the manufacturing instructions, to a manufacturer;

causing the manufacturer to:

generate a physical product-token based on the information about the particular GTIF product-token encoded in the manufacturing instructions; and embed the physical product-token onto the physical product.

16. The custom product computer system generator of claim 15, wherein the one or more user characteristics comprise a user characteristic retrieved from a user profile associated with a user;

wherein the user profile stores information about the user and includes one or more of: a user location, a user preference, a user address, a username, a user age, user favorites, a user purchase history, or user travel destinations.

17. The custom product computer system generator of claim 15, wherein the one or more user characteristics comprise a geographic location of a user;

wherein the geographic location of the user is determined using a Global Positioning System (GPS) installed in any of a user smartphone, a user car, or a user computing device.

18. The custom product computer system generator of claim 15, wherein a GTIF product-token, of one or more corresponding GTIF product-tokens, is a complex data structure that is generated using advanced computer-based techniques that include one or more: encoding spatial representations of certain features identified in the product or determining a set of invariant features that are specific to the product;

wherein the set of invariant features includes features that remain invariant of any 2D transformation performed on the features of the product.

19. The custom product computer system generator of claim 15, wherein a GTIF product-token for a product, of a pair of the set of GTIF product-token pairs, represents one or more of:

one or more of relationships between a plurality of transform-invariant features identified for the product, or one or more relationships between the plurality of transform-invariant features identified for the product and other transform-invariant features identified for other products.

20. The custom product computer system generator of claim 15, wherein the product has a plurality transform invariant features and a corresponding plurality of GTIF product-tokens;

wherein a GTIF product-token is used to determine whether the GTIF product-token matches a particular pair of the set of GTIF product-token pairs;

wherein a GTIF product-token pair comprises additional context data that include one or more of:

location data determined based on GPS location data obtained from one or more of: the location of the user device, a photo, an address of an event, or an address of customers or users;

social relationship data of a creator or a recipient of the product; or time based data determined based on one or more of: a time of an event, a time when a photo was taken, or a time when a message was sent;

wherein the determining of the particular additional content based on the particular pair is a search that requires comparisons between non-directed graphs having a plurality of nodes, wherein the nodes represent transform invariant features, wherein a time for comparison performed as a series of instructions on computing machinery increases based on a number of comparisons, and wherein several transform invariant features exceeds practical limits of user interaction time.

* * * * *